United States Patent
Fitzgerald et al.

(10) Patent No.: US 12,013,348 B2
(45) Date of Patent: Jun. 18, 2024

(54) SYSTEM AND METHOD FOR MOBILE DEVICE DISPLAY AND HOUSING DIAGNOSTICS

(71) Applicant: BLANCCO TECHNOLOGY GROUP IP OY, Joensuu (FI)

(72) Inventors: William Fitzgerald, Cork (IE); Daniel Öberg, Joensuu (FI); Patrick Conway, Cork (IE); Donal O'Shaughnessy, Cork (IE); Donie Kelly, Cork (IE); Tero Mononen, Joensuu (FI)

(73) Assignee: BLANCCO TECHNOLOGY GROUP IP OY, Joensuu (FI)

( * ) Notice: Subject to any disclaimer, the term of this patent is extended or adjusted under 35 U.S.C. 154(b) by 589 days.

(21) Appl. No.: 17/077,997

(22) Filed: Oct. 22, 2020

(65) Prior Publication Data

US 2021/0116392 A1  Apr. 22, 2021

Related U.S. Application Data

(60) Provisional application No. 62/924,676, filed on Oct. 22, 2019.

(51) Int. Cl.
*G01N 21/956* (2006.01)
*G06F 1/16* (2006.01)
*G06K 7/015* (2006.01)
*G06K 7/14* (2006.01)

(52) U.S. Cl.
CPC .......... *G01N 21/956* (2013.01); *G06K 7/015* (2013.01); *G06K 7/1417* (2013.01); *G01N 2201/0221* (2013.01); *G01N 2201/105* (2013.01); *G06F 1/1605* (2013.01)

(58) Field of Classification Search
CPC .......... G01N 21/956; G01N 2201/105; G06K 7/015; G06K 7/1417; G06F 1/1605
See application file for complete search history.

(56) References Cited

U.S. PATENT DOCUMENTS

| | | | |
|---|---|---|---|
| 10,397,386 B1* | 8/2019 | Zhang | G06F 11/3648 |
| 2016/0019685 A1 | 1/2016 | Nguyen | |
| 2017/0256051 A1* | 9/2017 | Dwivedi | G06T 7/13 |
| 2017/0315007 A1* | 11/2017 | Fitzgerald | G06F 11/263 |
| 2018/0342050 A1* | 11/2018 | Fitzgerald | G06T 7/0002 |
| 2021/0081712 A1* | 3/2021 | Saunders | G06V 20/95 |

OTHER PUBLICATIONS

Notification Concerning Transmittal of International Preliminary Report of Patentablity (Chapter I of the Patent Cooperation Treaty) dated May 5, 2022 (May 5, 2022) on the related international patent application PCT/US2020/056934 issued by The International Bureau of WIPO.

* cited by examiner

*Primary Examiner* — Nnenna N Ekpo
(74) *Attorney, Agent, or Firm* — DICKINSON WRIGHT PLLC

(57) ABSTRACT

There is presented a system and method for detecting mobile device fault conditions, particularly detecting defects in a display or housing of a mobile device. One or more cameras included within the mobile device are used with a reflecting surface in a test fixture to obtain properly aligned and formatted images of the external housing and display of the mobile device, and interactive guidance assists with placement and execution of diagnostics. A remote server conducts further analysis of the captured images, and then defect status may be returned to and displayed upon the mobile device screen.

24 Claims, 38 Drawing Sheets

SYSTEM AND METHOD FOR MOBILE DEVICE DISPLAY AND HOUSING DIAGNOSTICS

CROSS REFERENCE TO RELATED APPLICATIONS

This application claims full benefit of U.S. Provisional Application No. 62/924,676 filed Oct. 22, 2019 and titled, "System and Method for Mobile Device Display and Housing Diagnostics," the disclosure of which is fully incorporated by reference herein for all purposes.

FIELD AND BACKGROUND OF THE INVENTION

Field of the Invention

The present invention relates to systems and methods for detecting fault conditions in mobile devices. More particularly, the present invention provides for systems and methods for detecting a that a mobile device has a fault such as cracked, scratched, chipped, or otherwise damaged screen or housing, and reporting the status of the screen or housing, working or not, so that appropriate action may be taken by a third party.

Background of the Invention

Today, the use of mobile devices is widespread, and increasing numbers of people utilize such devices in their daily lives. As used herein, the term "mobile device," generally refers to any electronic device capable of being moved from place to place. Examples of such mobile devices include, but are not limited to cellular phones (also known more generally as "mobile phones"), smart watches, smart jewelry, portable digital assistants (PDAs), digital cameras, intelligent devices for the "Internet of Things" (or "IOT"), drone devices, mobile subscriber communication devices, tablet computers, media players, smart vehicles, laptop computers, and devices equipped with wireless intelligent agents installed such as Alexa, Google Voice, Siri, Cortana, and others. Consumers purchase millions of mobile devices such as cellular phones every year, driven by the desire for enhanced features and functionality; replacement of worn, damaged, partially nonfunctional, or slower operating devices; or simply, just to obtain the latest product based on consumer loyalty or to show off new models to friends and acquaintances. On the other hand, as more features and capabilities have been incorporated into newly-released mobile devices, the rapidly growing expense of such devices has created a secondary market for pre-owned but functional mobile devices. As such, an industry has evolved to process and recycle previously-owned mobile devices to bring them into operational condition for refurbishment and resale, or for parting out inoperable devices for valuable components or scrap.

Pre-owned mobile device processors (also known herein as "recyclers"), are faced with the challenge of taking in mobile devices such as used mobile phones that are of unknown functionality and operational state, assessing the functional condition of such devices, securely erasing all data from prior users from the mobile phones, and if necessary, effectuating any necessary repairs. With narrow profit margins arising from the competitive market conditions and pricing for recycled mobile devices, efficiency in the assessment, diagnostic, and erasure process is paramount. The recycler must quickly assess the type of device, its operational state, and conduct any necessary re-provisioning such as flashing and erasure of the mobile device in the most efficient manner possible to ensure that recycled devices are returned to the stream of commerce as quickly as possible.

In traditional mobile phone recycling processes, recyclers often manually inspect displays and or/housings of mobile devices to assess the condition of the display, glass over the display, mobile device housing, and exterior surfaces of the mobile device housing. These manual inspections are tedious, subject to error, and require additional manual inputs to document the present state of a mobile device, further impeding recycler efficiency and warehouse throughput. Automated methods to assess the condition of a mobile device have been error prone, and may require manual alignment of the mobile device with a camera or reflective device, also contributing to inefficiencies and delays in the device assessment process.

In addition to mobile device recyclers, retail organizations such as mobile carriers (also known as cellular phone service providers) are also faced with the need to quickly assess, diagnose, and document the condition of mobile devices brought in by customers in a retail setting or kiosk. To provide such a service, carriers were faced with purchasing and configuring expensive hardware to diagnose mobile phones potentially in each retail location or kiosk.

In sum, among other things, there is a need to provide systems and methods to perform diagnostics of exterior mobile device housings and displays in an efficient manner and provide a documentation and analysis interface to a test system.

SUMMARY OF THE INVENTION

The following technical disclosure is exemplary and explanatory only and is not necessarily restrictive of the invention as claimed.

As used herein, the term "mobile device," "mobile electronic device," or "device" generally refers to any electronic device capable of being moved from place to place, and has components (such as displays or screens) that can become faulty or damaged. A mobile device may be a stand-alone device such as a laptop computer, a desktop computer, a mobile subscriber communication device, a mobile phone, a smart watch, a personal digital assistant (PDA), a data tablet, a digital camera, a video camera, a video game console, a media player, a global positioning system (GPS), Universal Serial Bus (USB) keys, mobile weapons, smart watches or jewelry, embedded electronics, and combinations thereof. A mobile electronic device may also be any electronic device integrated with another system or device. For example, a stereo, global positioning system, or other electronic device contained within a vehicle may be utilized in concert with the present invention. Software to implement methods of the present invention can be (1) installed on, or (2) downloaded onto a mobile device indirectly or directly at any time by an authorized user through the Internet, SMS text message, through wireless communication with an app provisioning store, or in any other suitable manner and at any suitable time for carrying out a method according to the invention. For example, the software may be installed on the device when purchased or downloaded after the device is purchased, or even after the device damaged or otherwise becomes faulty. The mobile device may be insured against loss or theft, and systems and methods of the present invention may operate as part of, or in addition to, an insurance policy on the mobile device.

There is presented a system and method for detecting mobile device fault conditions, particularly detecting defects in a display or housing of a mobile device. Cameras included within the mobile device are used with a reflecting surface in a test fixture to obtain properly aligned and formatted images of the external housing and display of the mobile device, and interactive guidance assists with placement and execution of diagnostics. A remote server conducts further analysis of the captured images, and then defect status may be returned to and displayed upon the mobile device screen.

One embodiment of the present invention provides a system for visually diagnosing a mobile device comprising: a test fixture comprising a fixturing platform mechanically coupled through a support member to a top cover including a reflecting surface; a server configured to communicate with a provided mobile device; and wherein the memory of the mobile device includes instructions that when executed by the processor of the mobile device cause the mobile device to perform the steps of: prompting the user to place the mobile device into the test fixture; determining whether the mobile device is in an acceptable orientation with respect to the reflecting surface; in response to detecting the mobile device is in an acceptable orientation, capturing an image of the mobile device as reflected from the reflective surface and formatting the captured image for transmission to the server for defect analysis. Further, in certain embodiments, determining whether the mobile device is in an acceptable orientation with respect to the reflecting surface further includes: displaying on the mobile device a tracking fiducial and a placement guidance fiducial; obtaining a tracking image of the mobile device from a camera of the mobile device; locating, within the tracking image, an orientation of the mobile device; and determining whether the located orientation is within a predetermined range. Additionally, displaying on the mobile device a tracking fiducial and a placement guidance fiducial may further comprise displaying the tracking fiducial as: one or more QR codes; one or more Aztec codes; one or more ArUco codes; and one or more graphical tracking elements. The reflecting surface may comprise any surface, substantially planar or not, capable of reflecting an image of a mobile device, such as, for example, a mirror and a one-way mirror.

There is also provide a method for visually diagnosing a mobile device comprising: prompting the user to place the mobile device into a test fixture comprising a fixturing platform a reflective surface; determining whether the mobile device has been placed on the fixturing platform in an acceptable orientation with respect to the reflective surface; in response to detecting the mobile device is in an acceptable orientation, capturing an image of the device as reflected from the reflective surface; analyzing the captured image to determine whether the captured image comprises one or more defect indicators; and based on said analyzing, providing a cosmetic defect grading of the mobile device. Defect indicators may comprise any desired information, such as one or more indications of whether the housing and/or display of the mobile device includes any: cracks, chips, fractures, mars, wear, scratches, abrasions, engravings, stuck pixels, dead pixels, color errors, color bleed, and errant markings. Further the method may include detecting, through analyzing the captured image including a tracking fiducial, whether the mobile device is in a proper position with respect to the reflecting surface; providing dynamic guidance through modifying a placement guidance fiducial displayed on the mobile device; instructing a user with regard to placement of the mobile device on the fixturing platform; and indicating, through the placement guidance fiducial, when the mobile device has been placed into a correct position with respect to the reflecting surface.

In certain embodiments, there is also presented a system comprising: a test fixture including a fixturing platform mechanically coupled through a support member to a top cover including a reflecting surface, wherein the reflecting surface is positioned at a predetermined distance from the fixturing platform and disposed at a predetermined angle with respect to a top planar surface of the fixturing platform; a server comprising: a server processor communicatively coupled to a database; a server memory communicatively coupled to the server processor; a server user interface communicatively coupled to the server processor; and a communications interface coupled to the server processor and configured to communicate with a communications module of a provided mobile device wherein: the provided mobile device comprises: a housing substantially enclosing the mobile device; a mobile processor in communication with a mobile device memory; a user interface including a display and a first camera in communication with the mobile processor; a communications module in communication with the mobile processor and configured to communicate with the communications interface of the server; wherein the memory of the mobile device includes instructions that when executed by the processor cause the mobile device to perform the steps of: prompting a user of the mobile device to initiate a test of one of the display or the housing of the mobile device; presenting an image on the display that includes: a tracking fiducial; and a placement guidance fiducial that includes an indicia of alignment; performing a tracking calibration function to adjust the mobile device position and display for optimal image capture; modifying a brightness setting and a camera sensitivity setting of the mobile device to optimize image capture; determining that the mobile device is in an acceptable orientation with respect to the reflective surface, and thereupon: capturing an image of the mobile device as reflected from the reflective surface; and formatting the captured image for transmission to the server for defect analysis. In various embodiments, the provided mobile device includes a second camera, and in alternate embodiments, the reflecting surface comprises one or more of a mirror and a one-way mirror. Further, in yet another embodiment, the server is communicatively coupled to the mobile device through one of a wired connection or a wireless connection, and in various embodiments, the memory of the mobile device and the processor is configured with software, that when executed, executes the steps of: initiating a test alignment mode, wherein: the tracking fiducial is rendered on the display; and the placement guidance fiducial is rendered on the display. Any desired image may be output, for example, an image of the mobile device's view from the camera is rendered on the display. In various embodiments, an image from the front facing camera captures an image of the display of the mobile device; and a rear-facing camera captures an image of a back side surface of the housing of the mobile device. Proper alignment of the device with respect to the test fixture may include detecting, through analyzing an image from the camera including the tracking fiducial, whether the mobile device is in a proper position with respect to the reflecting surface; providing dynamic guidance through modifying the placement guidance fiducial; instructing a user with regard to placement of the mobile device on the fixturing platform; and indicating, through the placement guidance fiducial, when the mobile device has been placed into a correct position with respect to the reflecting surface.

In various embodiments, the system of the present invention may include a fixturing platform that includes an alignment guide. The alignment guide, in optional embodiments, may include one or more of: an optical fiducial; an illuminated fiducial; one or more molded placement guides; and an electronic display coupled to the test processor for displaying a placement fiducial and alignment information such as arrows.

Various embodiments may include capturing an image of the mobile device from the first camera once the mobile device is properly placed on the fixturing platform, and may further comprise analyzing the captured image and diagnosing at least one state of the housing/display of the mobile device. Additionally, embodiments may further comprise analyzing, from the analyzed image, whether placement of the mobile device requires modification; and providing alternate placement guidance fiducials for further alignment. In certain implementations, the support element is selectable to change a distance between the reflecting surface and the fixturing platform, and in other embodiments, the support member can be actuated to obtain a predetermined angle between the reflecting surface and the fixturing platform.

Yet another embodiment of the present invention includes a system comprising a test fixture including a fixturing platform mechanically coupled through a support member to a reflecting surface; wherein the reflecting surface is positioned at a predetermined distance from the fixturing platform and disposed at a predetermined angle with respect to a top planar surface of the fixturing platform; a server comprising: a server processor communicatively coupled to a database; a server memory communicatively coupled to the server processor; a server user interface communicatively coupled to the server processor; and a communications interface coupled to the server processor and configured to communicate with a communications module of a provided mobile device wherein: the provided mobile device comprises: a housing substantially enclosing the mobile device; a mobile processor in communication with a mobile device memory; a user interface including a display and a first camera in communication with the mobile processor; a communications module in communication with the mobile processor and configured to communicate with the communications interface of the server; wherein the memory of the mobile device includes instructions that when executed by the processor cause the mobile device to perform the steps of: prompting a user of the mobile device to initiate a test of one of the display or the housing of the mobile device; presenting an image on the display a tracking token that includes an indicia of alignment; performing a tracking calibration function to adjust the mobile device position and display for optimal image capture; modifying a brightness setting and a camera sensitivity setting of the mobile device to optimize image capture; determining that the mobile device is in an acceptable orientation with respect to the mirror, and thereupon: capturing an image of the mobile device as reflected from the mirror; and formatting the captured image for transmission to the server for defect analysis. The system may include any desired hardware in addition to the above-mentioned features, including, for example, one or more cameras, light fixtures, microphones, speakers, vibration agitators, wireless charging pads, NFC circuits; conveyer belts, and mobile device manipulation gimbals, jigs, and motors.

Methods of the present invention may be executed in all or part of the mobile device, the host server, external neural network hardware, and servers and/or processors communicatively coupled to the foregoing.

BRIEF DESCRIPTION OF THE DRAWINGS

A more complete understanding of the present invention may be derived by referring to the detailed description and claims when considered in connection with the following illustrative figures.

FIG. 1F illustrates a perspective view of an even larger test fixture configured to accommodate a plurality of mobile devices.

Similar reference numerals indicate similar structures or functions of the various embodiments depicted herein.

DETAILED DESCRIPTION

Test Fixture

Figure 1:
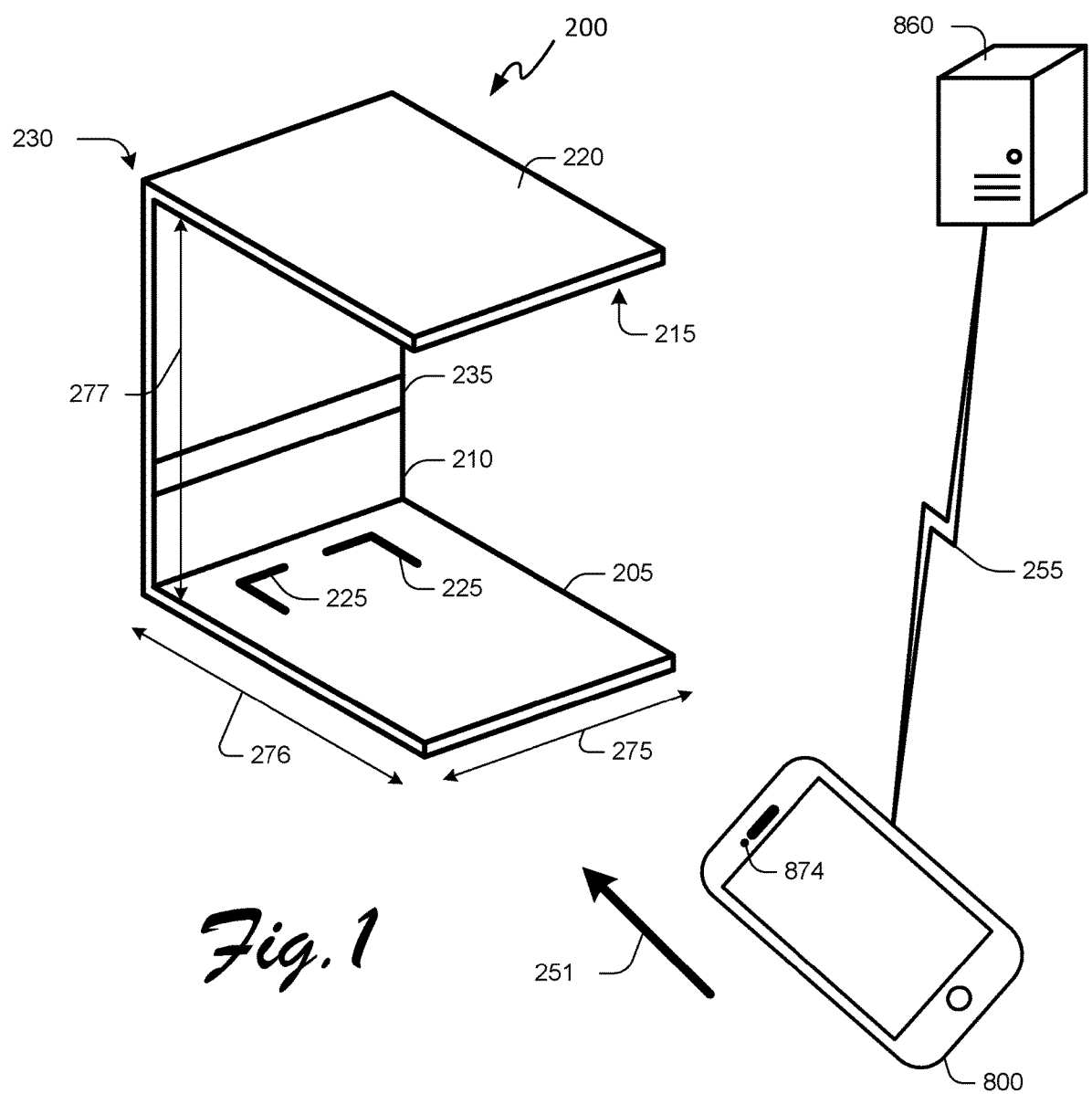
FIG. 1 shows a schematic representation of an embodiment of the present invention where a mobile device in communication with a server is being placed into a test fixture of the present invention.

FIG. 1 shows a schematic representation of an embodiment of the present invention. A test fixture 200 provides a platform for automated testing of display 1400 and/or housing of a mobile device 800. The test jig includes a fixturing platform 205 with optional alignment guides 225 that assist with placement of the mobile device 800. The fixturing platform 205 is mechanically coupled to a reflecting surface 215 through the support member 210. The reflective surface 215 may be attached to a surface of a top cover 220, so that the reflective surface substantially faces the fixturing platform 205, and the top cover 220 may be attached to the support member and provide through a bottom surface an attachment to the reflective surface 215. The reflecting surface 215 may comprise a mirror or other surface that reflects an object placed on the fixturing platform 205. The reflecting surface 215 may be changed in its orientation with respect to the fixturing platform 205 by modifying a distance between the reflecting surface 215 and the fixturing platform 205 through the height adjustment 235. Further, the reflecting surface 215, while in a preferred embodiment is substantially parallel to a plane that substantially includes a top surface of the fixturing platform 205, may be altered in its angle with respect to the fixturing platform by actuating a reflector angle adjustment 230, such as through hinge connecting the support member 210 to the top cover 220/reflecting surface 215. Any desired angle may be obtained with respect to the fixturing platform to enhance operation of aspects of the display and housing diagnostics of the present invention. Also shown in the figure is a mobile device 800, which is in wired or wireless communication 255 with a server 860. The test fixture 200 is configured to accept insertion 251 of the mobile device 800, and in one embodiment, assist with aligning placement of the mobile device 800 on the fixturing platform through optional alignment fiducials 225. Fiducials 225 may comprise any visual indicator to assist a user with proper placement of a mobile device, and in some embodiments may comprise a box or other polygon, raised ridges or lit areas to guide the user with optimal placement of the mobile device 800. The height adjustment height adjustment 235 may comprise any desired mechanism for changing a distance between the fixturing platform 205 and the reflecting surface 215, such as a slide, a ratchet, a locking bar, a rack, selectable pins and holes, or any other adjustment mechanism.

The test fixture 200 may be sized to any appropriate dimension, and dimensions may be chosen so that an image of the mobile device 800, when transmitted from the mobile phone and reflected downwardly back toward the mobile phone, is of a sufficient distance that a front facing camera 874 of the mobile device can focus and resolve the reflected image of the mobile device 800. In one embodiment, a distance 277 between the fixturing platform 205 and the reflecting surface 215 is approximately 160 mm. Further, the test fixture 200 may be sized in horizontal dimensions to accommodate any desired mobile device 800 or plurality of mobile devices, and in one embodiment is sized to be approximately 210 mm in depth (direction 276) and 180 mm wide (direction 275). The height adjustment 235 may be actuated to customize distance between the reflecting surface of the mobile device, and may accommodate fixed focus or variable focus devices.

While positioning a mobile device 800 closer to the reflecting mirror 215 may assist with optimizing resolution of an image captured by the front-facing camera 874, because of the typical near-edge position of front-facing camera 874, the closer the mobile device is moved toward the reflecting surface 215 the more tilt would need to be applied to either the reflecting surface 215 or the mobile device 800 to capture a complete image of the mobile device 800. Put another way, because of the position of the camera is on the phone (e.g., closer to the edge rather than centered), the camera may fail to capture the bottom of the screen if the mobile device 800 is placed too closely to the reflecting surface 215, but on the other hand, moving the mobile device 800 farther away may fail to produce sufficient resolution in the display to detect cracks or other defects. In one aspect, a preferred spacing may be made by placing the mobile device 800 at least ½ the minimum focal length of the front-facing camera 874, so that the "up and back" distance correlates to at least one focal length.

Figure 1A:
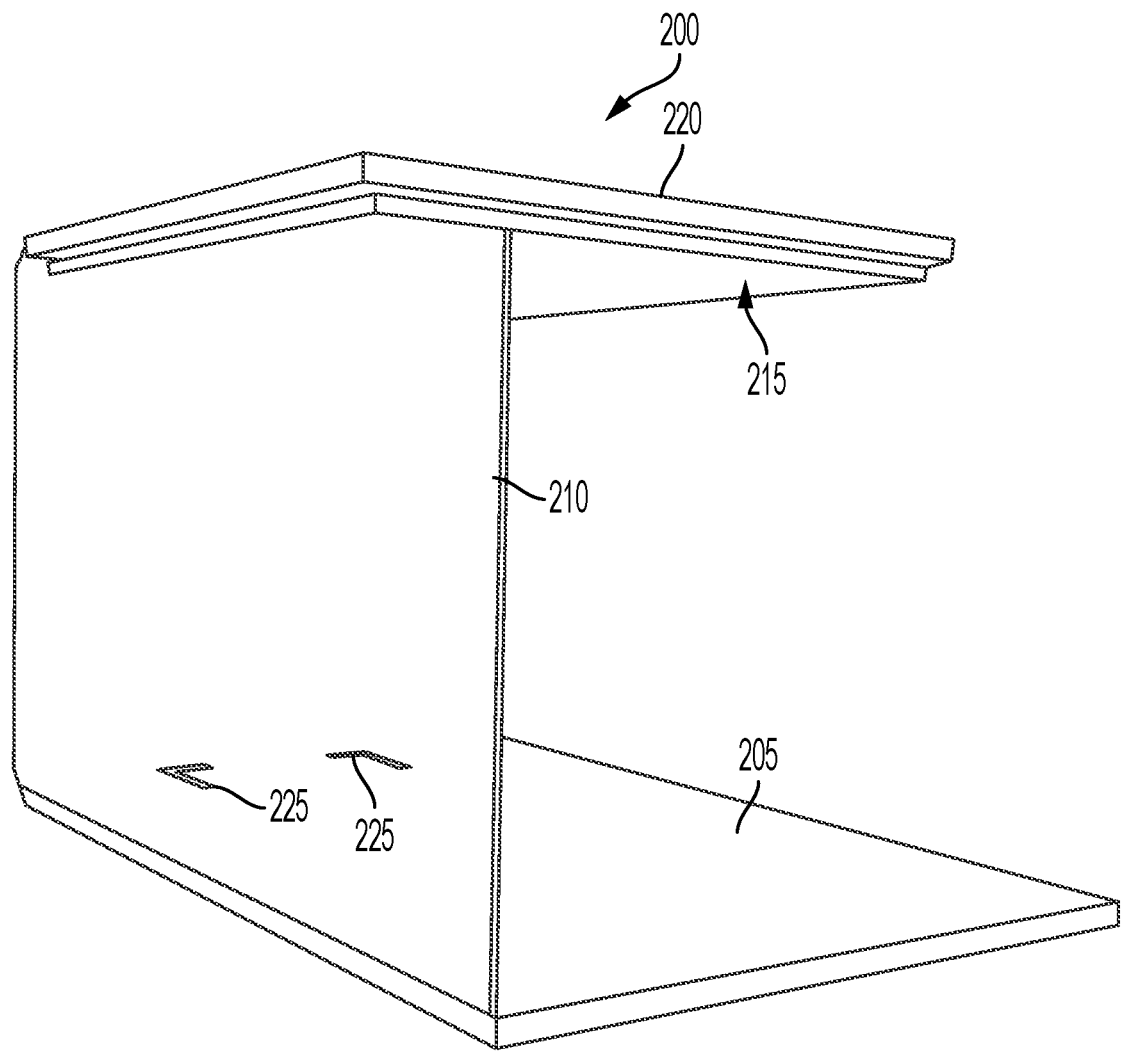
FIG. 1A shows a front angled view looking into a test fixture of the present invention.
Figure 1B:
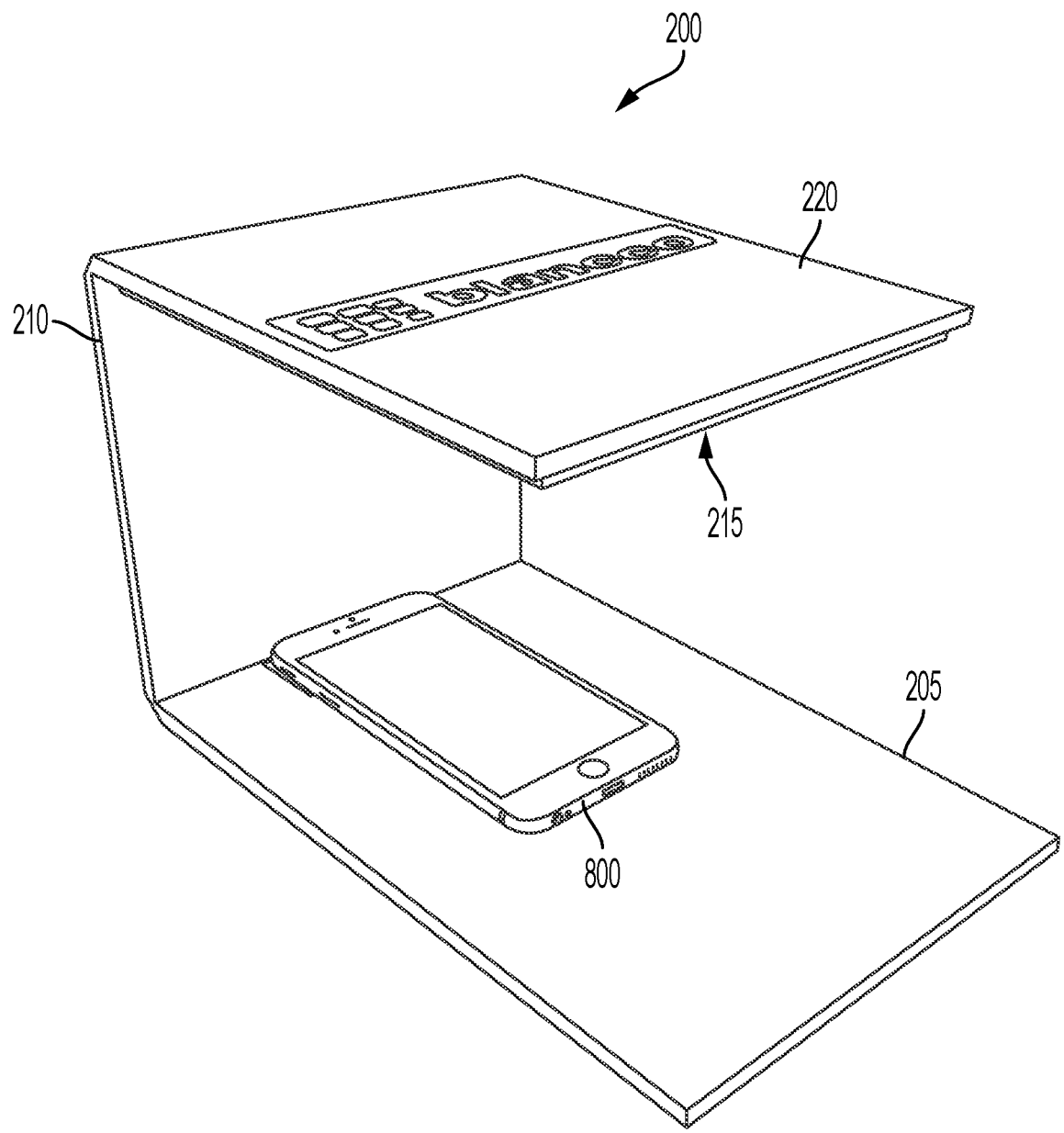
FIG. 1B shows a front perspective view of the test fixture of the present invention.
Figure 1C:
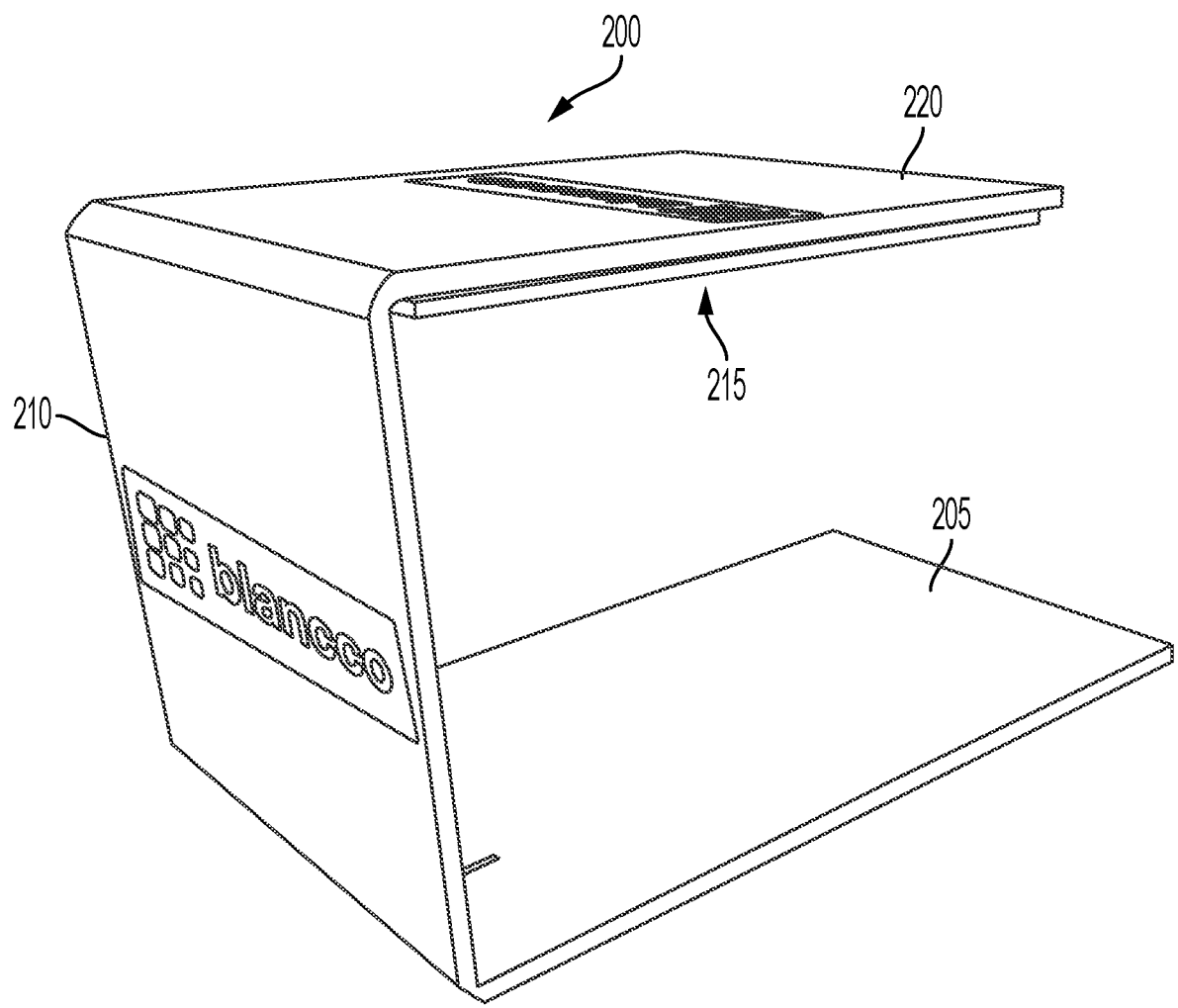
FIG. 1C illustrates a perspective rear view of the test fixture of the present invention.
Figure 1D:
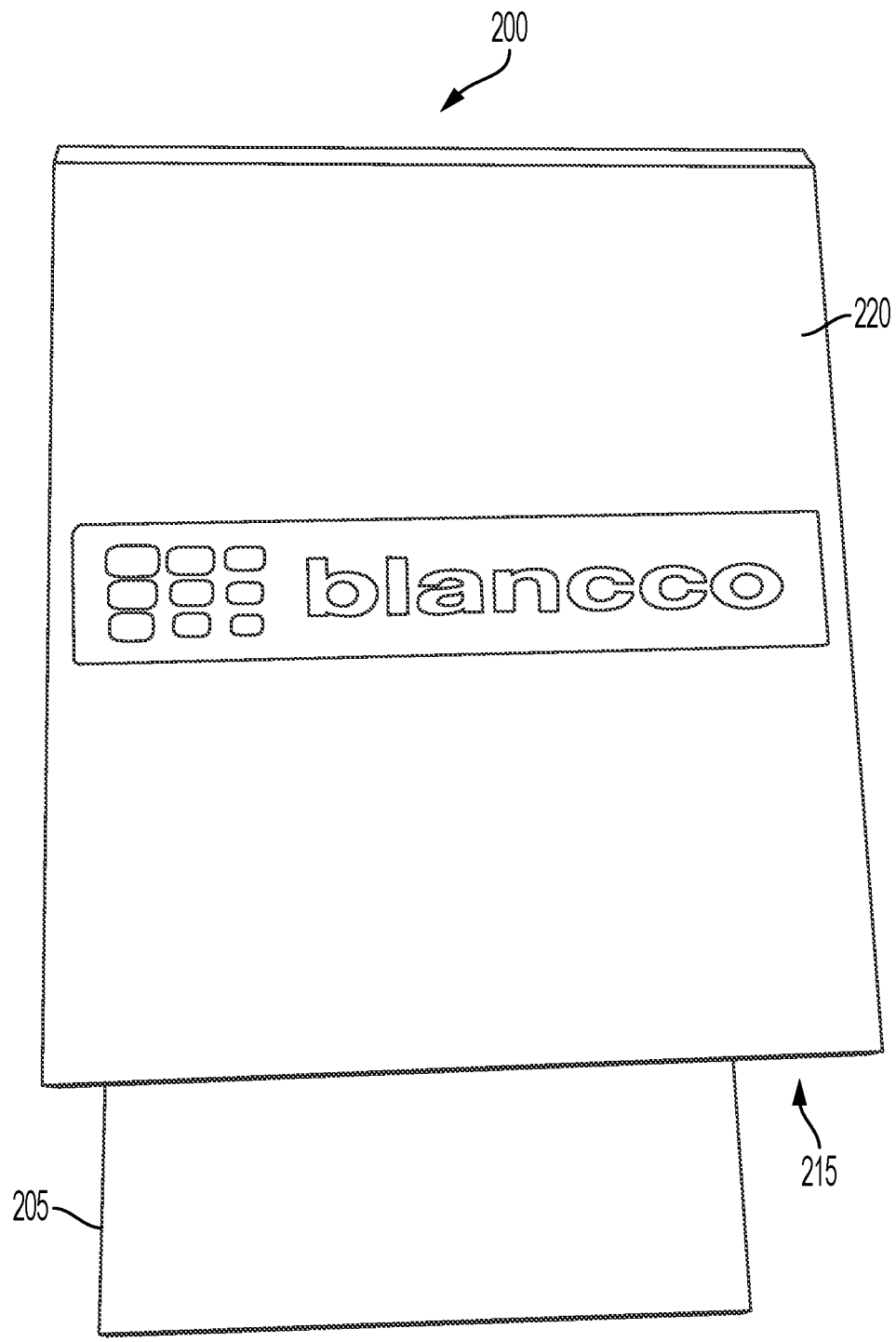
FIG. 1D shows a top view of the test fixture of the present invention.

Various other angles illustrate additional views of an implementation of the present invention. FIG. 1A shows a front angled view looking into the test fixture 200, with reflective surface 215 shown located underneath the top cover 220. FIG. 1B shows a front perspective view of the test fixture 200, with a mobile device 800 inserted and placed within the alignment guides. FIG. 1C illustrates a perspective rear view of the test fixture 200. FIG. 1D shows a top view of the test fixture 200.

Figure 1E:
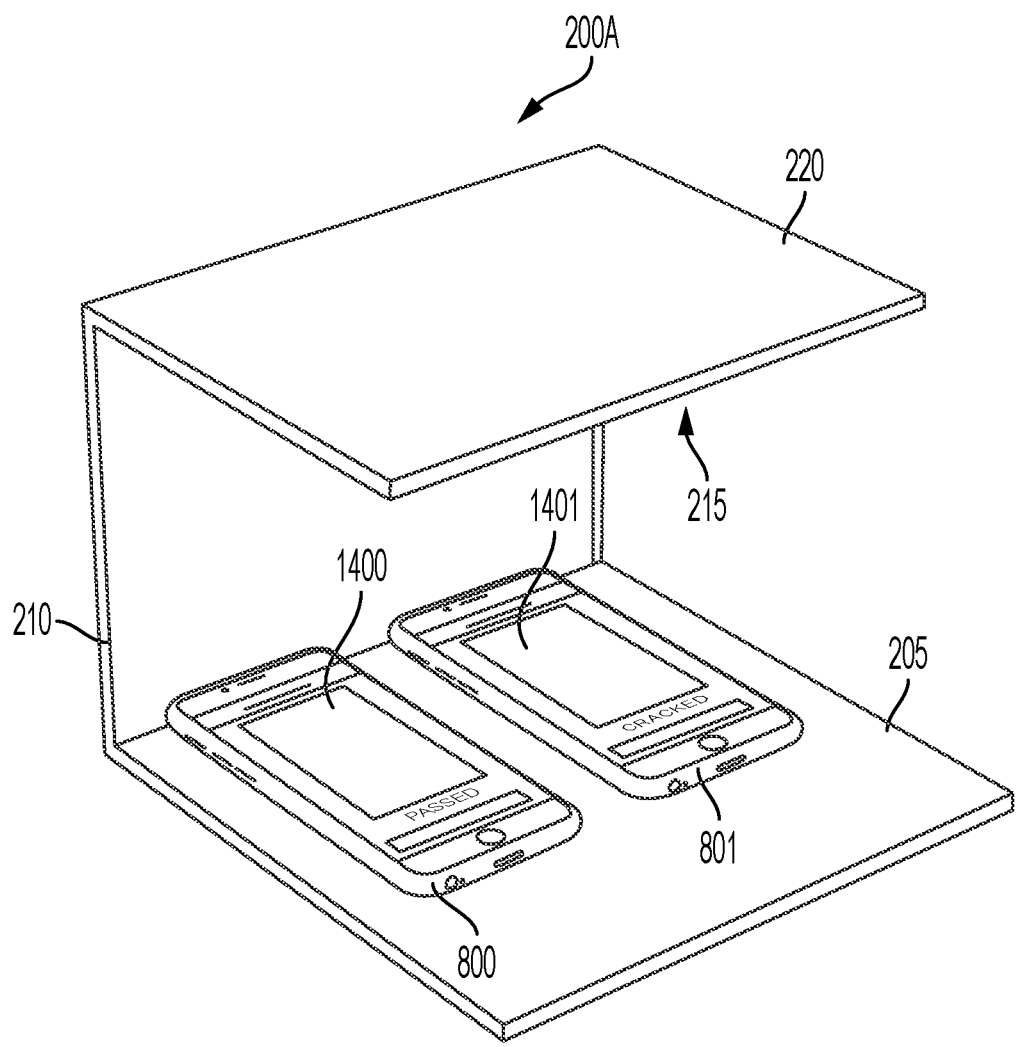
FIG. 1E depicts a two-device test fixture that is sized to accommodate two mobile devices.

Various alternate implementations of the present invention are also possible, that may accommodate multiple mobile devices simultaneously. Such implementations may be advantageous in a warehouse environment which may be used by a device recycler or repair agency. FIG. 1E depicts a two-device test fixture 200A, that is sized to accommodate two mobile devices 800, 801 simultaneously. Note that display 1400 of mobile device 800 indicates that it has passed a diagnostic test of its display, and display 1401 of mobile device 801 indicates that a crack has been detected on the mobile device. Additionally, FIG. 1F illustrates a perspective view of an even larger test fixture 208 configured to accommodate a plurality of mobile devices 800 (9 are shown in the figure, but any desired number may be used with embodiments of the present invention). Such configuring may include increasing a width dimension of the top cover 220, the reflecting surface 215, the support member 210, and the fixturing platform 205.

Figure 1G:
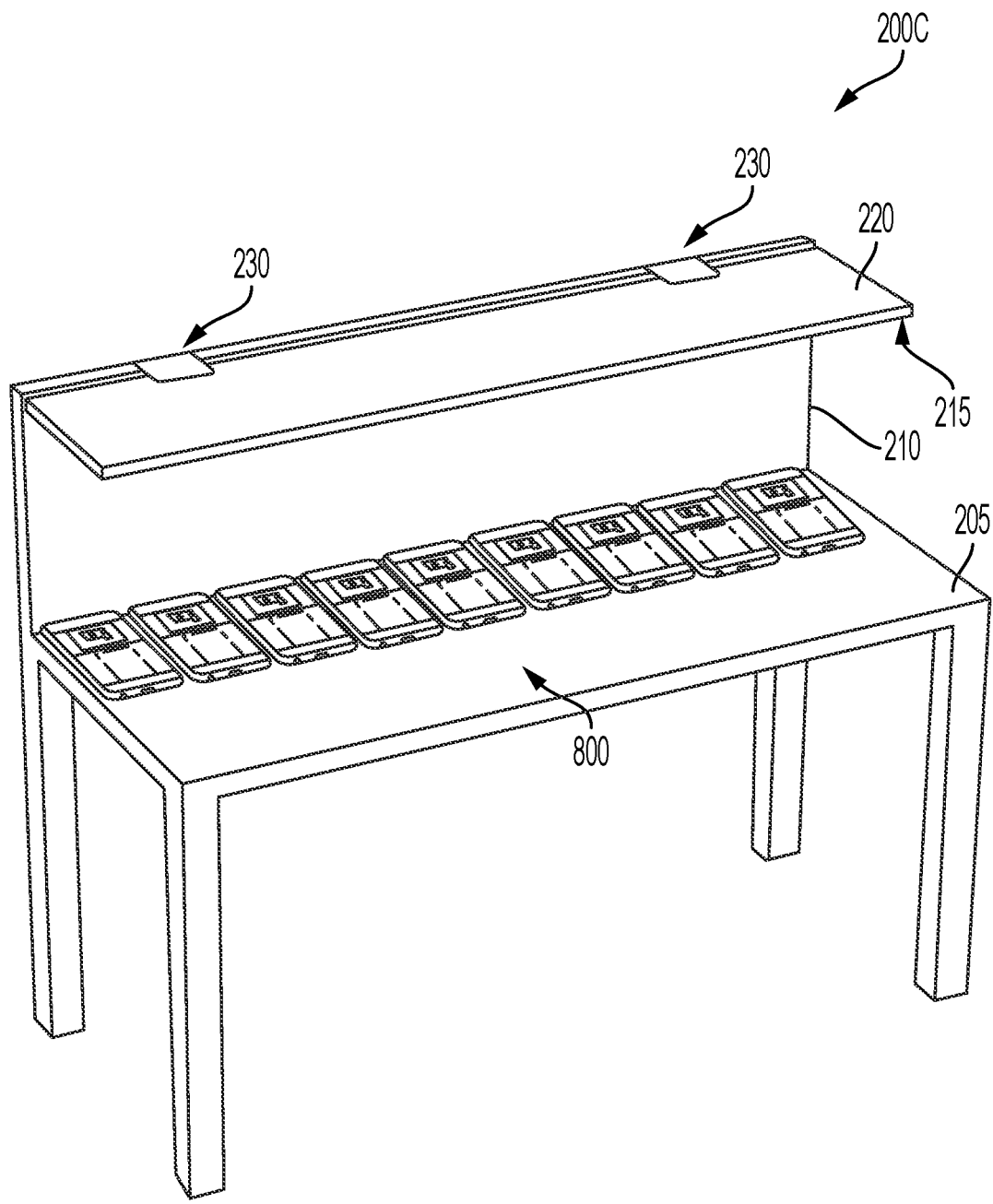
FIG. 1G illustrates a closed position of the top cover/reflecting surface configured to allow multiple mobile devices to conduct display/housing testing.
Figure 1H:
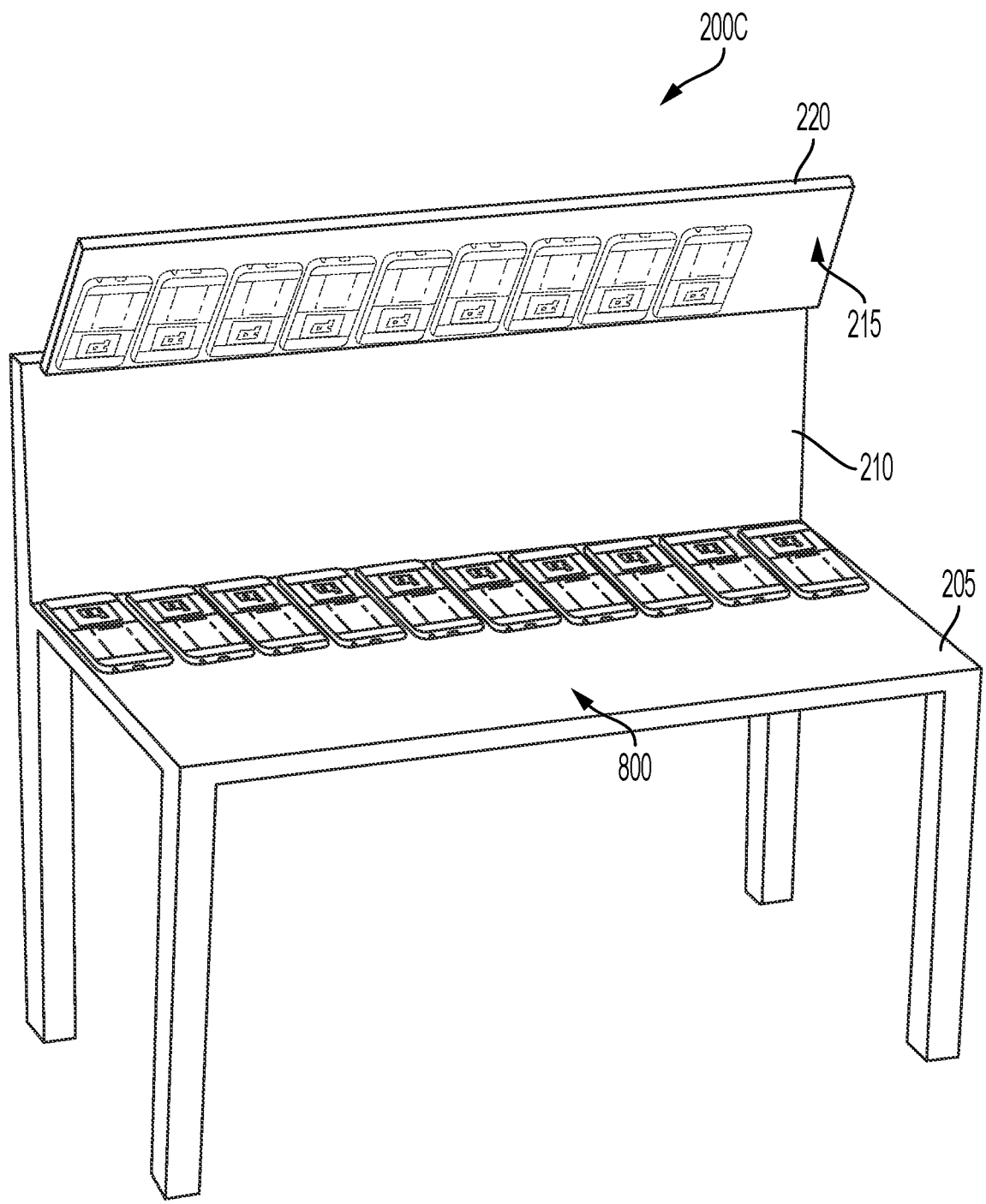
FIG. 1H shows an open position, allowing easier visual inspection and/or placement of mobile devices within the test fixture.

As mentioned previously, the top cover 220 and/or reflecting surface 215 may be moved with respect to the fixturing platform 205. In one embodiment, the top cover 220 and reflecting surface 215 are hingedly connected to the support member to allow the top surface/reflecting surface to be rotated between an open position and a closed position thereof. FIGS. 1G-1H depict such a test fixture 200C, with hinges 230 coupling top cover 220/reflecting surface 215 to the support member 210; FIG. 1G illustrates a closed position of the top cover/reflecting surface configured to allow multiple mobile devices 800 to conduct display testing, and FIG. 1H shows an open position, allowing easier visual inspection and/or placement of mobile devices 800 within the test fixture 200C. The test fixtures 200C of FIGS. 1G-1H show legs supporting the fixturing platform 205, and the illustrated legs may or may not be used based upon the desired test setup.

Figure 1I:
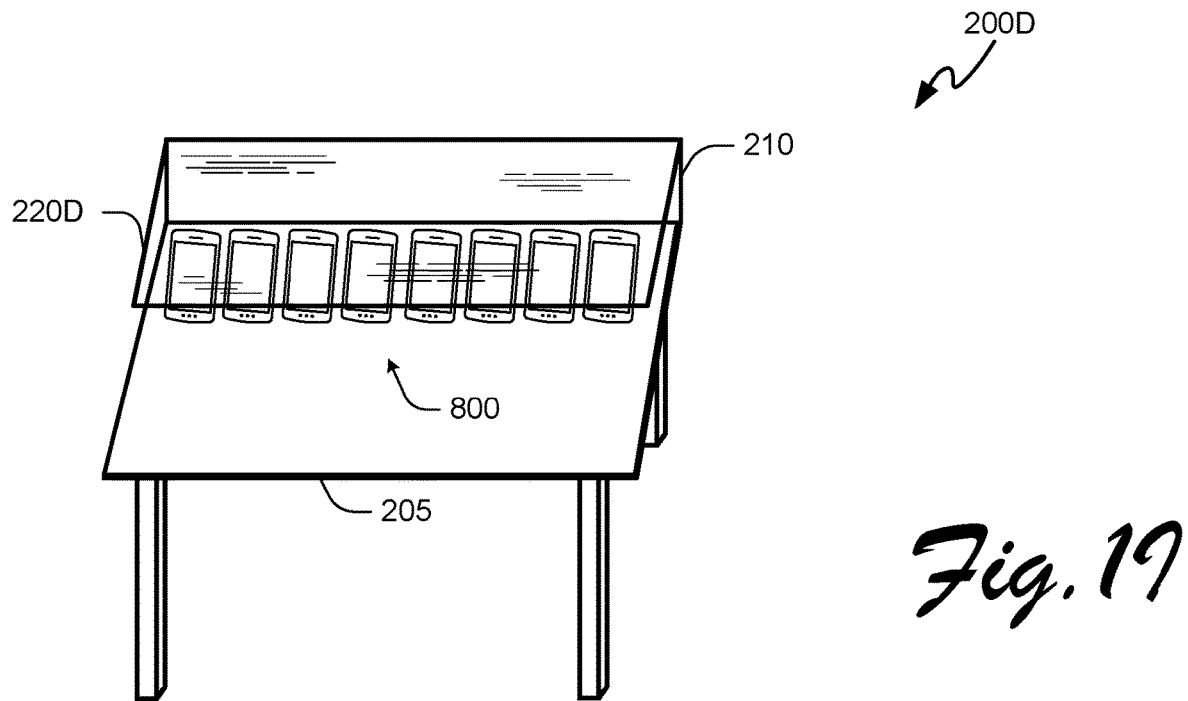
FIG. 1I illustrates a perspective view of a test fixture of the present invention configured to include a one-way mirror on a top cover.
Figure 1J:
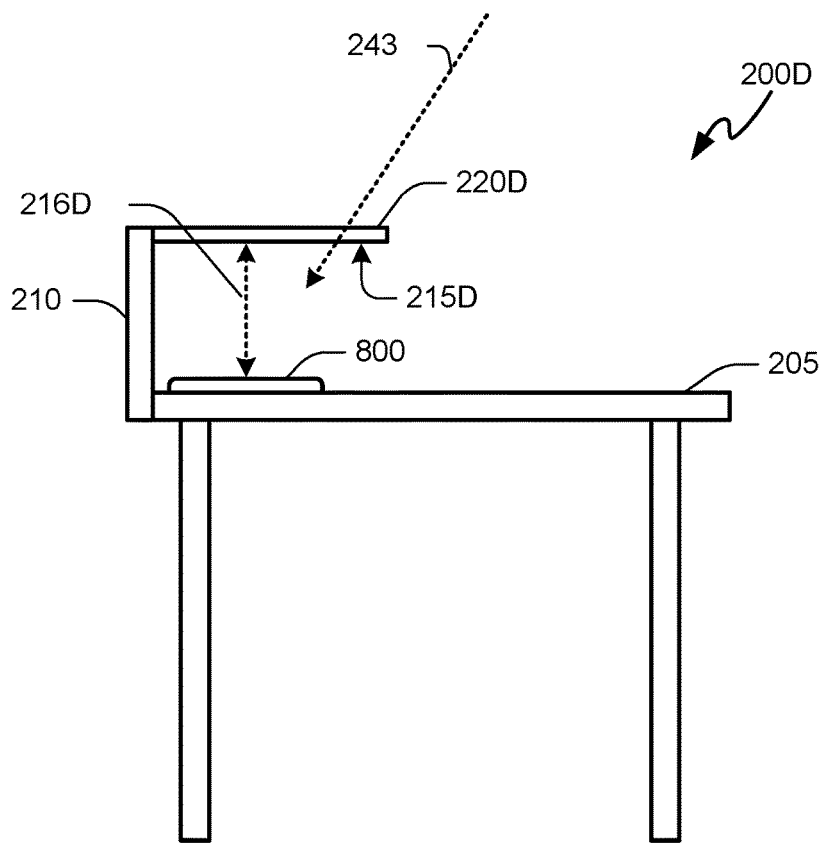
FIG. 1J illustrates a side plan view of the test fixture of FIG. 1I including a one-way mirror on a top cover.

FIGS. 1I-1J illustrate an embodiment of a test fixture 200D the present invention, further configured with a top cover 220D that includes a one-way mirror. One-way mirrors are also known in the art as two-way mirrors, one-way glasses, half-silvered mirrors, or semi-transparent mirrors. Such implementation provides a reciprocal mirror that appears reflective on one side, such as a bottom side (providing reflective surface 215) and transparent at the other side, such as a top side as may be seen by an observer viewing 243 mobile devices 800 from a position above the top cover 220D. The fixturing platform 205 is mechanically coupled to the top cover 220D through the support member 210. The top cover 220D/reflecting surface 215D is disposed so that the reflective surface 215D substantially faces the fixturing platform 205, providing a reflection 216D to the mobile devices 800 from the reflecting surface 215D. The top cover 220D may be attached to the support member 210 and provide through a bottom surface an attachment to the reflective surface 215D of the top cover 220D. The top cover 220D may be implemented as a continuous one-way mirror, or may include a transparent element such as glass or Plexiglas with a one-way mirror attached to a bottom surface thereof, providing the reflective surface 215D with additional stiffness/fracture resistance and/or support provided by the transparent material on the top surface of the top cover 220D. Top cover 220D may also include a transparent or opaque frame (not shown) that partially or completely circumscribes the one-way mirror, providing additional rigidity, strength, and edge-chip resistance while allowing an operator to view 243 the mobile devices 800 from a position above the top cover 220D. The test fixture 200D of FIGS. 1I-1J show legs supporting the fixturing platform 205, and the illustrated legs may or may not be used based upon the desired test setup.

Figure 2:
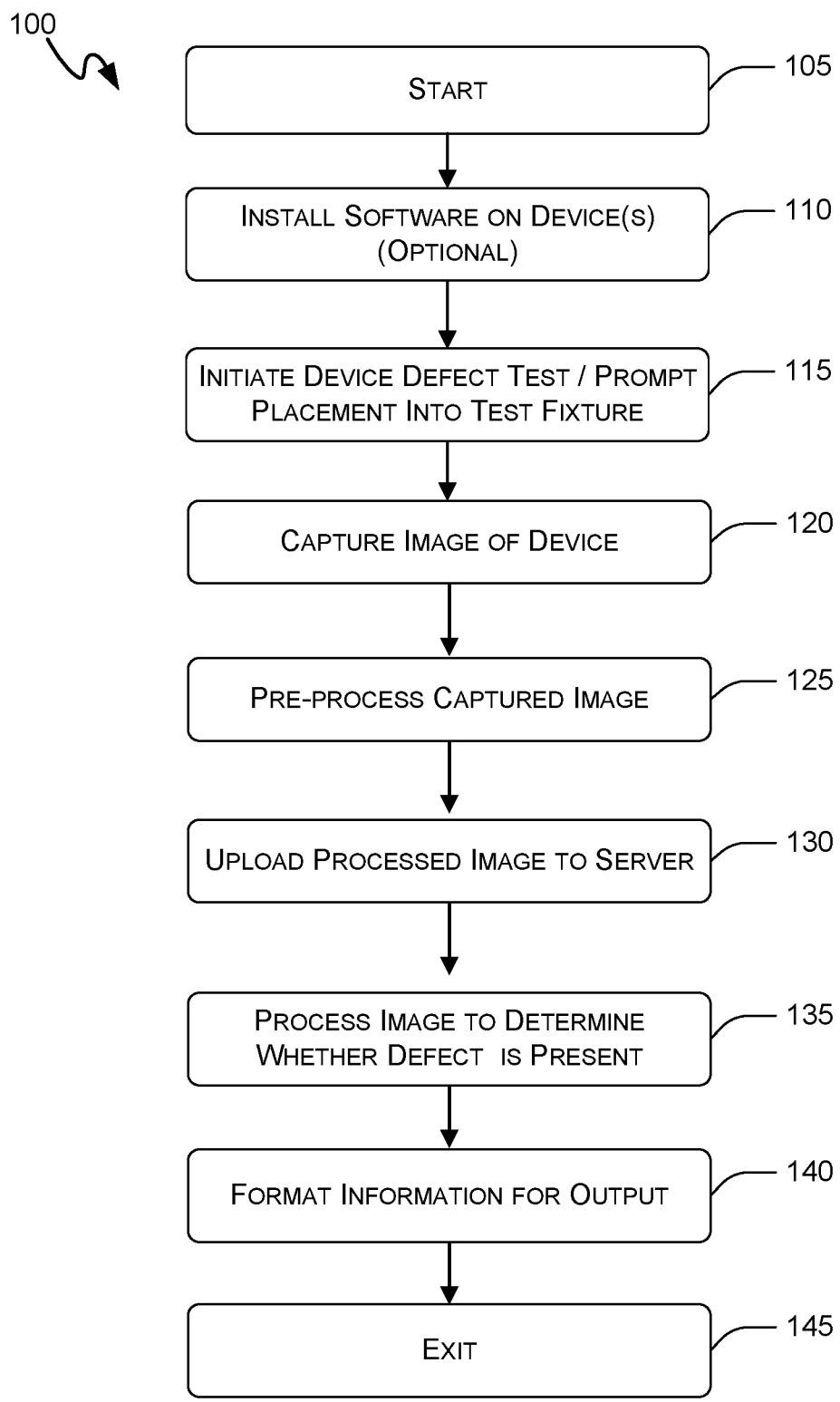
FIG. 2 illustrates a flow diagram of a process of the present invention.
Figure 3:
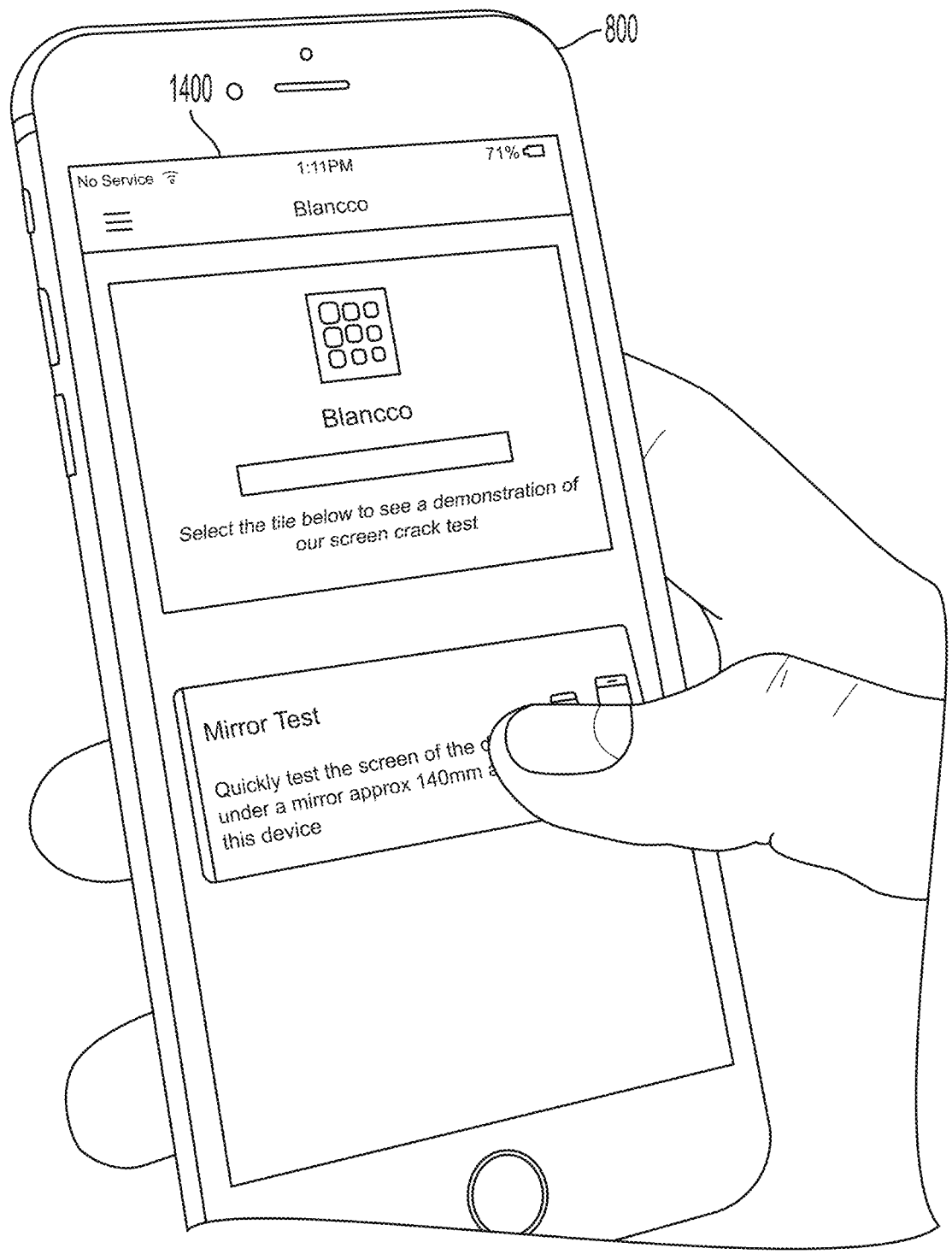
FIG. 3 shows a mobile device with a user initiating a process of the present invention.
Figure 4:
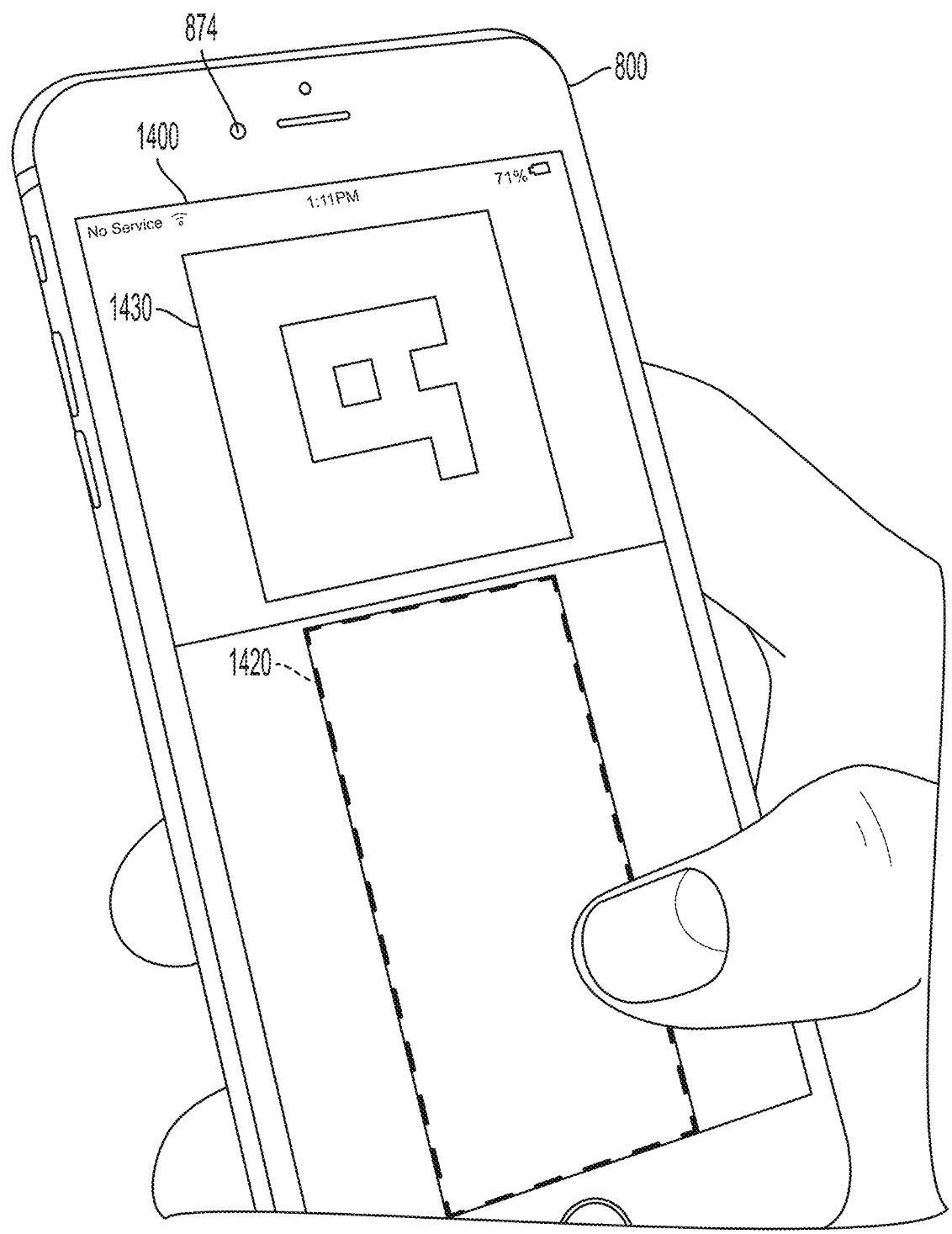
FIG. 4 shows a perspective view of mobile device with fiducials of the present invention.
Figure 4A:
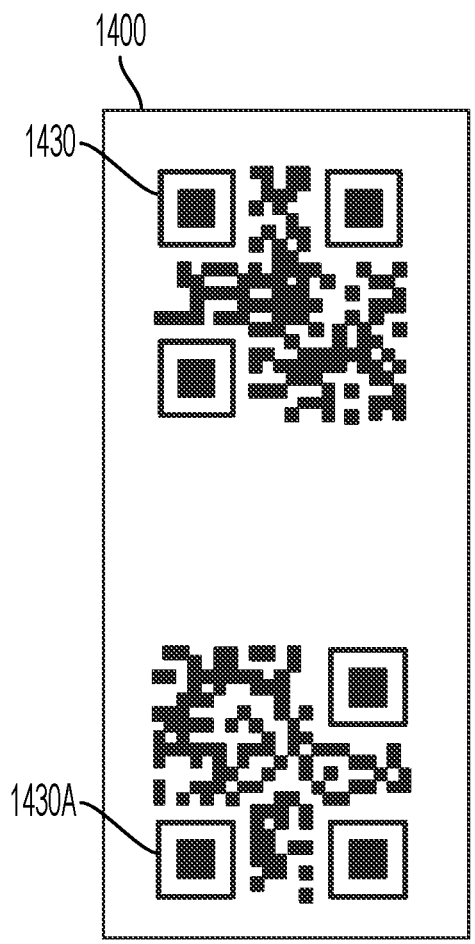
FIG. 4A shows a plan view of a display of a mobile device that is presenting two tracking fiducials as QR codes.
Figure 4B:
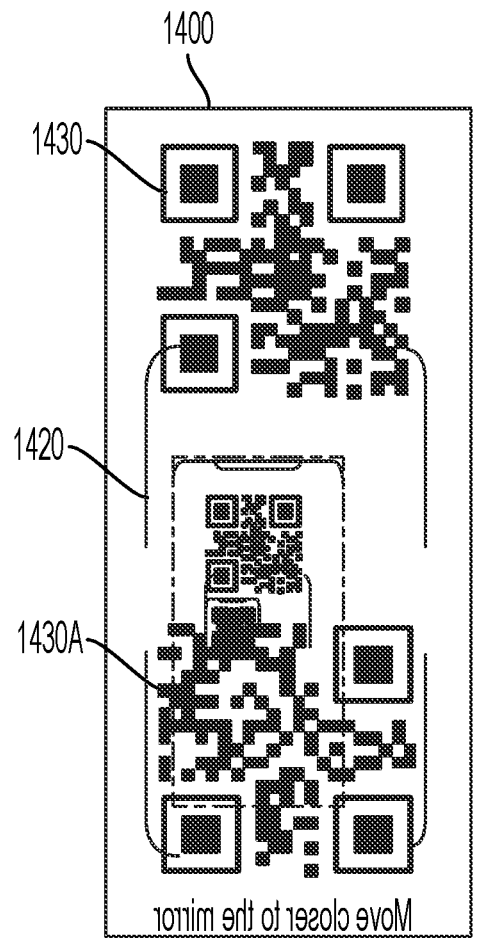
FIGS. 4B-4C show plan views of a display of a mobile device that is presenting two tracking fiducials as QR codes along with a second, or placement guidance fiducial.
Figure 4C:
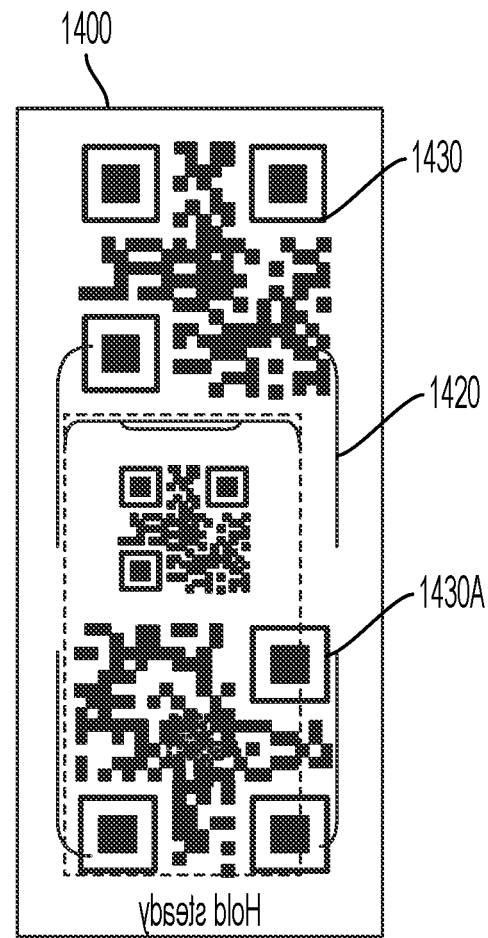
Figure 4D:
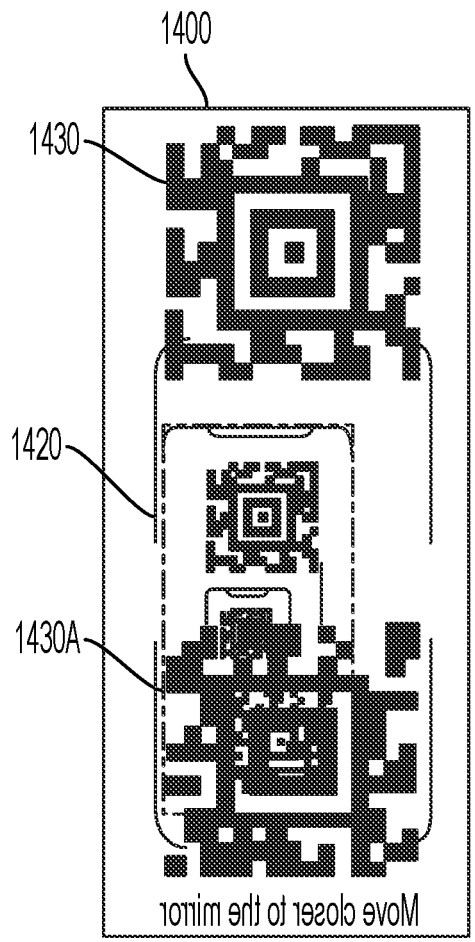
FIG. 4D shows a plan view of a display of a mobile device that is presenting two tracking fiducials as Aztec codes along with a second, or placement guidance fiducial.
Figure 5:
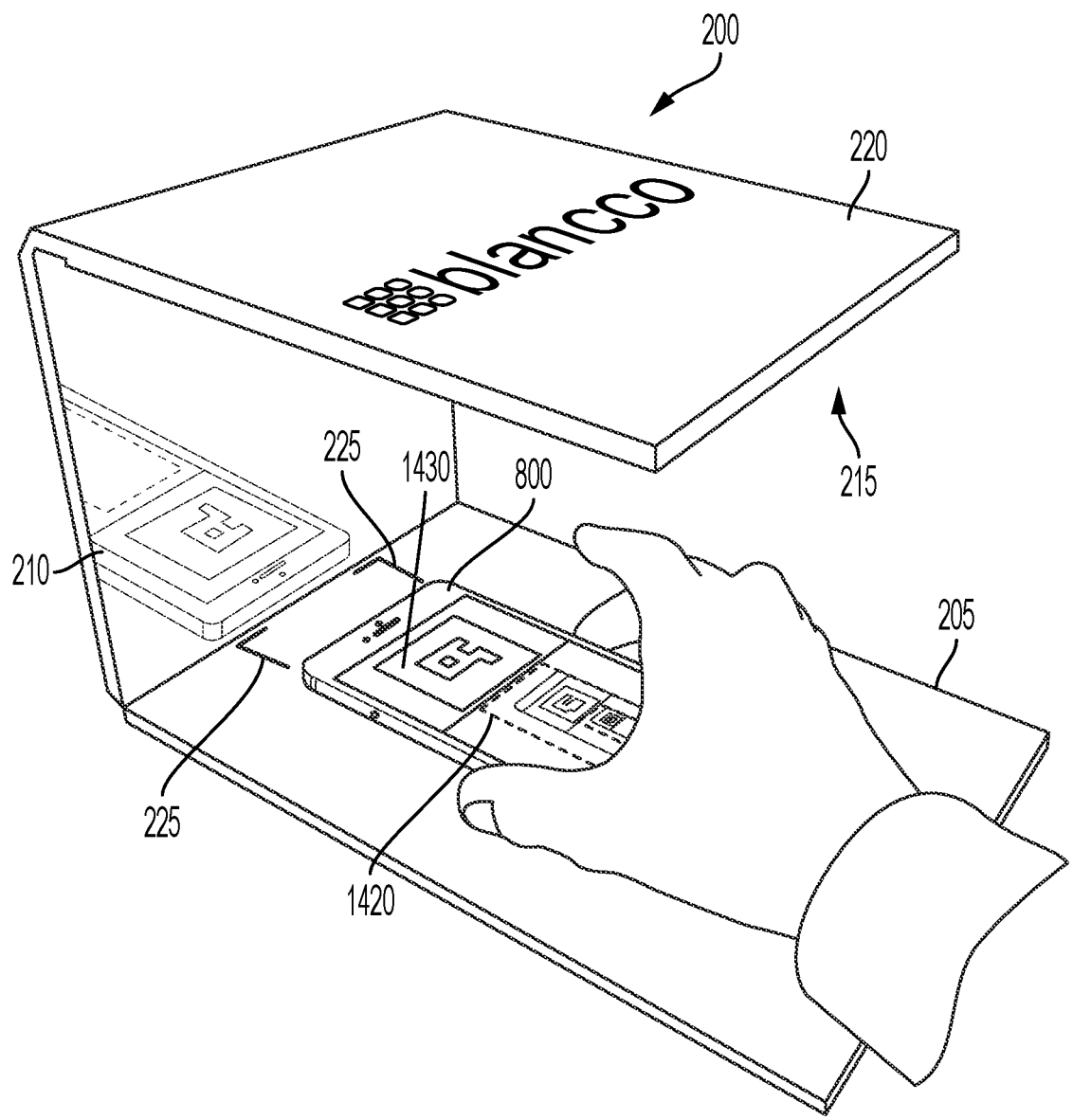
FIG. 5 illustrates placement of a mobile device in a test fixture of the present invention.
Figure 6:
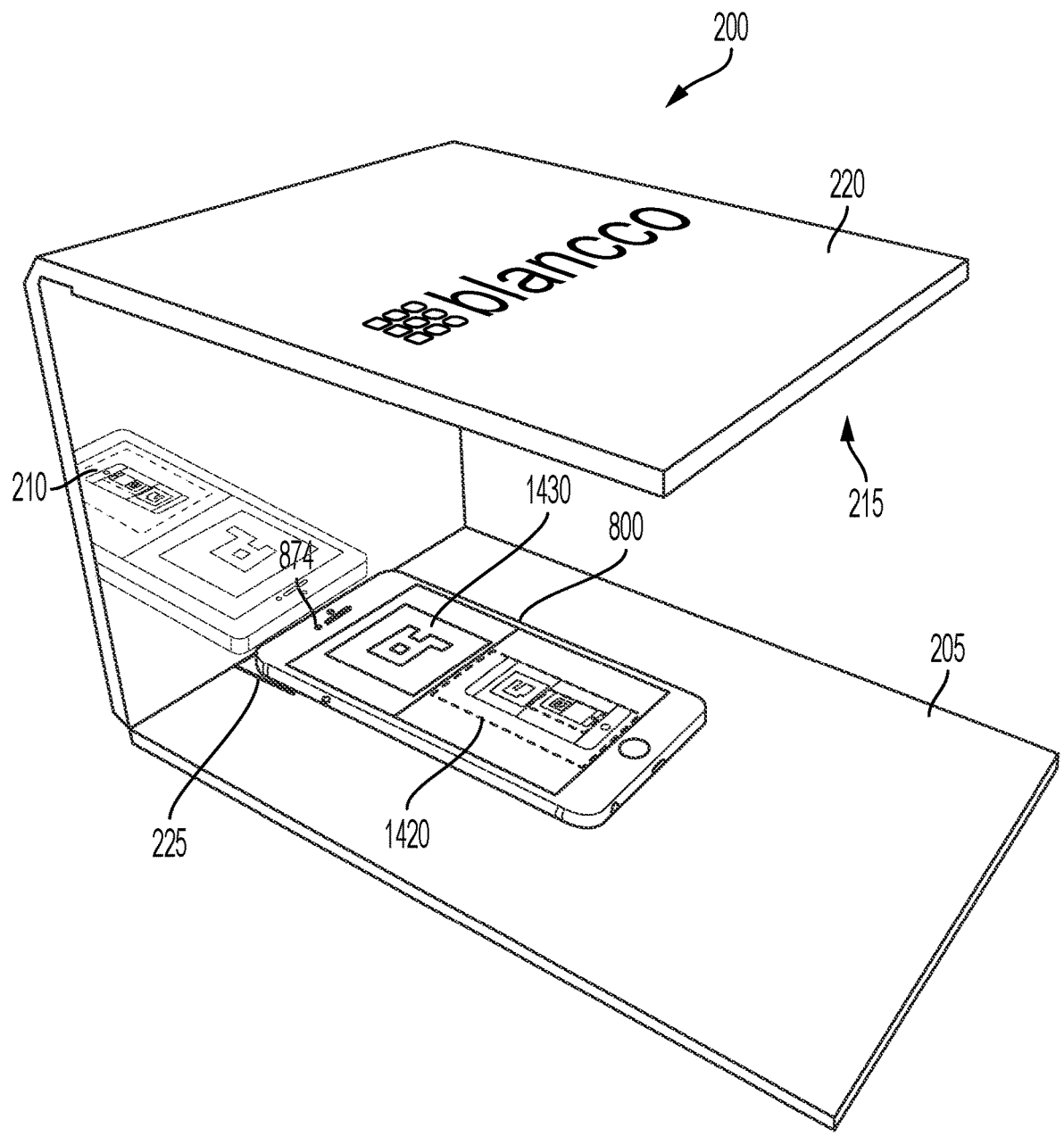
FIG. 6 shows a mobile device properly aligned in a test fixture of the present invention.
Figure 7:
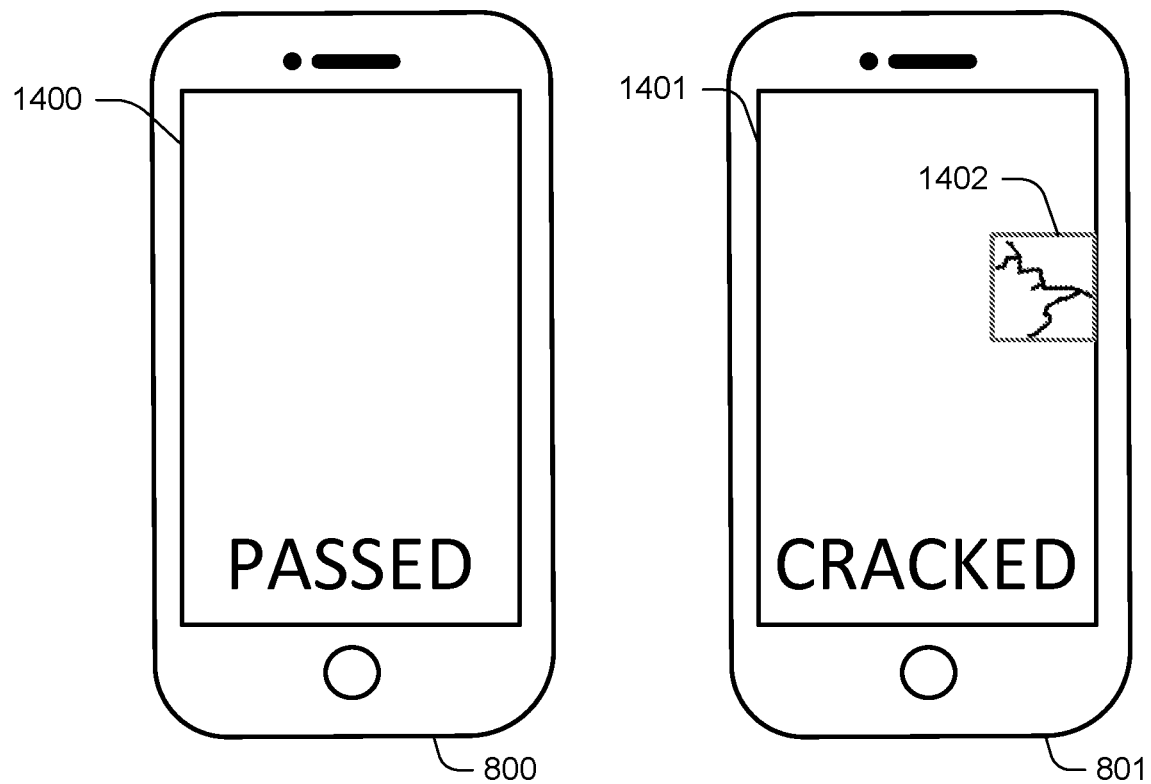
FIG. 7 illustrates mobile devices indicating pass or fail of testing.

FIG. 3 illustrates a method of the present invention utilizing aspects of the test fixture depicted in FIGS. 1A-1H, and more particularly intermediate results shown in FIGS. 3-7. Further, review of the mobile device and server architectures shown in FIGS. 1, 8, and 8A will provide additional context for the illustrated method. In the illustrated embodiment, systems and a methods are provided to identify a crack, housing defect, or other kind of defect associated with a mobile device through image analysis. Referring to the process 100 illustrated in FIG. 2, an app may be installed 110 on the mobile device that is desired to be tested 800. However, in one embodiment, a user of a mobile device 800 that is to be tested activates a web link to the server 860 through a web browser hosted by the operating system of the mobile device. In yet another embodiment, a combination of software installed or operating on the mobile device 800 and installed and operating on the server 860 may interoperate to perform the described methods. When ready, the user of the mobile device 800 initiates the device defect test 115, and as shown in FIG. 4, the display 1400 of the mobile device 800 displays a first fiducial 1430, also known as a tracking fiducial 1430 and a second fiducial 1420, also known as a placement guidance fiducial, indicating the mobile device 800 is ready for placement in the test fixture 200. In a preferred embodiment, the a second fiducial 1420 comprises an indicia that placement is not yet correctly sensed (indicated, in the illustrated picture, by a red outline) and an image as seen by the front-facing first camera 874 is displayed within the second fiducial 1420 (see FIGS. 5 and 6 showing images seen by the camera 874 displayed within the second fiducial 1420). Any desired graphic may be used as a first fiducial. In an alternate embodiment, shown in FIG. 4A, the display 1400 of the mobile device outputs two "first fiducials" 1430, 1430A as QR codes; the QR codes need not include any identifying information, may be encoded with random information, or may simply comprise information allowing optical tracking of the display 1400 of the mobile device. Using such first fiducials 1430, 1430A allow for determination of an orientation of a screen, and with predetermined placement locations on the screen, the first fiducials 1430, 1430A may allow for extrapolation of edge boundaries of the display 1400 based on known geometries of the device upon which the first fiducials are being displayed. Further, FIGS. 4B-4C show plan views of a display of a mobile device that is presenting two tracking fiducials as QR codes along with the second fiducial 1420, or placement guidance fiducial. In FIG. 4B, the second fiducial 1420 shows an improper alignment position with respect to a reflective surface, and in FIG. 4C, the second fiducial shows proper alignment position with respect to a reflective surface. As shown in FIGS. 4B-C, the second fiducial 1420 may include bounding boxes placed around the detected preview image of the mobile device 800, allowing the user to further determine orientation of the mobile device 800 with respect to a reflective surface. Additionally, FIG. 4D shows a plan view of a display of a mobile device that is presenting two tracking fiducials as Aztec codes along with a second, or placement guidance fiducial. Aztec codes are known to those of skill in the art as 2-D barcode devices that are detectable and trackable through cameras coupled to optical tracking software.

Figure 4E:
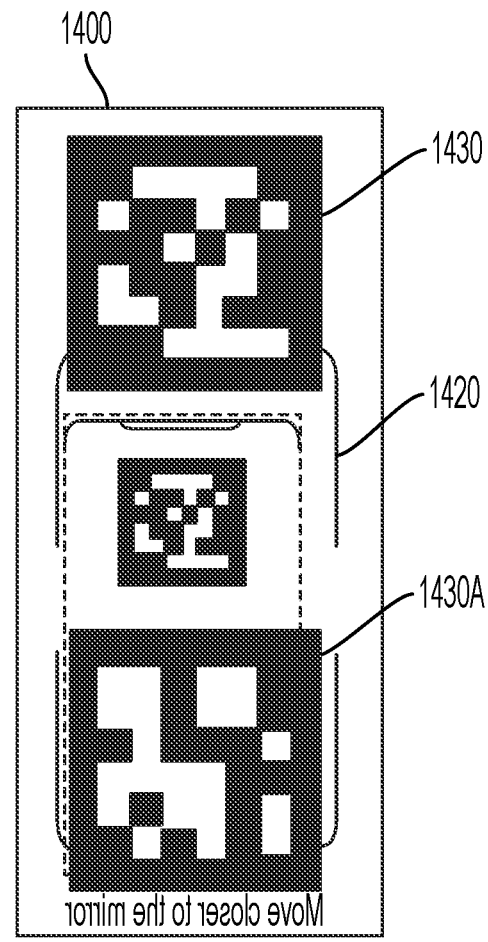
FIG. 4E illustrates a plan view of a display of a mobile device that is presenting two tracking fiducials as ArUco codes along with a second, or placement guidance fiducial.

Further, ArUco markers (or codes), are known to those of skill in the relevant arts as comprising synthetic square markers composed by a wide black border and an inner binary matrix. The ArUco library is a popular library for detection of square fiducial markers developed by Rafael Muñoz and Sergio Garrido, and a corresponding software library has been used by those of skill in the arts to detect these fiducials. As first fiducials, ArUco markers allow for tracking and orientation calculations for software accessing a mobile device's rear-facing camera sensor. Accordingly, FIG. 4E illustrates a plan view of a display of a mobile device that is presenting two tracking fiducials 1430, 1430A as ArUco markers/codes along with a second, or placement guidance fiducial 1420.

Considering FIGS. 4 and 4A-E, a purpose of the first fiducial 1430 (and alternatively along with a second first fiducial 1430A) is to provide a frame of reference on the display of the mobile device 800 that is unvarying and allows for tracking and determination of the position of the mobile device 800 in 3-space with respect to the reflecting device. The first fiducial may comprise any mark or marking that allows for tracking and position determination, and in preferred embodiments, need not include any encoded information. Although the location of the first fiducial 1430 is shown in FIG. 4 in an upper center in the display area 1400 of the mobile device 800, the first fiducial may be placed in any desired location to assist with position fixing of the mobile device 800. While not required for preferred embodiments, in alternative embodiments, the first fiducial 1430 may be modified to uniquely identify the particular mobile device 800 in which it is being displayed, thus preventing misidentification of other mobile devices that may be displaying fiducials in a multi-test environment. Such unique identifications may include a QR code with a serial number or other identifying indicia of the mobile device encoded therein. The second fiducial 1420 provides for guidance that assists the user with moving the mobile device 800 into appropriate position with respect to the reflection device so that an ideal image can be captured to minimize parallax distortion and errors, minimize or eliminate noise and undesired reflections, and to ensure that the front-facing camera 874 can capture an image of the entire mobile device 800 in its environment. In one embodiment, the front-facing camera 874 captures images in a real time live video preview mode, so as the mobile device 800 moves, the image shown in the display area near the second fiducial 1420 moves in real time. As shown in FIGS. 4, 5, and 6, 14A-D, the second fiducial 1420 is shaped as a colored parallelogram, so that when the mobile device 800 is properly aligned, the image seen by the front-facing camera 874 is displayed within the second fiducial 1420, and as mentioned in more detail below, the fiducial changes state to indicate proper alignment (such as by changing color from a red color to a green color, or other indications including text). Further, in alternate embodiments as shown in FIGS. 4A-E, the second fiducial 1420 may be shaped as a rounded rectangular area, whose color indicates mobile device 800 alignment status (such as red for unaligned and green for properly aligned) along with an optional preview image of the rear-facing camera's view of the mobile device (to assist the user with alignment and orientation).

Alternatively, a marker fiducial (not shown) may be output to the display of the mobile device 800, with known geometrical dimensions (and further, a scale such as a centimeter scale could be displayed). Since the mobile device 800 is executing its own software, it has access to its predetermined measurements, and the fiducial markers allow scaling of the display by the measured fiducial, and this allows the placement of a bounding box for the display and mobile device; thus in this approach, edge detection need not be relied upon solely to find the phone/display within the captured image.

Returning to FIG. 2, the user then places the mobile device 800 on the fixturing platform 205 (see also FIG. 5), and position detection software executes to locate the mobile device within the image obtained by the front facing first camera 874 and assess its placement (for example, by attempting to detect whether the first fiducial 1430 is visible within the camera's image, and the mobile device is properly placed). Proper placement detection may occur by a variety of approaches. If a user is utilizing the web-based server approach, a color is chosen (such as a unique color like bright magenta that is not likely to appear within a normal image) that color is output to the display in four corners of the mobile device's display 1400, and then color tracking is executed within the live video produced by the front-facing camera 874 to find the positions of the color elements within the four corners of the screen; this can be done, for instance, though use of a color tracking library to find the color locations in the image, (such as the exemplary bright magenta), look for the colors, then identify locations of the corners of the display 1400 within the video image. This information is then used to locate polygons within the image. Alternatively, the image can be analyzed to determine whether the first fiducial 1430 is present, and where it is located and its orientation in the image. Given a database of device types, a mobile device's own identification information to assist with further device outline identification and image pre- and post-processing.

Once it is determined that the mobile device 800 is properly placed, the second fiducial 1430 changes state to indicate proper placement, (see, e.g. green lines at FIG. 6 for second fiducial 1430) and the forward-facing first camera 874 of the mobile device captures an image (FIG. 3, 120).

In addition to the extensive pre-processing options discussed below in regards to FIG. 17, for example, particular types of checks on the captured image may be conducted, including, focus checks, brightness checks and/or blurriness evaluation. Further if it is determined that the current image is insufficient, another image can be re-captured 125 with different camera parameters. Additionally, the captured image may optionally pre-processed 125 by rotating the image to a portrait mode and/or fine rotating to reduce skew, and/or cropping the image to a desired aspect ratio. The captured (and optionally pre-processed) image is then uploaded 130 to a server (such as server 860). Depending on any necessary compliance with applicable laws such as the GDPR, the user may be first prompted to upload the file before the image file transferred to the server 860, and optionally, the user may be given the opportunity to review the captured image and re-capture the image if desired. Once upload begins, a progress bar may be output to the display 1400 to indicate progress of the upload.

Figure 18:
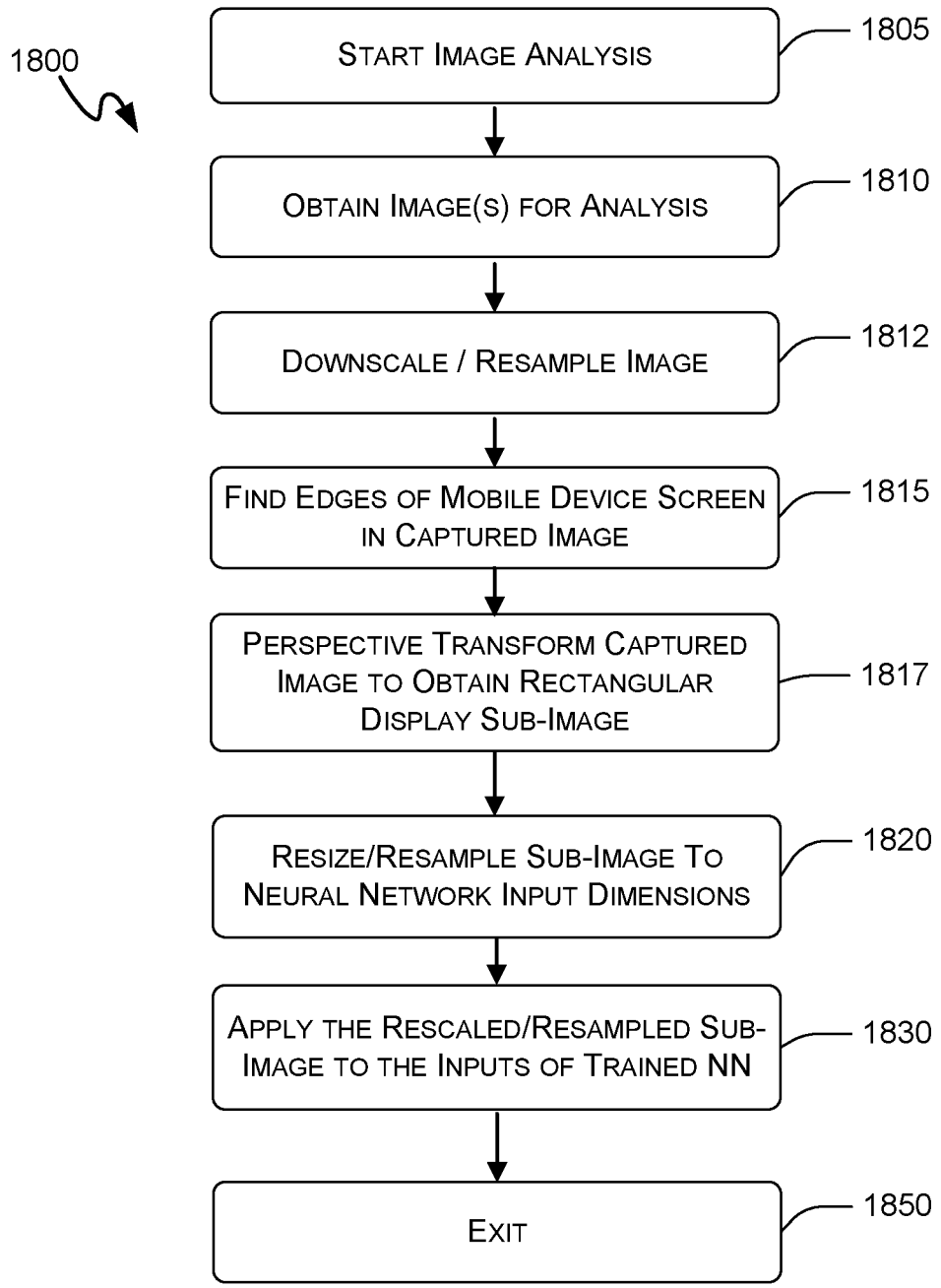
FIG. 18 illustrates a process flow diagram of the present invention, providing more detail regarding an exemplary image pre-processing method.

As discussed further in regards to FIG. 18, the uploaded image is processed 135 to determine whether any cracks or other types of defects are present. Alternatively, or in combination, the extent and characteristics of the screen cracks or defects are characterized by the processing step 135 for further analysis and reporting. Once the analysis 135 of any potential defects is complete, the resulting information is formatted 140 for presentation, storage, or display to any user for any necessary purpose, such as for assessment of whether the mobile device 800 is in proper working condition. In one embodiment, information is returned from the server to the mobile device to indicate the outcome of the analysis; if no defects were found, a success indicator may be displayed (See FIG. 6, e.g. "PASSED" as shown) on the screen 1400 of the mobile device 800. Further, if a defect is found, as discussed in more depth. below, a bounding box for the defect found in the mobile device 801 (the illustrated crack) may be surrounded by a graphical bounding box 1402, such as the illustrated red box, and an indicator displayed that shows that the diagnostics detected a failure criterion (e.g. "CRACKED" shown). The process then exits 145.

Figure 8:
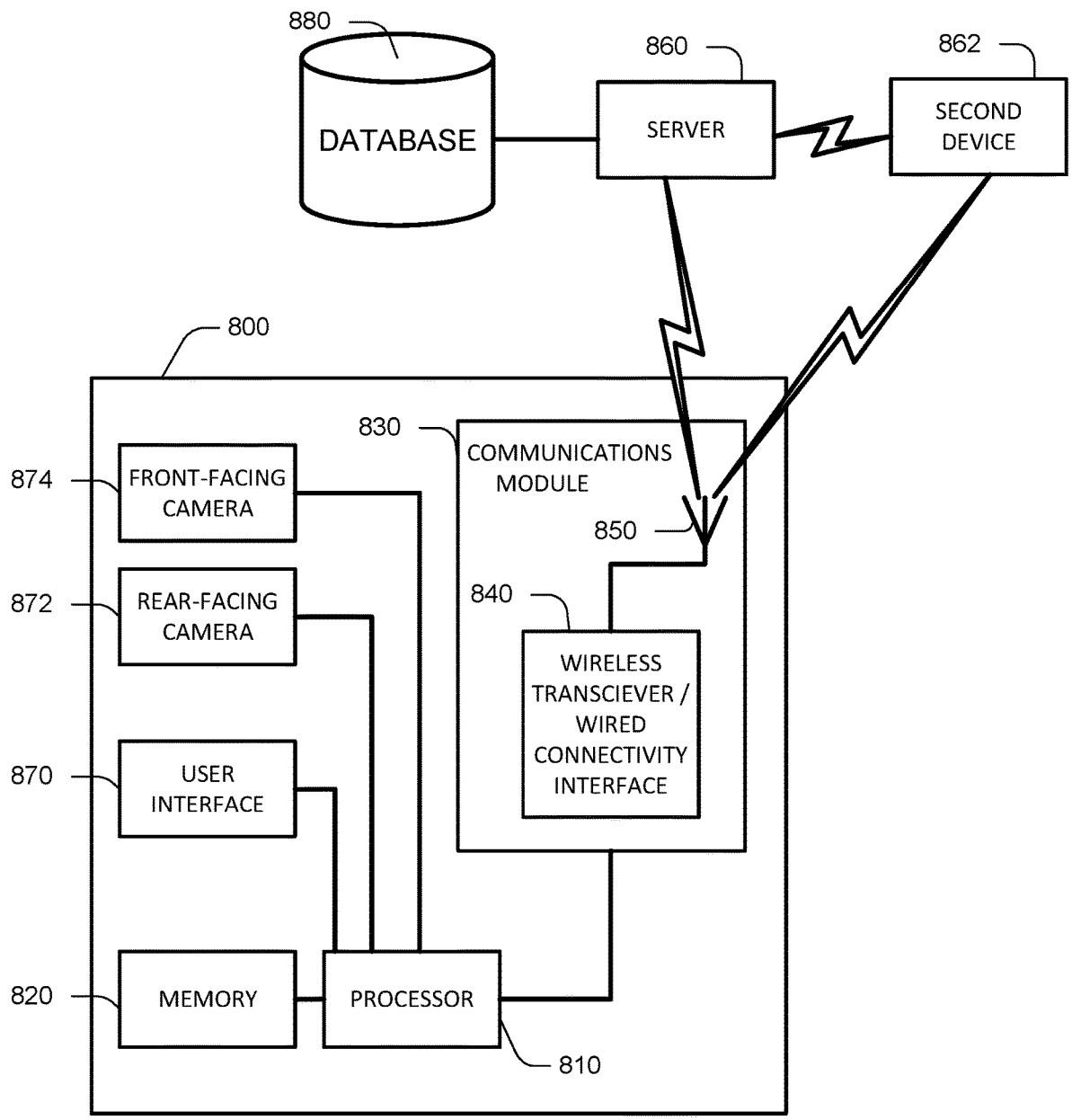
FIG. 8 illustrates a block diagram of a system embodiment of the present invention.

The exemplary system depicted in FIG. 8 comprises a mobile device 800 that includes a processor 810 coupled to a memory 820 which may include volatile memory, non-volatile memory (such as FLASH memory) or a combination thereof. A communications module 830 comprises a wireless transceiver 840 for wirelessly communicating with one or more servers 860 and other entities through antenna 850, although those of skill in the art may appreciate that a wired connection may be established to provide connectivity in lieu of or in addition to the wireless connection. The mobile device also includes a user interface 870 coupled to the processor 810. The mobile device 800 may include any suitable power source, such as a battery (not shown). The mobile device 800 may include any other desired components, such as a global positioning system (GPS) to provide geolocation information for locating the mobile device. Some or all of the components of the mobile device 800 may include (or be in communication with) a hardware identification module (not shown) such as a universal subscriber identity module and/or removable user identity module. The hardware identification module may be coupled to the processor 810 and may include an identifier that can be compared to a predetermined identifier to determine whether the hardware of the mobile device 800 has been altered. The hardware identification module (and predetermined identifier) may include any suitable identifier, such as an electronic serial number, a local area identity identifier, an integrated circuit identifier, an international mobile subscriber identifier, an authentication key identifier, and/or an operator-specific emergency number identifier. The identifier may be stored in the memory 820 and transmitted to the host server 860 for comparison to a predetermined identifier.

The functionality of the mobile device 800, including the methods described herein (in whole or in part), may be implemented through the processor 810 executing computer-readable instructions stored in the memory 820 of the mobile device 800. The memory 820 may store any computer-readable instructions and data, including software applications, user-installed or third-party-installed "apps," applets, and embedded operating code.

Additionally, software applications installed in the mobile device (or interfaced in any way to the processor 810) may be configured to operate with minimal underlying hardware functionality. For example, such application may be initiated before the mobile device establishes a network connection. Such a situation may be provided, for instance, when the software application is installed on a SIM card in the mobile device, and the application launches before other software in the mobile device operating system. Alternately or in addition, a data element such as a link or a URL (universal resource locator) may reside on the SIM card, and by launching an application such as a browser with the URL or link, an application referenced by the link or URL may be loaded into the mobile device from a remote server and/or executed directly from on the remote server.

Software performing methods of the present invention may be provided with the device or downloaded onto the mobile device by an authorized user. The functionality of the mobile device 800 may also be implemented through various hardware components storing machine-readable instructions, such as application-specific integrated circuits (ASICs), field-programmable gate arrays (FPGAs) and/or complex programmable logic devices (CPLDs). Systems according to aspects of the present invention may operate in conjunction with any desired combination of software and/or hardware components.

The processor 810 retrieves and executes instructions stored in the memory 820 to control the operation of the mobile device 800. Any number and type of processor such as an integrated circuit microprocessor, microcontroller, and/or digital signal processor (DSP), can be used in conjunction with the present invention. The memory 820 stores instructions, data, messages transmitted from (or received by) the mobile device 800, and any other suitable information. A memory 820 operating in conjunction with the present invention may include any combination of different memory storage devices, such as hard drives, random access memory (RAM), read only memory (ROM), FLASH memory, or any other type of volatile and/or nonvolatile memory. Data can be stored in the memory 820 in any desired manner.

The communications interface 830 communicates with one or more servers 860 or other suitable entities. Any suitable communications device, component, system, and method may be used in conjunction with the present invention. For example, the wireless transceiver 840 may be configured to communicate using any number and type of cellular protocols, such as General Packet Radio Service (GPRS), Global System for Mobile Communications (GSM), Enhanced Data rates for GSM Evolution (EDGE), Personal Communication Service (PCS), Advanced Mobile Phone System (AMPS), Code Division Multiple Access (CDMA), Wideband CDMA (W-CDMA), Time Division-Synchronous CDMA (TD-SCDMA), Universal Mobile Telecommunications System (UMTS), and/or Time Division Multiple Access (TDMA). A mobile device operating in conjunction with the present invention may alternatively (or additionally) include wireless transceiver(s) (and related components) to communicate using any other method of wireless communication protocol, such as an ISO 14443 protocol, an ISO 18000-6 protocol, a Bluetooth protocol, a Zigbee protocol, a Wibree protocol, a WiFi protocol, an IEEE 802.15 protocol, an IEEE 802.11 protocol, an IEEE 802.16 protocol, an ultra-wideband (UWB) protocol; an IrDA protocol, and combinations thereof. The antenna 850 may be configured to transmit and receive any wireless signal in any format, and may comprise a plurality of different antennas to transmit and receive using different wireless protocols.

The communications module 830 can communicate with the server 860 or another device 862 using any other form of connection (as the other device 862 may likewise communicate with the server 860), such as a wired Internet connection, a wireless Internet connection, a cellular telephone network connection (including a data link connection), a wireless LAN connection, a wireless WAN connection, an optical connection, a USB connection, a Bluetooth connection, a mobile device synchronization port connection, a power connection, and/or a security cable. The communications module 830 can be used to communicate with one or more companion devices to monitor the position or status of the mobile device 800 (e.g., by monitoring whether a communication link between the mobile device and companion device is intact), as well as with any number of other devices to help track/locate a lost or stolen mobile device 800.

The mobile device 800 includes a user interface 870. The user interface 870 may include any number of input devices (not shown) to receive commands, data, and other suitable input from a user, as well as any number of output devices (not shown) to provides the user with data, notifications, and other suitable information from the mobile device 800.

Any number of input devices may be included in the user interface 870 such as a touch pad, a touch screen, a display that may or may not be integrated with a touch screen, and/or an alphanumeric keypad to allow a user to enter instructions and data into the mobile device 800. The term "touch screen" for purposes of the present application comprises a display integrated with or in close proximity to a touch interface that is capable of determining when a user applies physical connection to a location proximate the display. The touch screen may have sensors that can measure parameters from the user's interaction, and such sensors may measure capacitance, resistance, pressure, or differential readings resulting from movement of a "touch" to the screen. The user interface 870 may be configured to detect pressure exerted by a user on the keys of a keypad (virtually implemented on the display, or as a physical array of key switches), as well as the time interval between key presses in order to determine if the current user is authorized to use the device. The user interface may also include a microphone to allow the user to provide audio data to the mobile device 800, as well one or more cameras (874, 872) to allow the mobile device to capture still or video images. In one embodiment, the mobile device 800 comprises a front-facing camera 874 that faces the user of the mobile device when the device is in normal operation, and a rear-facing camera 872 on an opposite side of the mobile device; such cameras are coupled to the processor 810. The mobile device 800 may include speech recognition software to process verbal input through the user interface 870. The user interface 870 may also include any number of suitable output devices, such as a display screen to visually display information (such as video and text), and/or a speaker to provide auditory output. The display of the mobile device may be configured to sense user touches by any appropriate means, such as capacitive sensing, pressure sensing, gel displacement sensing, resistive sensing, or any other appropriate or conventional touch sending technology utilized by those of skill in the relevant arts. The mobile device 800 may be configured to provide words, phrases, tones, recorded music, or any other type of auditory output to a user through the speaker. As discussed previously, the user interface 870 can be activated to provide information and/or hinder the operation of the mobile device 800 when an unauthorized user attempts to use the mobile device 800. For example, the illumination level of the display may be modulated to draw attention to the mobile device, and unpleasant and/or loud sounds can be played over the speaker.

The mobile device 800 may include one or more biometric devices configured to receive biometric information, such as a fingerprint scanner, an iris scanner, a retinal scanner, and/or a breath analyzer. Input devices such as a microphone or camera may also be utilized to perform biometric analyses, such as a voice analysis or facial recognition. Further, the mobile device may include a magnetometer for measuring magnetic fields (such as may be utilized in an electronic compass), a MEMS or other type of gyroscope for measuring attitude, and accelerometers for measuring changes in movement of the mobile device.

Information provided or received by the user interface 870 may be in any appropriate format. For example, a user interface that communicates information to a user in an auditory format may first provide a data header followed by a data value to identify the data to the user. The user interface 870 may provide information in any number of desired languages, regardless of whether the information is provided audibly or visually.

The user interface can also provide/receive information to a user in a machine-readable format. In one exemplary embodiment of the present invention, for example, the user interface 870 of a mobile device 800 may send and receive messages using dual-tone multi-frequency (DTMF) tones. The mobile device 800 can be configured to send, receive, and process machine-readable data can in any standard format (such as a MS Word document, Adobe PDF file, ASCII text file, JPEG, or other standard format) as well as any proprietary format. Machine-readable data to or from the user interface may also be encrypted to protect the data from unintended recipients and/or improper use. In an alternate embodiment, a user must enter a passcode to enable use of some or all of the functionality of the mobile device 800. Any other user interface feature may be utilized to allow a human or non-human user to interact with one or more devices operating in conjunction with the present invention.

The mobile device 800 may include any other suitable features, components, and/or systems. For example, the mobile device 800 may be configured to preserve the life of its battery by shutting off some or all of its components, such as a camera or microphone. Components can be selectively shut down in response to a security compromise event, as well as in response to a command from an authorized user or security authority. Alternately, the mobile device 800 can be configured to use its components excessively to drain the battery as quickly as possible, to, for example, limit the usefulness of the mobile device 800 to an unauthorized user.

The mobile device 800 may be configured to implement one or more security measures to protect data, restrict access, or provide any other desired security feature. For example, a mobile device 800 may encrypt transmitted data and/or data stored within or created by the device itself. Such security measures may be implemented using hardware, software, or a combination thereof. Any method of data encryption or protection may be utilized in conjunction with the present invention, such as public/private keyed encryption systems, data scrambling methods, hardware and software firewalls, tamper-resistant or tamper-responsive memory storage devices or any other method or technique for protecting data. Similarly, passwords, biometrics, access cards or other hardware, or any other system, device, and/or method may be employed to restrict access to any device operating in conjunction with the present invention.

Figure 8A:
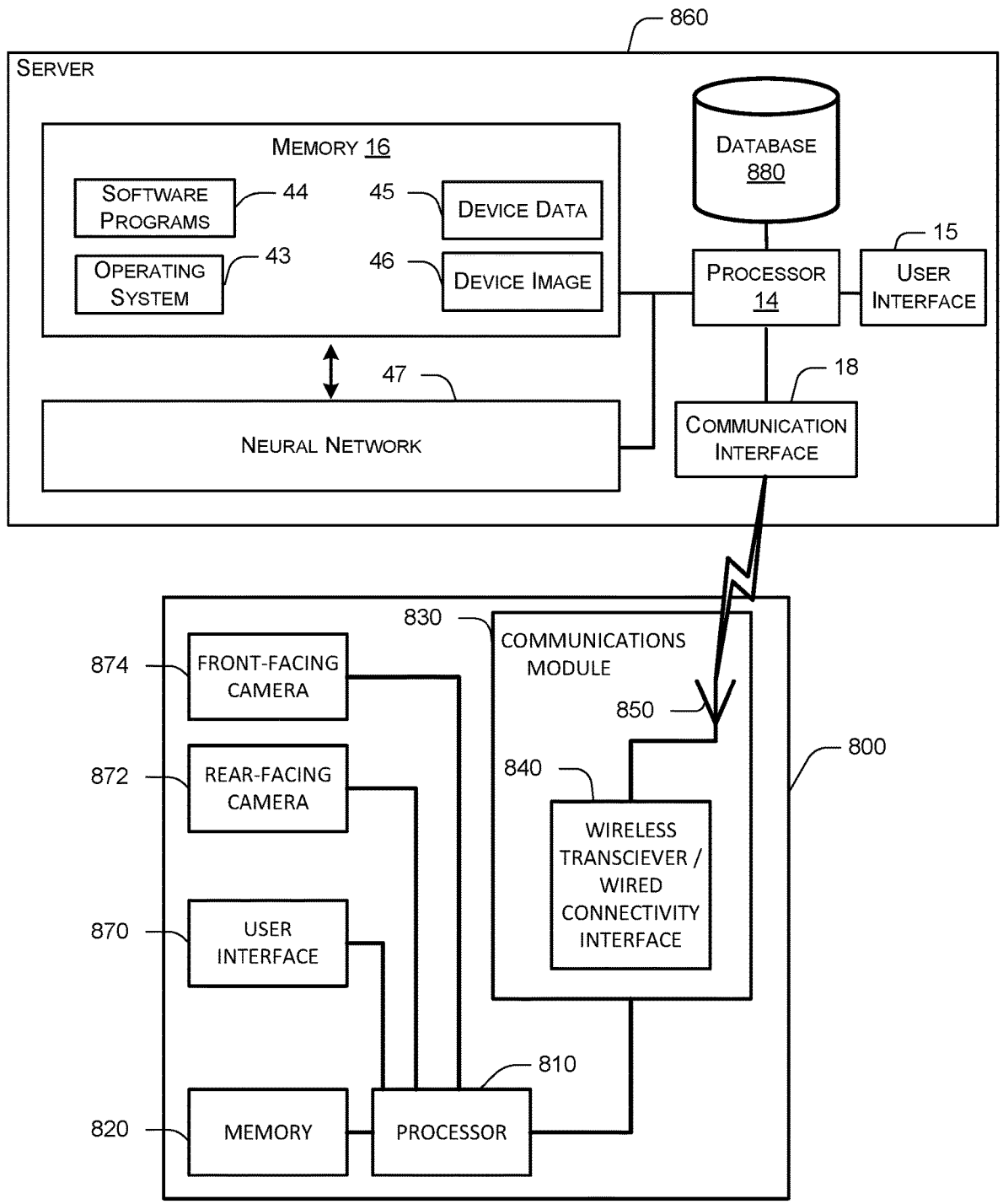
FIG. 8A illustrates an alternate block diagram of a system embodiment of the present invention.

The exemplary system depicted in FIG. 8A comprises a mobile device 800 that includes a processor 810 coupled to a memory 820 which may include volatile memory, nonvolatile memory (such as FLASH memory) or a combination thereof. A communications module 830 comprises a wireless transceiver 840 for wirelessly communicating with one or more servers, such as host server 860 and other entities through antenna 850, although those of skill in the art may appreciate that a wired connection may be established to provide connectivity in lieu of or in addition to the wireless connection. The mobile device also includes a user interface 870 coupled to the processor 810. The mobile device 800 may include any suitable power source, such as a battery (not shown). The mobile device 800 may include any other desired components, such as a global positioning system (GPS) to provide geolocation information for locating the mobile device. Some or all of the components of the mobile device 800 may include (or be in communication with) a hardware identification module (not shown) such as a universal subscriber identity module and/or removable user identity module. The hardware identification module may be coupled to the processor 810 and may include an identifier that can be compared to a predetermined identifier to determine whether the hardware of the mobile device 800 has been altered. The hardware identification module (and predetermined identifier) may include any suitable identifier, such as an electronic serial number, a local area identity identifier, an integrated circuit identifier, an international mobile subscriber identifier, an authentication key identifier, and/or an operator-specific emergency number identifier. The identifier may be stored in the memory 820 and transmitted to the host server 860 for comparison to a predetermined identifier.

The functionality of the mobile device 800, including the methods described herein (in whole or in part), may be implemented through the processor 810 executing computer-readable instructions stored in the memory 820 of the mobile device 800. The memory 820 may store any computer-readable instructions and data, including software applications, user-installed or third-party-installed "apps," applets, and embedded operating code.

Additionally, the software application may be configured to operate with minimal underlying hardware functionality. For example, the application may be initiated before the mobile device establishes a network connection. Such a situation may be provided, for instance, when the software application is installed on a SIM card in the mobile device, and the application launches before other software in the mobile device operating system. Alternately or in addition, a data element such as a link or a URL (universal resource locator) may reside on the SIM card, and by launching an application such as a browser with the URL or link, an application referenced by the link or URL may be loaded into the mobile device from a remote server and/or executed directly from on the remote server.

Software performing methods of the present invention may be provided with the device or downloaded onto the mobile device by an authorized user, and/or may be further resident in memory 16 of the host server 860 and executable by the server processor 14. The functionality of the mobile device 800 as well as the host server 860 may also be implemented through various hardware components storing machine-readable instructions, such as application-specific integrated circuits (ASICs), field-programmable gate arrays (FPGAs) and/or complex programmable logic devices (CPLDs), graphics processing units (GPUs), and neural network processing or simulation circuits. Systems according to aspects of the present invention may operate in conjunction with any desired combination of software and/or hardware components.

The processor 810 retrieves and executes instructions stored in the memory 820 to control the operation of the mobile device 800. Similarly the server processor 14 retrieves and executes instructions stored in the server memory 16 to control the operation of the host server 860. Any number and type of processor such as an integrated circuit microprocessor, microcontroller, and/or digital signal processor (DSP), can be used in conjunction with the present invention. The memory 820 stores instructions, data, messages transmitted from (or received by) the mobile device 800, and any other suitable information, and the server memory 16 similarly stores instructions, data, messages transmitted from (or received by) the host server 860, and any other suitable information. A memory 820 and server memory 16 operating in conjunction with the present invention may include any combination of different memory storage devices, such as hard drives, random access memory (RAM), read only memory (ROM), FLASH memory, or any other type of volatile and/or nonvolatile memory. Data can be stored in the memory 820 or server memory 16 in any desired manner.

The communications interface 830 communicates with one or more servers such as host server 860, or other suitable entities. In like manner, the communication interface 18 of the host server is configured to communicate with the mobile device 800, a general network such as the Internet, or any other suitable entity. Any suitable communications device, component, system, and method may be used in conjunction with the present invention. For example, the wireless transceiver 840 may be configured to communicate using any number and type of cellular protocols, such as General Packet Radio Service (GPRS), Global System for Mobile Communications (GSM), Enhanced Data rates for GSM Evolution (EDGE), Personal Communication Service (PCS), Advanced Mobile Phone System (AMPS), Code Division Multiple Access (CDMA), Wideband CDMA (W-CDMA), Time Division-Synchronous CDMA (TD-SCDMA), Universal Mobile Telecommunications System (UMTS), and/or Time Division Multiple Access (TDMA). A mobile device operating in conjunction with the present invention may alternatively (or additionally) include wireless transceiver(s) (and related components) to communicate using any other method of wireless communication protocol, such as an ISO 14443 protocol, an ISO 18000-6 protocol, a Bluetooth protocol, a Zigbee protocol, a Wibree protocol, a WiFi protocol, an IEEE 802.15 protocol, an IEEE 802.11 protocol, an IEEE 802.16 protocol, an ultra-wideband (UWB) protocol; an IrDA protocol, and combinations thereof; and further, the communication interface 18 of host server 860 may be configured to operate with such protocols to communicate with the mobile device 800 or any other device. The antenna 850 may be configured to transmit and receive any wireless signal in any format, and may comprise a plurality of different antennas to transmit and receive using different wireless protocols.

The communications module 830 can communicate with the server 860 or another device using any other form of connection, such as a wired Internet connection, a wireless Internet connection, a cellular telephone network connection (including a data link connection), a wireless LAN connection, a wireless WAN connection, an optical connection, a Firewire connection, Thunderbolt connection, a Lightening port connection, an e-SATA connection, a USB connection, a mobile device synchronization port connection, a power connection, and/or a security cable. The communications module 830 can be used to communicate with one or more companion devices to monitor the position or status of the mobile device 800 (e.g., by monitoring whether a communication link between the mobile device and companion device is intact), as well as with any number of other devices to help track/locate a lost or stolen mobile device 800.

The mobile device 800 includes a user interface 870. The user interface 870 may include any number of input devices (not shown) to receive commands, data, and other suitable input from a user, as well as any number of output devices (not shown) to provide the user with data, notifications, and other suitable information from the mobile device 800. Likewise, the host server 860 includes user interface 15, and may include any number of input devices (not shown) to receive commands, data, and other suitable input from a user or third party, as well as any number of output devices (not shown) to provide the user/third party with data, notifications, and other suitable information from the host server 860.

Any number of input devices may be included in the user interfaces 870, 15 such as touch pads, touch screens, a mouse/trackball/trackpad, a microphone, and/or an alphanumeric keypad to allow a user to enter instructions and data into the mobile device 800 and host server 860. The term "touch screen" for purposes of the present application may include a display integrated with or in close proximity to a touch interface that is capable of determining when a user applies physical connection to a location proximate the display. The touch screen may have sensors that can measure parameters from the user's interaction, and such sensors may measure capacitance, resistance, pressure, or differential readings resulting from movement of a "touch" to the screen. The user interface 870 may be configured to detect pressure exerted by a user on the keys of a keypad (virtually implemented on the display, or as a physical array of key switches), as well as the time interval between key presses in order to determine if the current user is authorized to use the device. The user interface 870 may also include a microphone to allow the user to provide audio data to the mobile device 800, as well one or more cameras to allow the mobile device to capture still or video images. Similarly, the user interface 15 of the host server 860 may include a microphone to allow a user to provide audio data to the host server 860, as well one or more cameras to allow the server 860 to capture still or video images. In one embodiment, the mobile device 800 comprises a front-facing camera 874 that faces the user when the device is in operation, and a rear-facing camera 872 on an opposite side of the mobile device. The mobile device 800 may include speech recognition software to process verbal input through the user interface 870. The user interface 870, and similarly the server user interface 15 may also include any number of suitable output devices, such as a display screen to visually display information (such as video and text), and/or a speaker to provide auditory output. The display of the mobile device may be configured to sense user touches by any appropriate means, such as capacitive sensing, pressure sensing, gel displacement sensing, resistive sensing, or any other appropriate or conventional touch sending technology utilized by those of skill in the relevant arts. The mobile device 800 may be configured to provide words, phrases, tones, recorded music, or any other type of auditory output to a user through the speaker. As discussed previously, the user interface 870 can be activated to provide information and/or hinder the operation of the mobile device 800 when an unauthorized user attempts to use the mobile device 800. For example, the illumination level of the display may be modulated to draw attention to the mobile device, and unpleasant and/or loud sounds can be played over the speaker.

The mobile device 800 may include one or more biometric devices configured to receive biometric information, such as a fingerprint scanner, an iris scanner, a retinal scanner, and/or a breath analyzer. Input devices such as a microphone or camera may also be utilized to perform biometric analyses, such as a voice analysis or facial recognition. Further, the mobile device may include a magnetometer for measuring magnetic fields (such as may be utilized in an electronic compass), a MEMS or other type of gyroscope for measuring attitude, and accelerometers for measuring changes in movement of the mobile device.

Information provided or received by the user interfaces 870, 15 may be in any appropriate format. For example, a user interface that communicates information to a user in an auditory format may first provide a data header followed by a data value to identify the data to the user. The user interfaces 870, 15 may provide information in any number of desired languages, regardless of whether the information is provided audibly or visually.

The user interfaces 870, 15 can also provide/receive information to a user in a machine-readable format. In one exemplary embodiment of the present invention, for example, the user interface 870 of a mobile device 800 may send and receive messages using dual-tone multi-frequency (DTMF) tones. The mobile device 800 and host server 860 can be configured to send, receive, and process machine-readable data in any standard format (such as a MS Word document, Adobe PDF file, ASCII text file, JPEG, or other standard format) as well as any proprietary format. Machine-readable data to or from the user interfaces 830, 15 may also be encrypted to protect the data from unintended recipients and/or improper use. In an alternate embodiment, a user must enter a passcode to enable use of some or all of the functionality of the mobile device 800. Any other user interface feature may be utilized to allow a human or non-human user to interact with one or more devices operating in conjunction with the present invention.

The mobile device 800 may include any other suitable features, components, and/or systems. For example, the mobile device 800 may be configured to preserve the life of its battery by shutting off some or all of its components, such as a camera or microphone. Components can be selectively shut down in response to a security compromise event, as well as in response to a command from an authorized user or security authority. Alternately, the mobile device 800 can be configured to use its components excessively to drain the battery as quickly as possible, to, for example, limit the usefulness of the mobile device 800 to an unauthorized user.

The mobile device 800 may be configured to implement one or more security measures to protect data, restrict access, or provide any other desired security feature. For example, a mobile device 800 may encrypt transmitted data and/or data stored within or created by the device itself. Such security measures may be implemented using hardware, software, or a combination thereof. Any method of data encryption or protection may be utilized in conjunction with the present invention, such as public/private keyed encryption systems, data scrambling methods, hardware and software firewalls, tamper-resistant or tamper-responsive memory storage devices or any other method or technique for protecting data. Similarly, passwords, biometrics, access cards or other hardware, or any other system, device, and/or method may be employed to restrict access to any device operating in conjunction with the present invention.

The host server 860 communicates with mobile devices 800, authorized users, unauthorized users, security authorities, (insurance agencies in particular) and other entities to monitor and protect the mobile devices 800 from unauthorized use and to mitigate the harm associated with a security compromise event or attempted fraud. The host server 860 may comprise any number of separate computer systems, processors, and memory storage devices, as well as human operators (e.g., to answer calls from authorized users reporting the loss/theft of a mobile device) and any other suitable entity. The host server 860 may include, or be in communication with, one or more databases 880 storing information regarding authorized users and mobile devices 800 in order to monitor and track the mobile devices 800 and provide instructions to the mobile devices 800 in the event a security compromise event occurs.

For example, a database 880 may store a usage profile for a mobile device to allow software on the host server 860 to detect whether continued usage of the mobile device deviates from the usage profile by a predetermined threshold, or whether the mobile device has incurred a loss event resulting in a fault state within the mobile device 800. The host server 860 may also receive, process, and store (e.g., in the database 880) information from the mobile device 800. The host server 860 may handle any type of data in any format to achieve any purpose, such as receiving and processing environmental parameters captured by the mobile device to track the position and location of the mobile device 800 as discussed previously. The database 880 may also store location information that can be used to determine whether the mobile device 800 is operating in a valid location (e.g., "whitelisting" and "blacklisting" as discussed previously). The database 880 may also store neural network training data, wherein exemplary images of defects in mobile devices are correspondingly associated with identified defect classes, outputs or states. The neural network training data may be augmented or otherwise modified to improve accuracy of recognition of device defects. Further, database 880 may store results of analysis of the health and operation of mobile device 800, along with identifying information and historical operational information associate with mobile device 800. In this manner, operational analysis of the mobile device may be tracked and analyzed over time by server 860, and trends identified that may indicate pending failure of at least one component of mobile device 800.

Databases 880 in communication with the host server 860 may also store archived data from mobile devices 800 for recovery in the event the mobile devices 800 are lost or stolen, or the data on the mobile devices 800 is destroyed (e.g., by a virus or other malicious program). The functionality of the host server 860 may be performed automatically or semi-automatically, such as through software/hardware operating on one or more computer systems, and/or by one or more human operators.

The host server 860 may include one or more system processors 14 that retrieve and execute computer-readable instructions stored in a memory 16 to control (at least partially) the operation of the host server 860. Any number and type of conventional computer, computer system, computer network, computer workstation, minicomputer, mainframe computer, or computer processor, such as an integrated circuit microprocessor or microcontroller, can be used in conjunction with the present invention. Computer systems used in accordance with aspects of the present invention may include an operating system 43 (e.g., Windows NT/95/98/2000/XP/Vista/7/8/10, OS2, UNIX, Linux, Solaris, MacOS, etc.) as well as various conventional support software and drivers typically associated with computers. In certain embodiments, dedicated applications may be entirely or partially served or executed by the system processor to perform methods of the present invention.

The neural network 47 may comprise a convolutional neural network (CNN) architecture, and may be implemented through software stored in the memory device 16, through external hardware (such as hardware accelerators or graphics processing units (GPUs)) coupled to the server processor 14, or through a combination of stored software and external hardware.

The host server 860 may be accessed in any desired manner, such as through a website on the Internet, and/or through a telephone network. The host server 860 may include any number of human operators, computer systems, mobile telephones, mobile computing devices, interactive voice response (IVR) systems, and any other suitable system and device for communicating with a user, security authority, computing device, or other entity. The host server 860 can communicate with unauthorized users of a lost or stolen mobile device, both through the mobile device or through other communication methods, including direct communication with a fault state test application (alternatively, as used herein, "FSTA") installed on the mobile device. The host server 860 may notify the unauthorized user that the mobile device is lost or stolen, provide recovery information (such as a shipping address) to the unauthorized user, forward test result and damage claim information to a third party insurer, and facilitate initiation of an insurance claim. The host server 860 also communicates with the mobile device 800 to provide software updates, receive data for archival, identify files and other data to be protected, and to perform any other aspect of the present invention.

The host server 860 may be controlled by (locally or remotely), or operate in conjunction with any third party such as an authorized user, telecommunications service provider, mobile device monitoring/tracking service provider, security authority, an insurance agency, a mobile device repair agency, a mobile device seller, an advertising agent, a mobile device warranty reseller, an authorized user of the mobile device, and/or any other desired entity. For example, authorized users and security authorities may communicate with or through the host server 860 to interact with the fault state test application (FSTA) installed on mobile device 800 to confirm that the device has incurred a fault that may be subject to an insurance claim. The host server 860 may be configured to provide notifications on how to return a lost/stolen mobile device 800, detect a security compromise event, detect that a fault state has arisen on the mobile device, and determine whether a mobile device's functionality should be altered and (if so) determine the manner in which the functionality of the mobile device 800 should be altered. The host server 860 may operate in conjunction with any other desired systems, devices, human operators, or other entities.

The FSTA may gather information from the tested mobile device to be relayed to the third party or stored 45 in memory 16 of the server 860 along with the results of the device test. Device data 45 is uniquely associated with one or more images of the mobile device 46, which may be analyzed by the server processor 14. Device image data may be stored in any format, including, but not limited to jpeg, TIFF, GIF, EPS, PNG, PDF, scalable vector graphics, bitmaps, or any other conventional or nonconventional image data formats. The device data 45 and corresponding device images 46 may also be stored in the database 880. Any appropriate data may be included in the information relayed to the third party, such as a device type, a manufacturer, a model number, a serial number, a manufacturing date, a hardware configuration list, a memory capacity, a software manifest, a list of operable features, a list of inoperable features, an electronic serial number, an ESN, an IMEI number, an international mobile equipment identifier number, an IMSI number, an international mobile subscriber identity number, a UIMID number, and a user identity module identifier, test results, and fault conditions. Mobile devices that utilize SIM cards (such as interchangeable Subscriber Identity Modules commonly used with cellular telephones) can be further used with embodiments of the present invention in determining that at least one of the stored device configuration parameters includes an IMSI number within a SIM of the device.

In an additional embodiment of the present invention, a user that has a mobile device with an alleged fault condition (such as a cracked screen/display) may be requested to install an application (such as the Fault State Test Application referred to above) on the allegedly faulty mobile device. The FSTA provides a trusted method to assess the veracity of a claimed fault condition on the mobile device (such as a cracked or damaged screen/display). The FSTA interacts with the mobile device's user to obtain sensor readings and user inputs that are utilized to assess whether the mobile device is in fact faulty. The determination of a fault/non-fault condition can then be displayed and/or sent to a third party (such as an insurance company that is being asked to provide policy coverage for the mobile device) in a secure manner (so that the test performed on the mobile device provides a trusted result). In one embodiment, the data sent by the FSTA in the mobile device is encrypted to prevent tampering or spoofing by the user of the mobile device, and is suitably decrypted by the recipient or software running within the server 860.

Embodiments of the present invention that test the mobile device also have wider purposes beyond testing mobile devices for fractured glass; for example: full digitizer could be tested as the screen is painted in full (as described more completely below). Further, a darkened display/screen could be tested by a point test (e.g. sensors might be working but the LCD could be broken). Likewise, to verify that the input from the user is accurate, in one implementation the user would not be able to see points to complete test whereas in normal paint mode, the user might try to paint full screen to fool test. Also, color could be tested; for instance, the user could be prompted to press the 2 displayed greens then press the two reds and finally press the 2 blues (for example). Further, analysis of an image captured of the mobile device, either in a mirror or by a second device, may provide captured image data that can be analyzed to visually determine fault classes, such as through a neural network such as a convolutional neural network. A wide variety of defects may be detected in this manner, including, for example, a crack or scratch in the display of the mobile device; a check, crack, chip, blemish, or break in a casing of the mobile device; a bezel crack; a wear point on a casing of the mobile device; a stuck or dead pixel on the display of the mobile device; LCD bleed in the display of the mobile device; a pink hue defect in the display of the mobile device; an object (such as a user's body part, a sticker, or other item) blocking the display of the mobile device; a detected aspect ratio of the mobile device screen not corresponding to an expected aspect ratio for the corresponding mobile device type; a wear pattern on the mobile device not corresponding to an expected usage profile of the mobile device; a reflection on the display of the mobile device; a smudge on the display of the mobile device; a logo or other identifier found in the image of the mobile device not corresponding to an expected manufacturer of the mobile device; a seam separation on the mobile device; a missing component on the mobile device; and any other type of defect that may be determined from an image captured of the mobile device.

Further, in one embodiment, a company that sells mobile devices may want to know immediately if a device in the field has incurred a fault condition (such as a cracked display) so that a new model can be offered to the device owner. This may be especially relevant in the case where a Mobile Network Operator (MNO) offers devices for sale that are subsided by the payment of the service plan's monthly fees over a contractually-obligated period of time—the MNO benefits because they can renew and extend the service agreement, and the device manufacturer benefits because they can sell new devices to replace faulty ones. Additional or alternate system implementations of embodiments of the present invention include:

Mobile Device Insurance: embodiments of the present invention provide for verification of phone condition in the second-hand mobile device insurance market, as well as providing the capability to support selective insurance or variable policy provisions related to provable state/functionality of the mobile device hardware (e.g. screen not cracked results in full insurance for mobile device, but a cracked screen but otherwise functional device may allow for a policy to cover the device except for glass damage). Likewise, embodiments of the present invention provide for verification that the phone being checked is the one being insured (e.g. through transmission of mobile device ID information such as IMEI information or other data described herein as part of the test). Further, embodiments of the present invention may be used in identifying that the mobile device is the correct device under warranty before it is returned for repair of screen to reduce spurious claims. Such may occur, for example, for an insured device, when a repair company doesn't really repair a broken device, but instead fraudulently splits insurance payout with a person whose phone was insured.

Mobile Device Transfer: Embodiments of the present invention may be utilized to validate that the phone that was tested is the one actually handed over in a transfer of possession/ownership.

Lease Return State Verification: aspects of the present invention provide for determination of condition for lease return (for example, if a leased mobile device must be returned at end of lease, if the condition of the mobile device has fallen below a predetermined agreed-upon state (i.e. display must not be cracked at time of lease return) then the customer must pay an additional fee for the excessive wear/damage).

Purchase/Shipping State Verification: The FSTA could be used for verification by a consumer buying the device online (for example, through eBay) where the seller is not completely trusted. Also, the FSTA could be used to ascertain a current level of damage i.e. the display may be cracked but to what extent (in various embodiments it is anticipated that a consumer or company would pay additional money as the know screen condition is not too badly damaged as to become unacceptable). Additionally, embodiments of the present invention provide proof by a warehouse that the mobile device was in acceptable condition when it was dispatched. When the FSTA is used a verifier in the situation where a person is purchasing a used mobile device from another source, the buyer may request the seller install a trusted screen verifier app, put the buyer's email address or SMS number in the FSTA to provide confirmation, the FSTA runs the test and sends the results to the buyer, thus verifying the used device does not have known faults (such as a cracked screen). Further this might be desired by the seller, who wants to verify before shipping, that the device is operating as expected, so that they are not accused of sending a faulty device to the recipient.

Legal Status Determination: Aspects of the present invention may support collaboration with third parties (or a police database) in confirming that the mobile device is not lost/stolen/subject to outstanding charges.

There are several embodiments provided for herein to perform the fault state assessment, including the FSTA conducting a pressure sensor-based test, a magnetometer-based test, or a pixel-based test, along with several system-based use scenarios presented; while each type of FSTA test is intended to be able to determine a crack individually, the various types of crack detection approaches may be combined as desired for any purpose, such as increased accuracy. While in a preferred embodiment, the FSTA may be installed in and run resident within the mobile device, those of skill in the art may appreciate that the FSTA may be executed in other manners, such as an OTA (over the air) application; deployed through a website and side loaded to a connected mobile device; loaded through a piece of in-store hardware (e.g. raspberry pie) or purpose-built instore device; or loaded and executed from a mall or store vending machine. Further, all or part of the FSTA and system implementation embodiments may be included in a library of apps utilized by entities that provide online quotes for insurance, device trade in, or mobile device diagnostics.

FIGS. 9-13 illustrate one embodiment of the present invention where a mobile device 800 is externally illuminated by a light source, such as an LED light strip, and in one embodiment, the colors of the lights may be selectively changed to illuminate the mobile device and enhance crack detection and analysis. In various embodiments, the lights need to be in a position where they will cause scatter from the crack if present in the glass. An LED strip with RGB lighting may be utilized in various embodiments so that color and intensity of the light can be changed as required as multiple lights may be needed depending on the number of cameras used.

Figure 9:
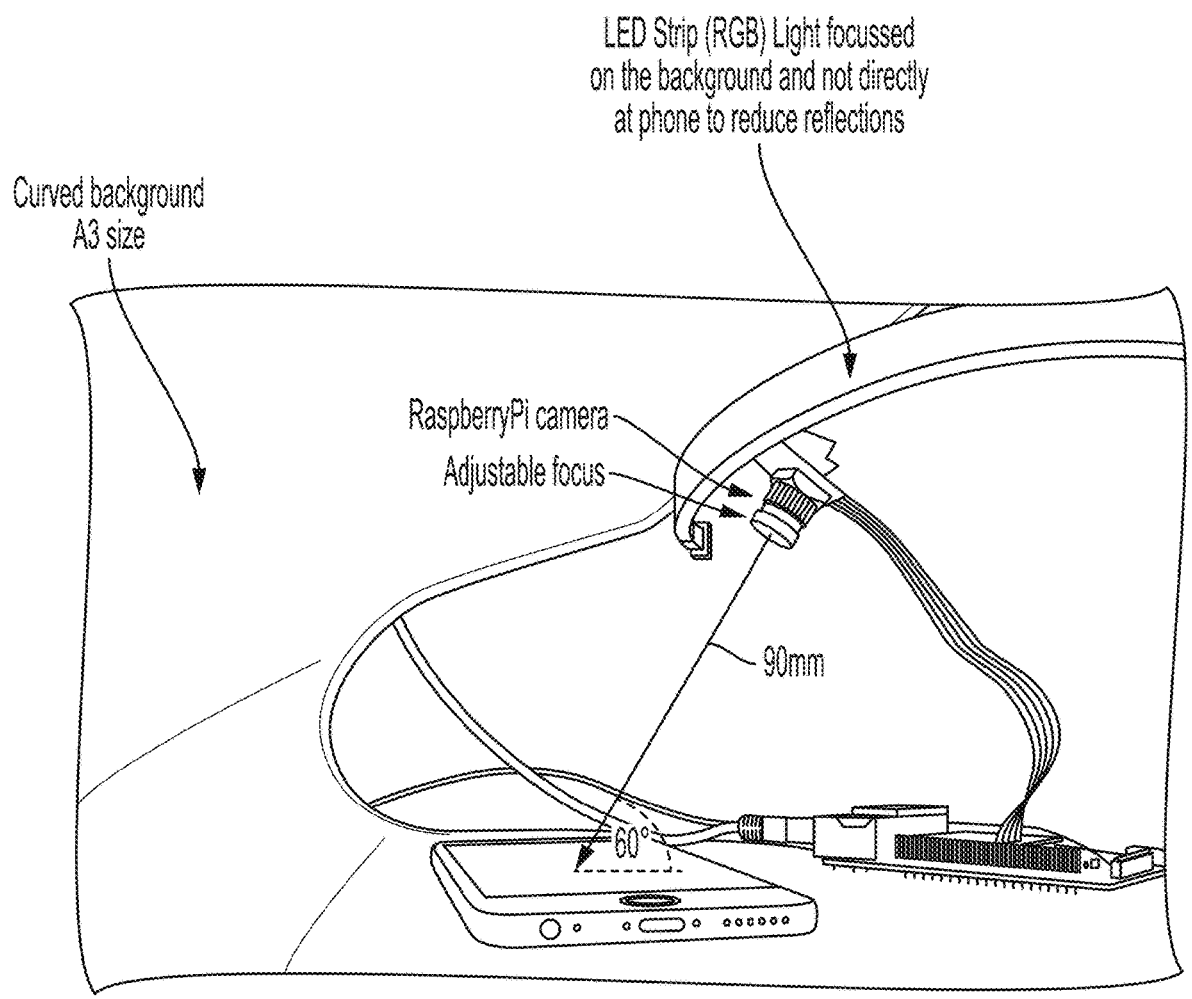
FIGS. 9-13 illustrate one embodiment of the present invention where a mobile device 800 is externally illuminated by a light source, such as an LED light strip.
Figure 10:
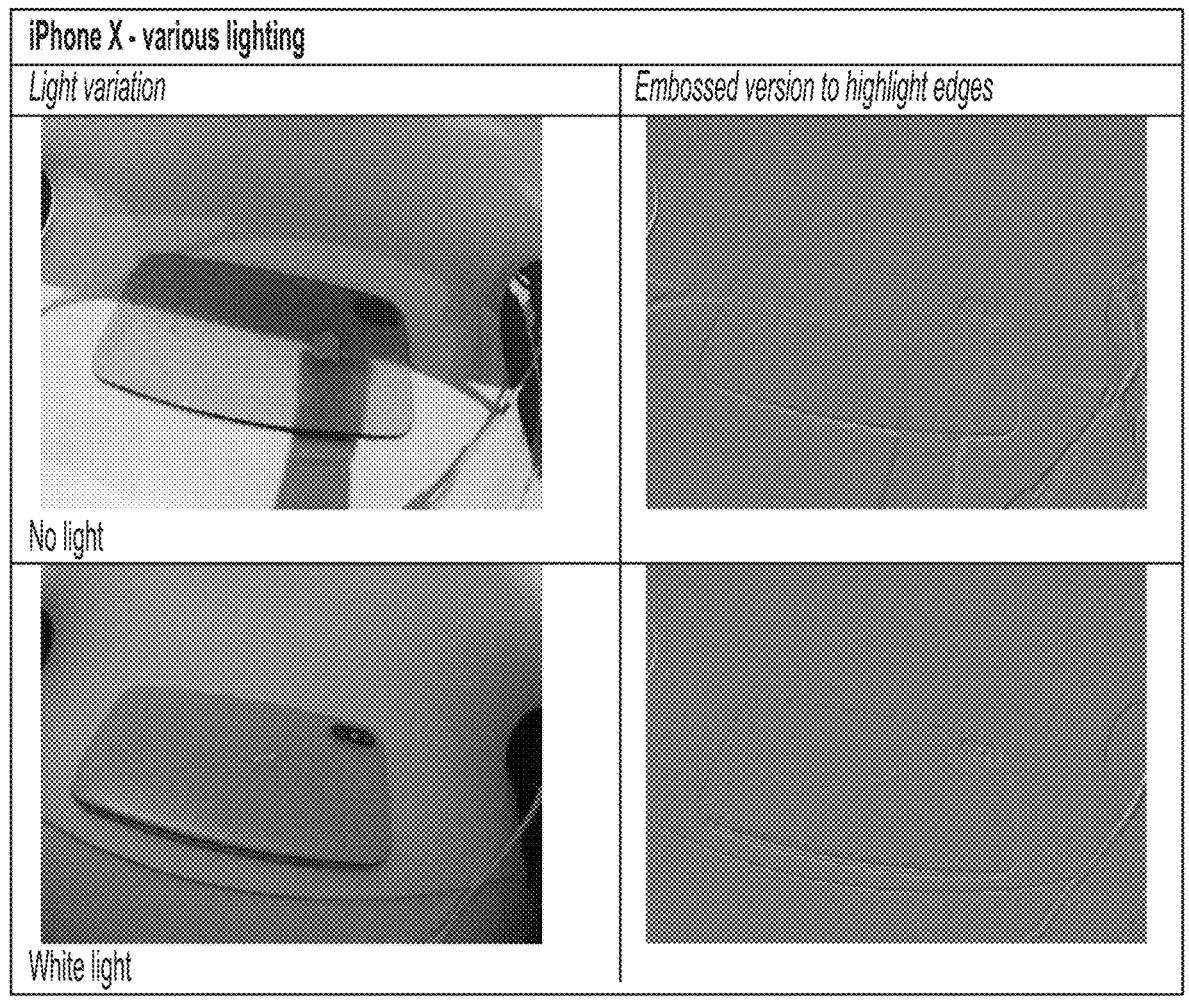
Figure 11:
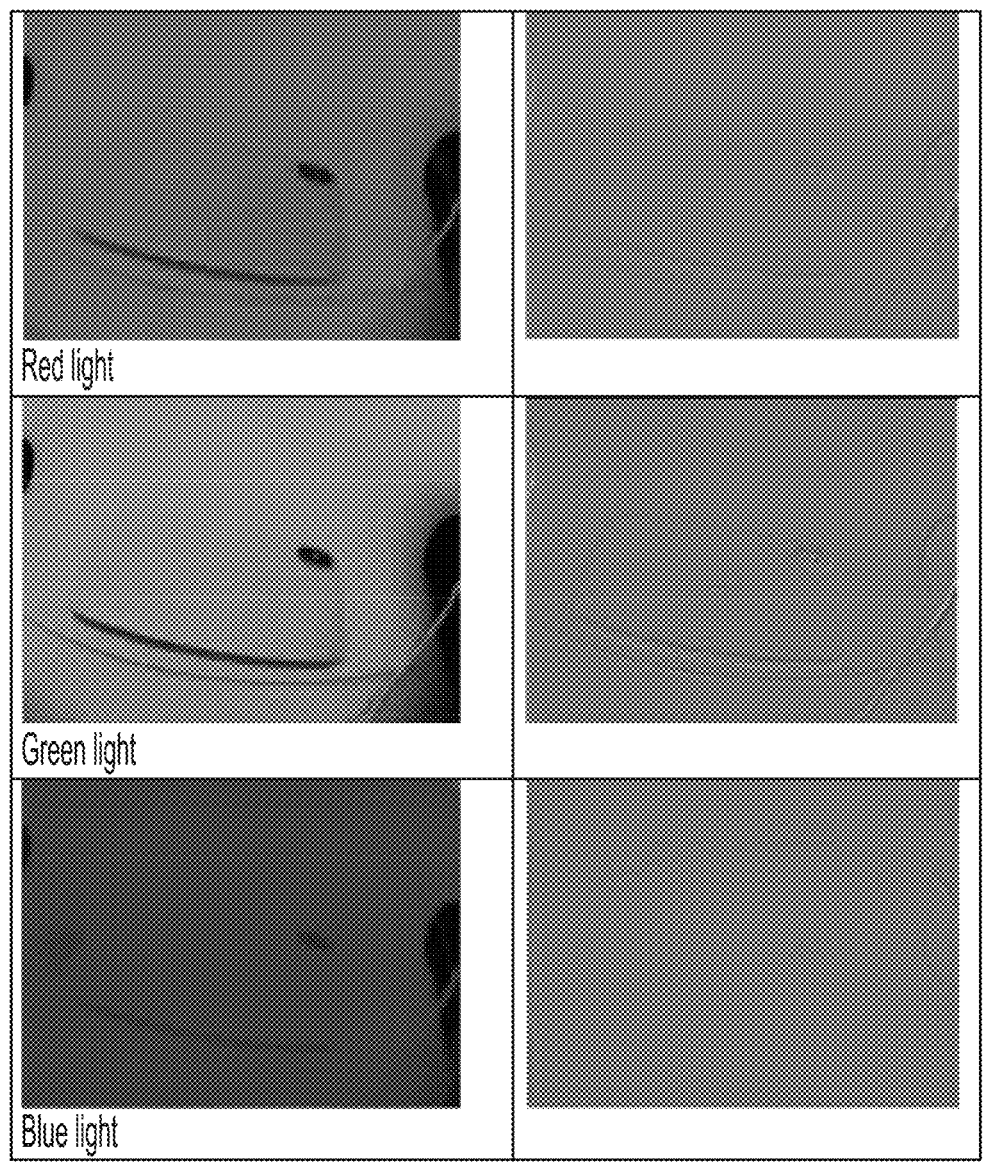
Figure 12:
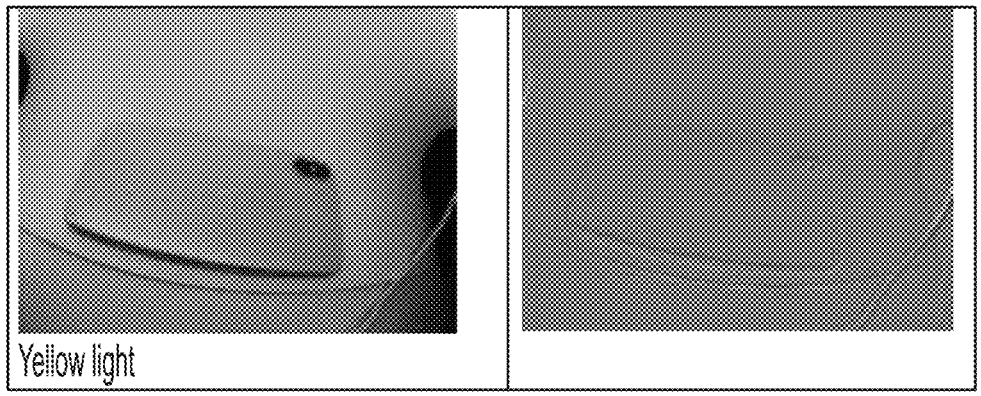
Figure 13:
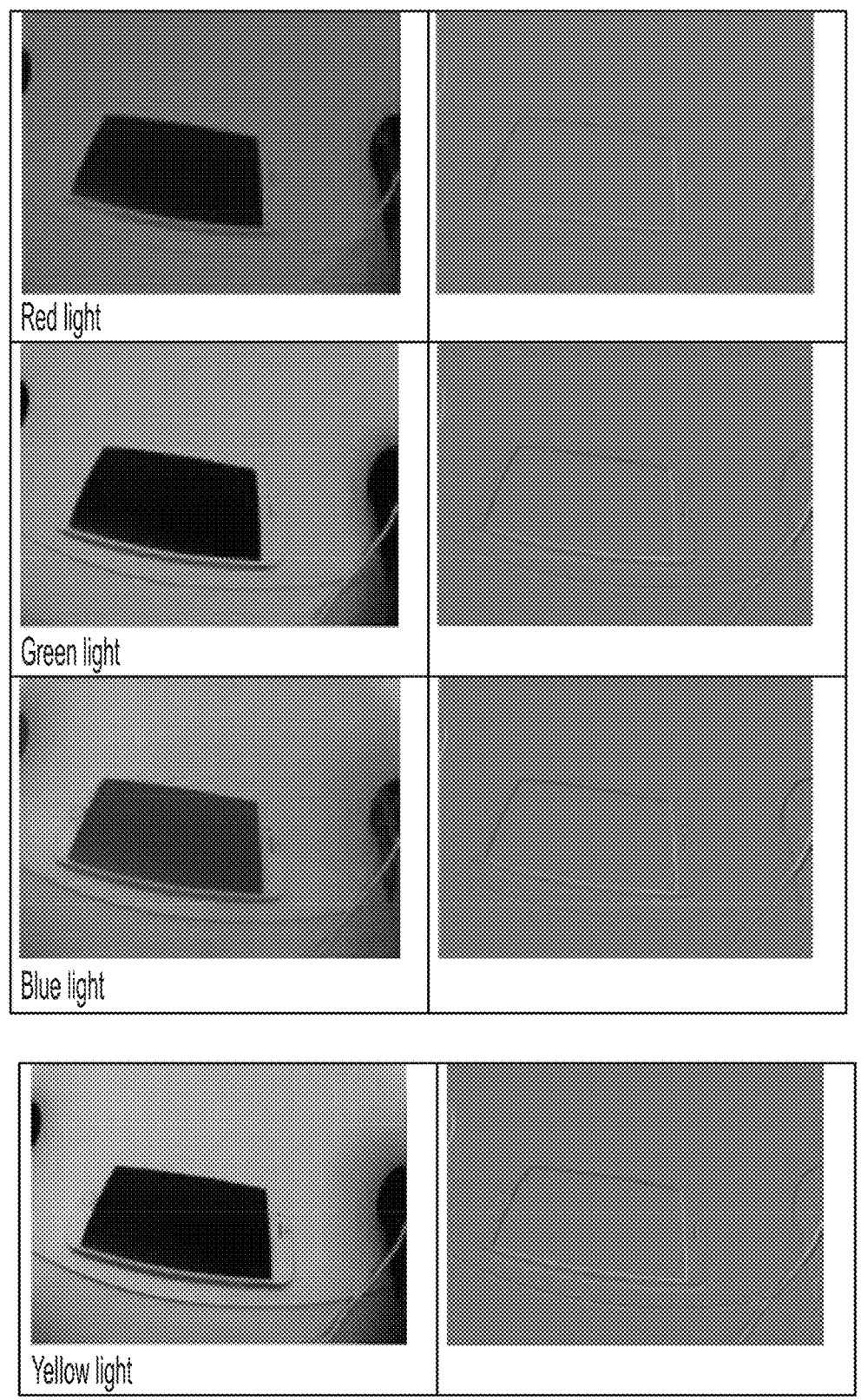
Figure 14:
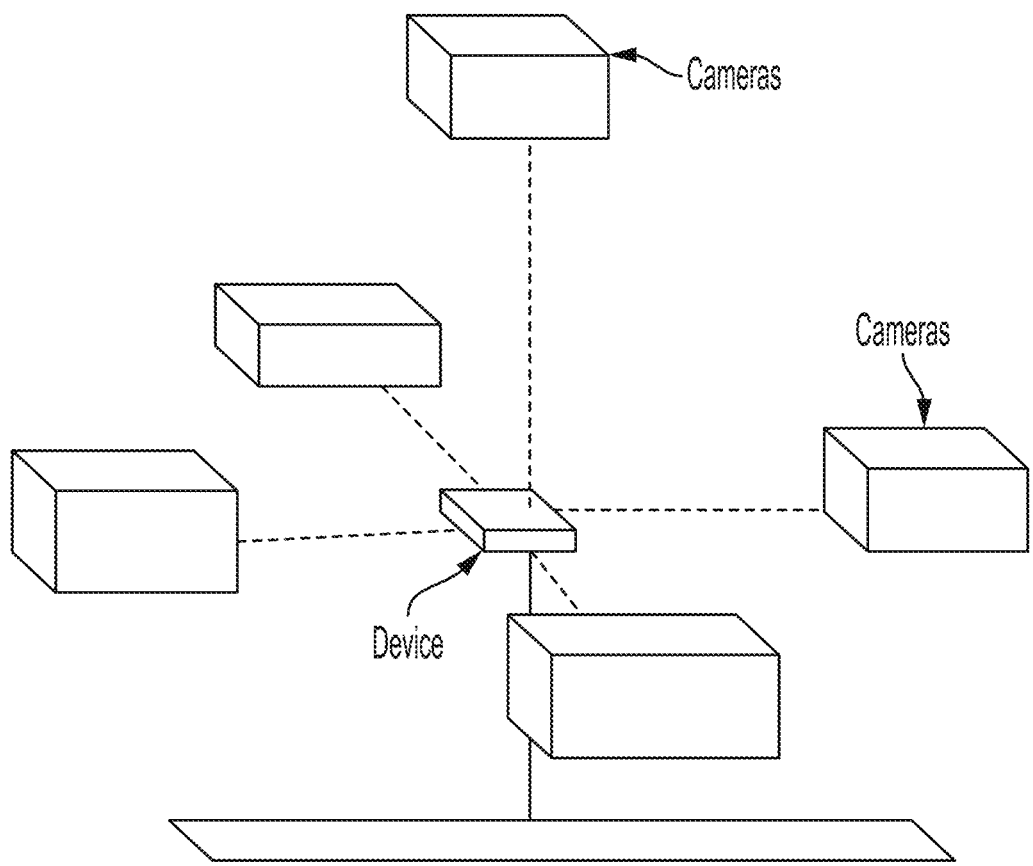
FIGS. 14, 15, and 15A illustrate multi-camera options for a test fixture of the present invention.

Experimentation led to the above-described embodiment setup above in FIG. 9 where the curved background eliminates reflections from the glass when the camera is aligned at an angle. The camera is aligned such that it does not see itself in the glass (approx. 60°). In various embodiments, if distortion is an issue, the camera can be calibrated using software such as OpenCV to obtain the intrinsic values of the lens and use that to undistort the image. Embodiments also use a calibration sheet to be placed in front of each camera to ensure best resulting image processing. If the cameras are identical in various embodiments it is possible to calibrate in-house and ship the calibration data with the software so that identical setups do not require calibration.

FIGS. 9-14 show images taken with various light combinations to see the effects of different lighting and absence of lighting; the lighting setup is effective in eliminating natural reflections cast from the working area. It can be seen from the photos and embossed images that cracks are visible in all lighting conditions and the lighting is required to eliminate the normal shadows and light reflections on the screen. By inspecting the embossed version of the image that the neural net of the present invention should find cracks in all lit images regardless of whether humans can physically see them easily or not visually.

Further, regarding image processing steps on the server 860, certain embodiments include the steps of: finding an area of interest in the image, perform color masking or edge detection or both to find image of region that contains the mobile device, then crop out every part of image that is not the part that has no mobile device in it, then translate the image to take care of skew or tilt to get proper angular representation. In one optional step, embossing or equalization of channels in the image may be performed. Once these pre-processing steps are performed, the processed image is sent to the neural model (discussed in detail below) for further analysis. To summarize, neural models can be used to analyze LCD, housings, glass surfaces, and other elements using convolutional neural networks, finding features in image by comparison to pre-trained classes, where features match will give back a score on how it matches each class. For example in one embodiment, 2 classes are defined as mobile device cracked or mobile device not cracked. The image is accordingly classified using convolutional neural networks as described below. Once the image has been classified, then if damaged, then class activation mapping is executed, the data is passed back through neural network model, but not the final score layer; rather, a layer of the model is examined where the image is spit up into smaller sub-images, and this provides the part of the image where the crack or other defect has a higher score and where the model has detected cracks in the image. As a result, an array of scores is obtained, then from the array a heat map is produced and from an area of the image, and overlay is produced to be displayed onto the original captured image, such as a bounding box shown in FIG. 7 or a color overlaid on the image where damage might exist, then the server returns back the image, and a Boolean Damaged==TRUE OR FALSE and if TRUE an image is returned for display as described above.

Test results, in one embodiment, are currently stored in a database 880, and made available via website. A user may log in to the website, where they may view the most recent test, or search for a device, and see original image and any images along the way. One customer may then use those images to see if there is any fraud such as someone tried to hide a crack or managed to hide it on the screen during a prior diagnostic test.

During the diagnostics and image capture process, instead of flashing up a white screen, embodiments could display a colored screen to look for stuck or dead pixels and may take multiple images. White is effective at showing a discolored screen, but with stuck pixels the white background might not be the best to identify individual color pixels that cannot be turned off. For this, considering Red Green and Blue images can provide assistance. Further black backgrounds on the display of the mobile device potentially for stuck pixels or any type of damage. Further, there are several types of LCD bleed. Type 1 liquid is bleeding out, and type 2 LCD is letting light bleed through edges, and black screen could help detect at least type 2. Thus, in various embodiments, capturing multiple images with different background colors being displayed on the mobile device 800 may enhance the ability to detect additional defects.

In additional embodiments, additional elements may be incorporated within the test fixture such as lights, lighting strips, microphones, speakers, vibrators, and other physical interfaces. Vibration may be tested, for example, by listening to the mobile device 800 attempt to produce a vibration, and if no vibration sound is heard, the test may indicate failure. Further embodiments may to assist the mobile device with testing whether is working by detecting with microphone built into the test fixture or with accelerometers built into the test fixture/phone. Further, the microphone on the mobile device may be tasked to listen to vibration on phone. Further, an external agitator may be used to vibrate the fixturing platform 205 surface itself to see if the accelerometer and gyros of the mobile device 800 are active and sensing the ideas. Further, if the test fixture 200 were configured to affix the mobile device and move it, gyros/sensors for 90 degree flip can be detected, this could be analyzed as well.

Another sensor may be tested: the ambient light sensor of mobile device. The test fixture may turn on an external light to see if the ambient sensor in the mobile device could see it. Further, the proximity sensor of the mobile device may be activated to determine whether its readout is consistent with the height of the reflecting surface above the mobile device 800. Further, an NFC field generator and reader may be incorporated within the test fixture, and the NFC interface of the mobile device may thus be tested. Mobile device wireless chargers may also be incorporated within the test fixture to both provide power to the mobile device under test and to test proper operation of the mobile device's wireless charging circuitry.

WiFi or Bluetooth connection to the device may also be tested; the test system may broadcast a WiFi signal to determine whether the mobile device can pick up the SSID of the broadcast signal. Further, a Bluetooth signal transmitted from the mobile device may be used to control or actuate any feature of the test fixture, including actuation or rotation of the reflating surface or any exterior lights, cameras, or other instruments.

Further, additional features utilize point or spot exposure—based on the model of the phone and its geometry, we know where the center of the screen is, and take an image of the center of the screen, then the entire image is done with that stage. We need a new mapper to find the center of the screen and the known fiducial will work. The center of the screen may not be the center of the photo, so it is important to know this. The phone knows itself and dimensions and color, and if we know the bounding box size look at that size of the mobile device for comparison.

In terms of analyzing images, a green or a blue color for the base is easiest to remove from the image; thus color analysis is useful to determine aspects and features of the housing and display that may indicate defects. For example, analyzing the back of the phone, there may be several approaches including using the back-facing phone to capture an image of the mobile device in the reflecting surface then analyzing the back of the phone from the captured image for glass breakage, metal scuffing, or other defects.

Further if the mobile device under test is tethered, it can be determined whether it is engraved, and whether the mobile device is a particular color. Certain smartphone brands may sell their phones engraved, phones sold as such from the manufacturer often have a firmware flag with a YES/NO that it was engraved (but won't say what was engraved). Through a tethered connection, it can be determined if the mobile device is engraved, and the engraving therefore can be removed from the defect analysis as a suspect crack. Further, if the captured image has an engraving or other text, it could be passed to an OCR analysis tool to determine the actual text on the mobile device (as may be important because personalization may affect resale price of a used mobile device significantly. Further, the use of OCR may assist with determining whether there are any images that need to be ignored so they can't be detected by text. Text, serial numbers, and the like may be excluded from crack detection through this technique.

Figure 15:
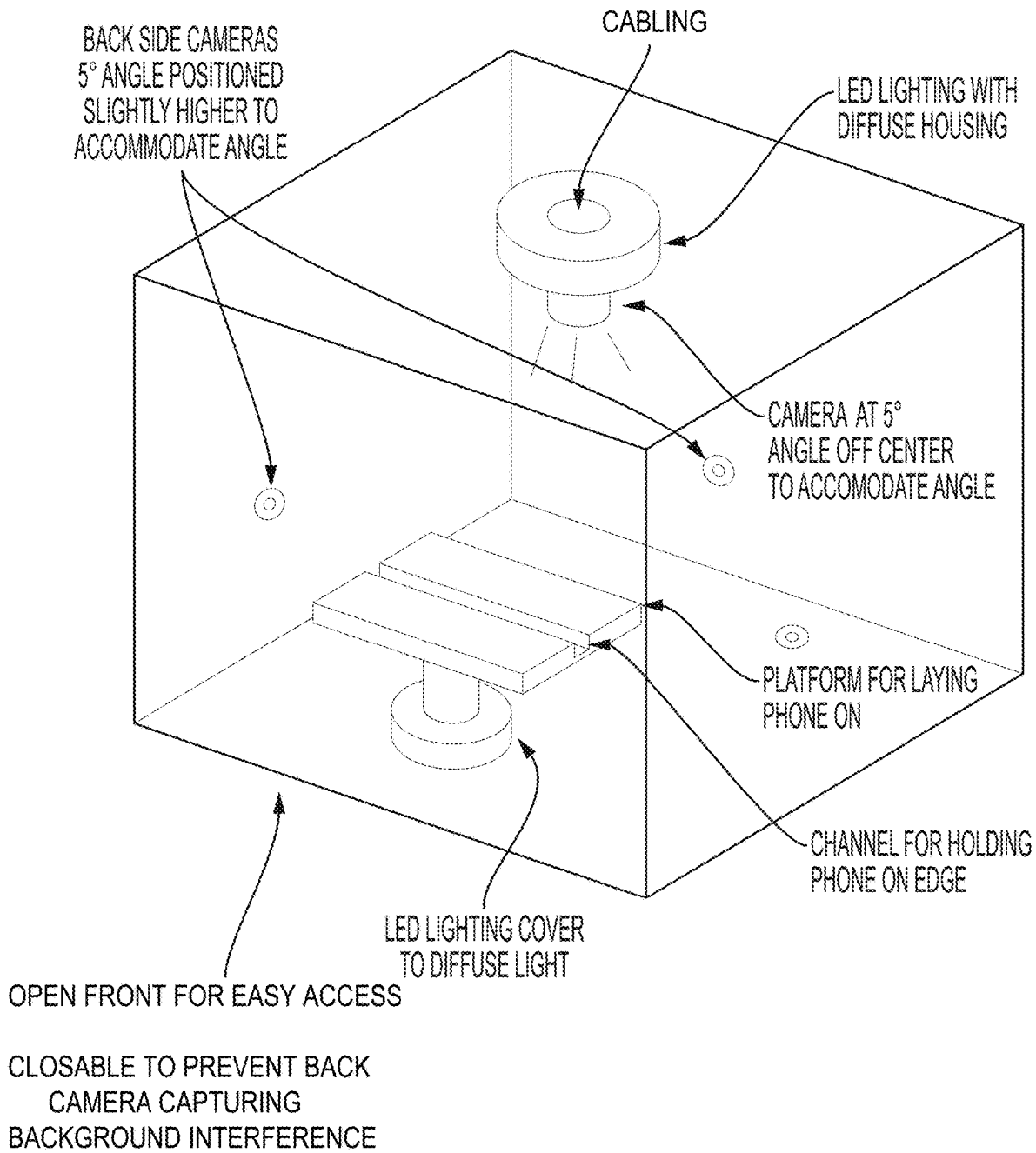
Figure 15A:
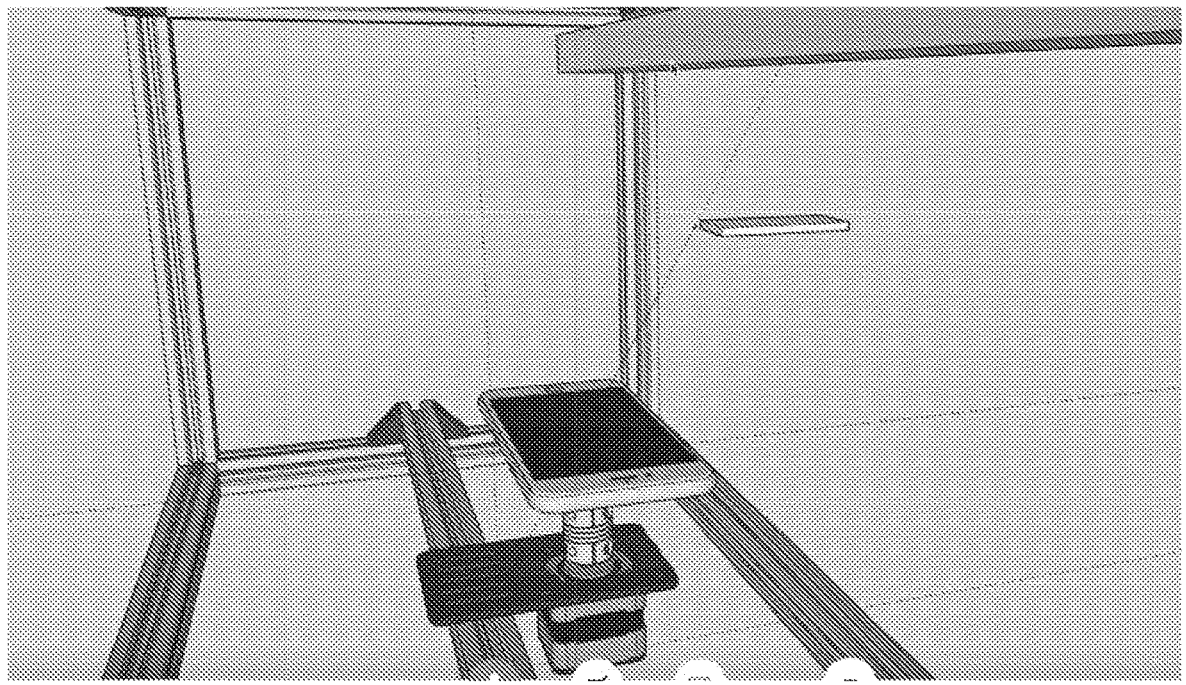

Gravity assist may also be used to move the mobile device under test to and/or through the test fixture; further, gravity may be used through a standard conveyer belt to flip the device over to obtain an image of the back of the mobile device. In various embodiments, the device under test could be in motion, and could be transferred down a conveyer belt and take its own image as it moves along the belt. The continued or continual motion could lead to significant gains in processing time in a warehouse/recycler environment. In one embodiment, the conveyer could pause long enough to take a picture, and in an alternate embodiment, a lever could be dropped in to the conveyer belt to flip the mobile device. Further, a multi-camera setup such as the illustrations of FIGS. 14, 15, and 15A may be used to capture multiple images and angles of the mobile device (and potentially build a 3-D model of the exterior view of the mobile device. The mobile device may proceed down the conveyor to come in the box shown in FIGS. 15 and 15A, the mobile device passes through a screen such as a black curtain, the curtain comes down, lights come on, camera gets photographed, captured images are then uploaded, and all tests conducted. Those of skill in the relevant arts appreciate it could be more than one apparatus to accomplish all tests. As mentioned above, a conveyer could be used to capture a front facing picture in a reflecting surface, the conveyer drops/flips the mobile device, then the back picture is taken the back facing camera, and the next apparatus can be taken. Though unique fiducials displayed on the mobile device, it can be uniquely tracked in a multi-phone environment. Further, QR codes or markers, on the screen may be displayed with 1-255 values, and this gives a large combination of numbers can take be embedded in an image of the screen to identify which mobile device was going down the conveyer line. So then you can take an image. Further, in a conveyer environment (or in the 3-D photo box of FIGS. 15-15A, external cameras may capture side images of the mobile device. External lighting effects may be applied as well as discussed above, and as shown in the lighting examples of FIGS. 9-13.

Detection of Device Defects Through Neural Network

Embodiments of the present application utilize Convolutional Neural Network (CNN) architectures to analyze captured images, videos, and/or audio files from mobile devices to identify defects and to provide analytical information such as heat maps in assisting with the further analysis of defect types. Those of skill in the relevant arts understand that many different CNN architectures may be used to implement aspects of the present invention. One exemplary CNN architecture may be realized through an Inception model implemented with Tensorflow™, and explanatory examples are provided, for instance, at https://www.tensorflow.org/tutorials/image_recognition, the disclosure of which is hereby incorporated by reference herein for all purposes. Alternative implementations of the present invention may be implemented through a Deep Residual Network (an explanation available at https://blog.waya.ai/deep-residual-learning-9610bb62c355 is incorporated by reference herein for all purposes), and or through Convolutional Network architecture implemented in environments such as Torch (examples and explanatory text provided at http://torch.ch/docs/tutorials.html, the disclosures of which are fully incorporated by reference herein for all purposes). Background introductions for neural network architectures in general, and Convolutional Neural Networks (CNNs) in particular are also provided in Michael A. Nielsen, "Neural Networks and Deep Learning", Determination Press, 2015 available at http://neuralnetworksanddeeplearning.com, the disclosure of which is fully incorporated by reference herein for all purposes.

In general, CNNs are one type of model architecture that has been successfully used for image classification tasks. CNNs apply a series of filters to the raw pixel data of an image to extract and learn higher-level features, which the model can then use for classification. CNNs typically contain three components: (1) Convolutional layers, (2) Pooling layers, and (3) Dense/fully connected layers.

Convolutional layers apply a specified number of convolution filters to the image. For each identified subregion within the image, the convolutional layer performs a set of mathematical operations to produce a single value in the output feature map. Convolutional layers then typically apply a ReLU activation function (a Rectified Linear Unit), to the output to introduce nonlinearities into the model; however, in various embodiments logistic sigmoid functions or hyperbolic tangent activation functions may also be utilized.

Pooling layers down-sample the image data extracted by the convolutional layers to reduce the dimensionality of the feature map in order to decrease processing time. Practically, a pooling function replaces the output of the net at a certain location with a summary statistic of the nearby outputs. A commonly used pooling algorithm is max pooling, which extracts subregions of the feature map, keeps their maximum value, and discards all other values, thus reporting the maximum output within a rectangular neighborhood. Other possible pooling functions include the average of a rectangular neighborhood, the L2 norm of a rectangular neighborhood, or a weighted average based on the distance from the central pixel.

Dense (fully connected) layers perform classification on the features extracted by the convolutional layers and the down-sampled by the pooling layers. In a dense layer, every node in the layer is connected to every node in the preceding layer.

As introduced above, a CNN is composed of a stack of convolutional modules that perform feature extraction, and each module consists of a convolutional layer followed by a pooling layer; the last convolutional module is followed by one or more dense layers that perform classification. The final dense layer in a CNN contains a single node for each target class in the model (all the possible classes the model may predict), with an activation function for each node. The CNN allows interpretation of the values for a given image as relative measurements of how likely it is that the image falls into each target class. In various embodiments of the present invention, a target class may comprise a defect in a mobile device such as a crack in a display, a blemish or crack on a casing, LCD bleed on the display, pink hue on the display, stuck pixels on the display, and various combinations of the above.

In one embodiment using a neural network analysis approach, systems and a methods are provided to identify a crack or other kind of defect associated with a mobile device through image analysis. Referring to the process 1600 illustrated in FIG. 16, an FSTA is installed 1610 on the mobile device that is desired to be tested 800 (also shown in FIGS. 14 and 15 with user prompts and guidance for capturing an image of the mobile device in a reflective surface such as a mirror). When ready, the user of the mobile device 800 initiates the device defect test 1615. Through a process discussed in regards to FIG. 17, an image of the display of the mobile device 800 is captured 1620, and the captured image is optionally pre-processed 1625 by rotating the image to a portrait mode and/or fine rotating to reduce skew, and/or cropping the image to a desired aspect ratio. The captured (and optionally pre-processed) image is then uploaded 1630 to a server (such as server 860), and as discussed further in regards to FIG. 18, the uploaded image is processed 1635 to determine whether any cracks or other types defects are present. Alternatively, or in combination, the extent and characteristics of the screen cracks or defects are characterized by the processing step 1635 for further analysis and reporting. Such analysis of the captured image (and possibly processed) image from the mobile may include determining whether the captured image comprises one or more defect indicators. Such defect indicators may be pre-defined within a pre-trained neural network into defect classes such as cracks, chips, fractures, mars, wear, scratches, abrasions, engravings, stuck pixels, dead pixels, color errors, color bleed, errant markings and the like. Based on this analysis, a cosmetic defect grading of the mobile device may be produced, which may be indicative of the relative overall visual state of the mobile device. Such grading may be useful in calculating a resale value of the mobile device and/or determining an insurance value or insurability criterion related to the mobile device.

Once the analysis 1635 of any potential defects is complete, the resulting information is formatted 1640 for presentation, storage, or display to any user for any necessary purpose, such as for assessment of whether the mobile device 800 is in proper working condition. The process then exits 1645.

Figure 17:
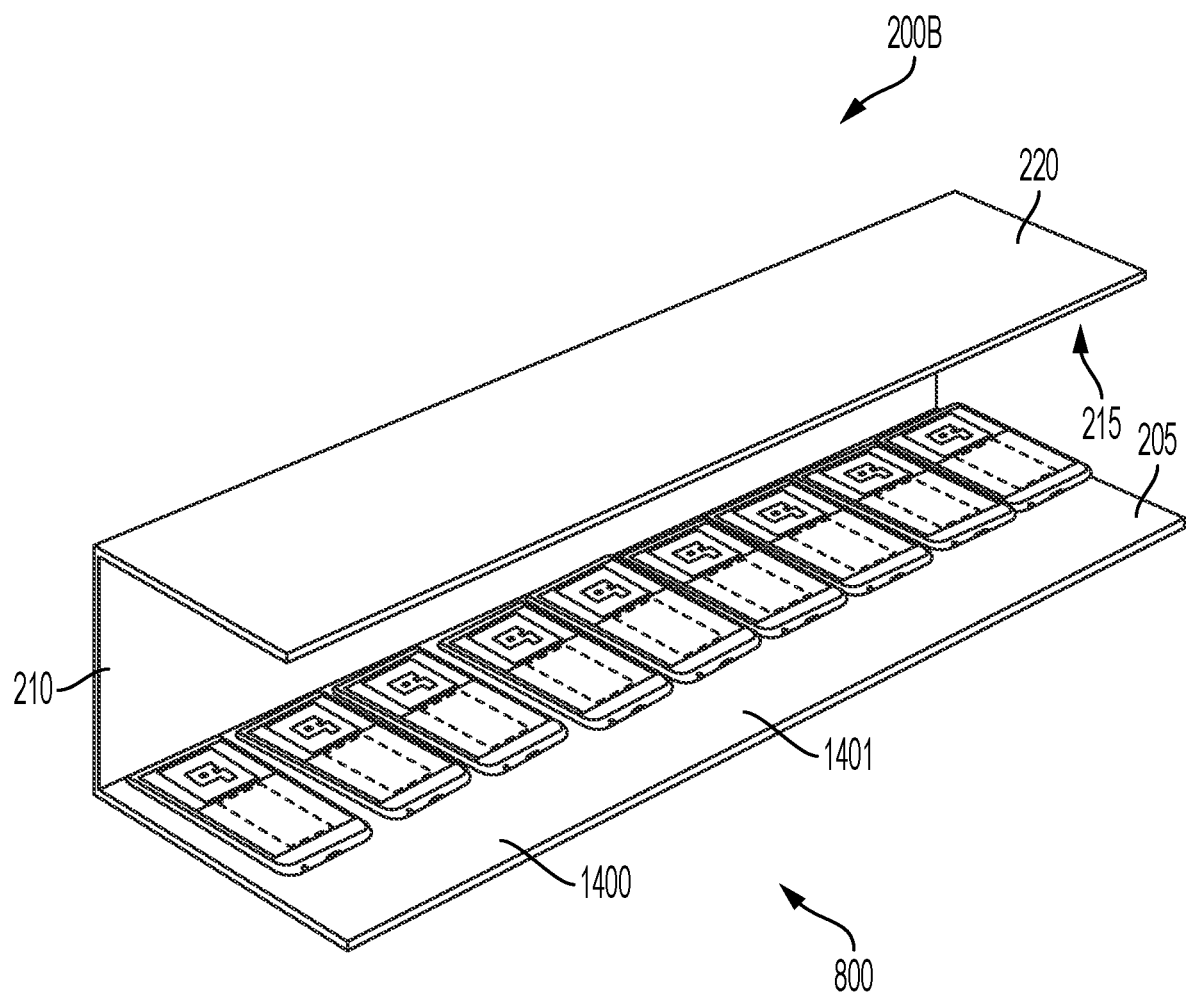
FIG. 17 illustrates a process flow diagram of the present invention, providing more detail of an exemplary image capture process.
Figure 16:
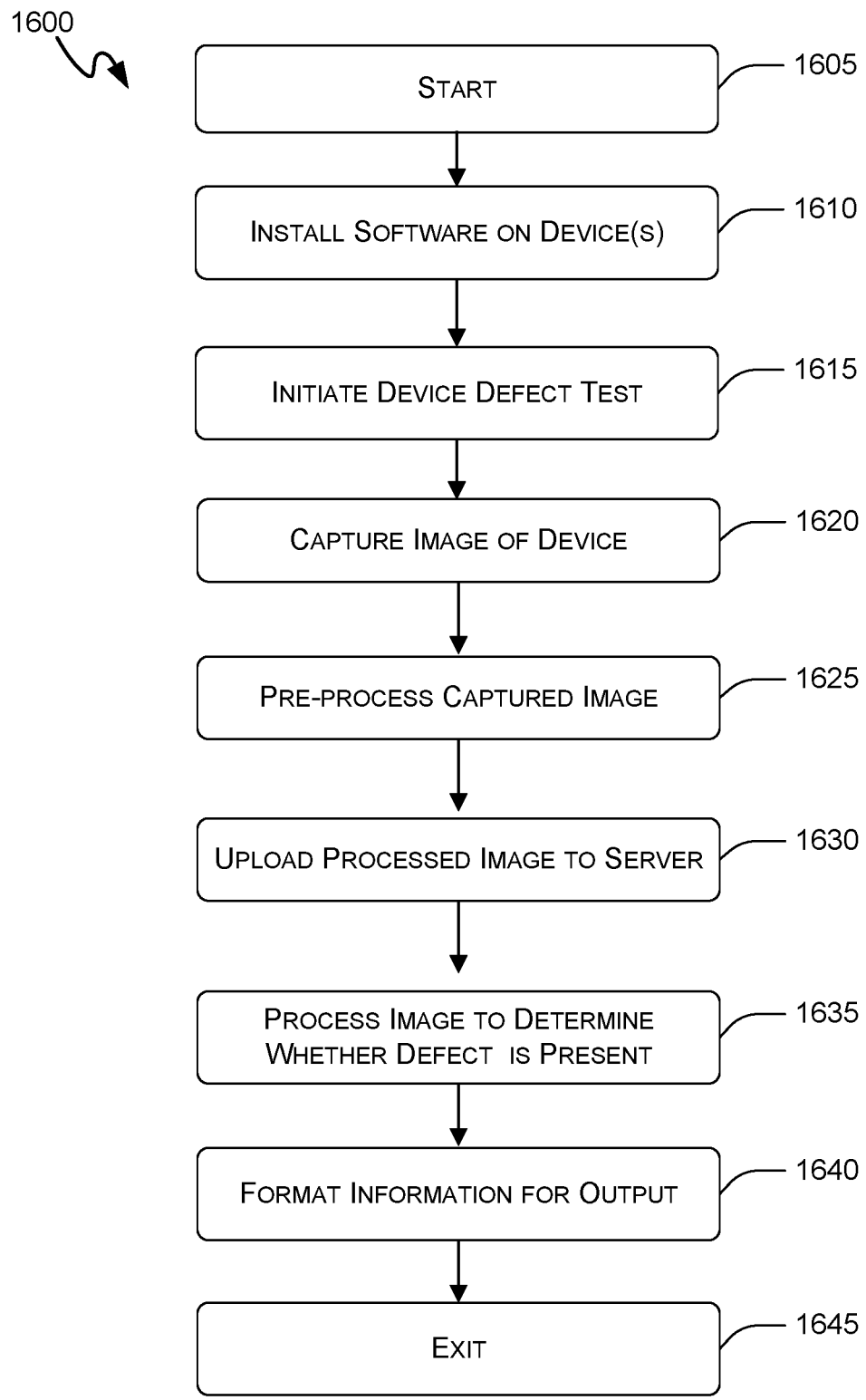
FIG. 16 shows a process flow diagram of the present invention, illustrating image capture and analysis to identify device defects.

FIG. 17 depicts a process 1700 of the present invention for capturing an image of the mobile device, as introduced in FIG. 16 step 1620. The image capture process begins 1705, where the FSTA analyzes ambient lighting 1707 from a light sensor within the mobile device 800. Then 1709, screen brightness and camera sensitivity of the mobile device 800 are adjusted to allow the mobile device's front-facing camera (e.g., FIG. 14, 874) to optimally follow a tracking image displayed on the mobile device's display (e.g., FIG. 14, 1400), the user is directed to move the device 800 into position 1715 with the display of the mobile device facing a reflective device such as a mirror. The tracking algorithm of the FSTA identifies the mobile device and provides guidance to the user from the display of the mobile device 800 to move/rotate the mobile device 1720 until it is determined that the mobile device is in optimal position to capture an image. As part of this process, the user may be directed to rotate, tip, move, or align the mobile device with respect to the reflective device's surface. The FSTA uses data obtained from the device's front-facing camera (e.g., FIG. 14, 874) to determine 1725 when the mobile device is in acceptable alignment for image capture, and then the FSTA modifies sensitivity 1730 of the forward-facing camera for optimal image capture. In one embodiment, image capture sensitivity may be different an initial sensitivity used during tracking of placement of the mobile device in front of the reflective surface. Depending on the operating system of the mobile device 800, different parameters may be modified in the mobile device to adjust camera sensitivity. In one embodiment, sensitivity is adjusted through changing an exposure compensation value associated with a camera in the mobile device 800. In another embodiment, shutter speed and ISO values associated with a camera in the mobile device 800 may be adjusted to achieve a desired sensitivity. Then, a capture image, such as a white screen or a screen with predetermined fiducial marks may be output 1735 to the display of the mobile device 800. An image is then captured by the front-facing camera (e.g., FIG. 14, 874) of the mobile device 800.

Those of skill in the relevant arts also appreciate that the rear-facing camera 872 of the mobile device 800 of the present invention may be used when facing a reflective surface to record an image of another surface of the mobile device 800, including, for instance, a back side of the mobile device casing. In this manner, defects in the casing may be analyzed by the optical neural network analysis of the present invention to detect casing defects, wear patterns, chipping, cracking, and the like.

Returning to FIG. 16, after the captured image is preprocessed 1625, and uploaded 1630 to the host server, image analysis may begin 1635 in the server 860. FIG. 18 depicts an embodiment of image analysis in accordance with the present invention, where such analysis may be carried out by the server 860. Once the captured image has been received 1810 by the server 860, the captured image may be optionally downsized or resampled to reduce the size of the image file and increase processing efficiency. An example captured image may be seen in FIG. 19, wherein the mobile device 800 shows its display 1400 and is being handheld by a user. The edges of the display 1400 of the mobile device 800 are then located in the captured image 1815 through alternative methods.

Figure 19:
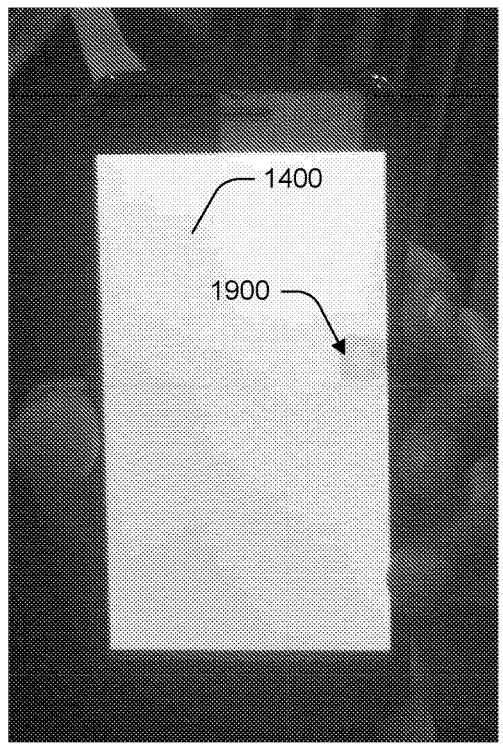
FIG. 19 shows an exemplary display of a mobile device with a defect on a display of the mobile device.
Figure 20:
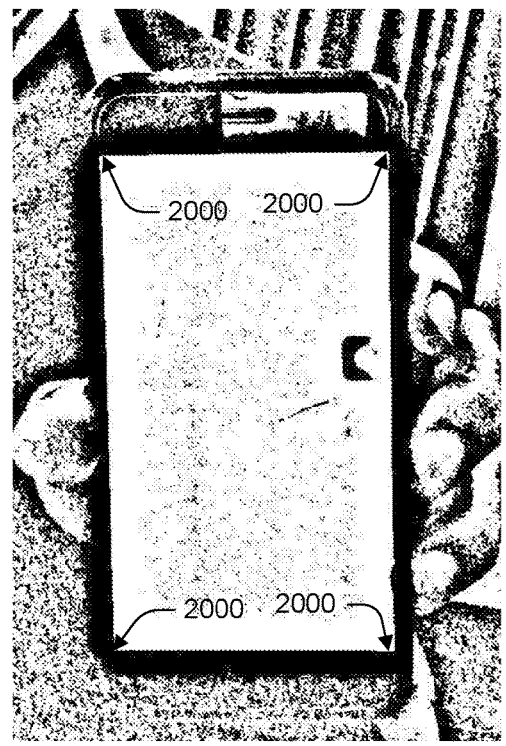
FIG. 20 shows an exemplary image of FIG. 19 after threshold techniques are applied.

In a first method to finding the edges corresponding to a display 1400, image threshold techniques are applied to the captured image (an example shown in FIG. 19) to produce a threshold-modified image (an example of the image of FIG. 19 after threshold techniques are applied may be seen in FIG. 20). Optical thresholding techniques are well understood to those of skill in the relevant arts, and example tutorials are provided at https://docs.opencv.org/3.3.1/d7/d4d/tutorial_py_thresholding.html, the disclosure of which is fully incorporated by reference herein for all purposes. Next, contours are found in the thresholded image, where contours comprise defined curves joining all the continuous points (along the boundary), having same color or intensity in an image. As contours are a useful tool for shape analysis and object detection and recognition, they may be used to assist in identification of the area of the captured image corresponding to the mobile device's display 1400. Contour analysis techniques are well understood to those of skill in the relevant arts, and example tutorials are provided at https://docs.opencv.org/3.3.1/d4/d73/tutorial_py_contours_begin.html, the disclosure of which is fully incorporated by reference herein for all purposes. Once contours are determined in the thresholded images, contours having four points are analyzed and compared to known aspect ratios of the mobile device under analysis. Since the device data 45 identifies the device type, its display aspect ratio may be identified from preexisting lookup data (or externally from the device manufacturer) and may be used for comparison of aspect ratios of the four-point contours found in the thresholded captured image. Once a contour is identified in the thresholded image that is sufficiently similar in aspect ratio to the defined display aspect ratio for the particular mobile device under analysis, (for instance, the aspect ratio is within a predetermined tolerance value of the manufacturer's aspect ratio data), then the location of the vertices 2000 of the matching contour within the thresholded image are obtained, and the edges of the display within the captured images are thus located as the area within the four vertices that correspond to corners of the display 1400. Depending upon specific geometrical features of displays associated with particular mobile device manufacturers (e.g. rounded corners, notches intruding into displays, etc.) the edge boundaries image may be further refined using the known geometrical tolerances of the manufacturers device specifications.

Figures 21, 22:
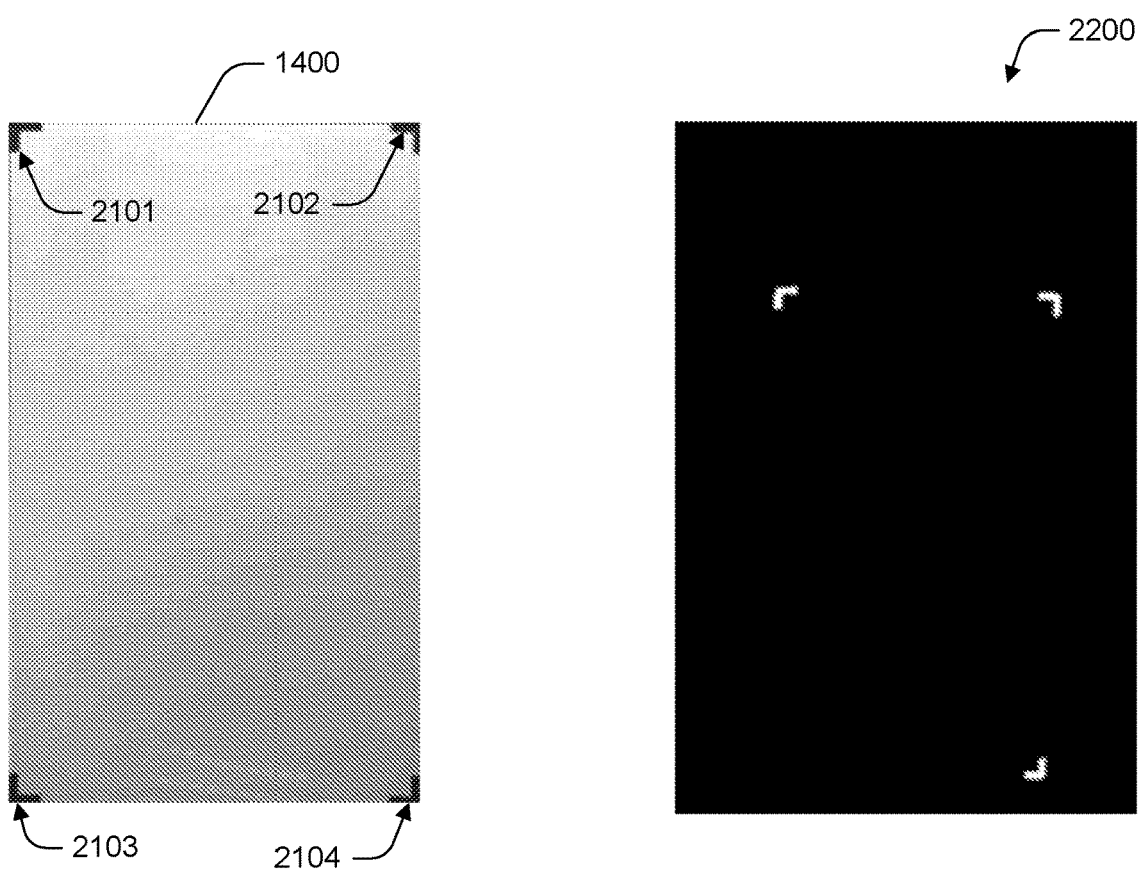
FIG. 21 shows an exemplary display of a mobile device of the present invention, showing corner fiducial markers.
FIG. 22 illustrates a template-matched modification of the image of the display shown in FIG. 21.
Figure 23:
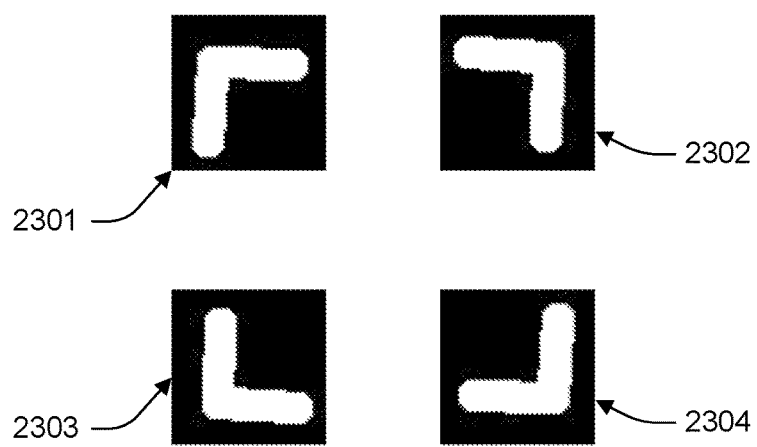
FIG. 23 illustrates template-matched corner markers obtained from the display image in FIG. 21 as used to determine edges of the display associated with a mobile device.

In a second technique for locating the edges corresponding to a display 1400, fiducials with a predetermined color (as shown in reference numerals 2101-2104 in FIG. 21) are output (FIG. 17, 1735) to the display 1400 of the mobile device 800 just prior to image capture. Placement of fiducials 2101-2104 appear proximate to the corner vertices of the display 1400, and image analysis techniques may be applied to determine the edges of the display of the mobile device within the captured image. Portions of the image are extracted using color range, and since the color of the fiducial marks is known, elements of the image appearing within a predefined tolerance value of the color of the fiducials appear in the extracted image. Next, polygons matching the respective shapes of the fiducials 2101-2104 are found through template matching approaches in the image, locating, for example, shapes 2301-2304 in FIG. 24, and the location of the corresponding corner vertices in the captured image can be determined by the respective locations of the corner vertices in the captured image (see FIG. 22). As with the first edge-detection technique mentioned immediately above, the edges of the display within the captured images are thus located as the area within the four vertices that correspond to corners of the display 1400. In an alternative embodiment, any kind of fiducial may be used to assist with identification of a component of the mobile device, such as by displaying a fiducial centered on a display of the mobile device, and then in conjunction with aspect ratios of display geometry associated with the device (looked up, for instance, from a manufacturer database of known mobile devices with associated specifications) then display edges may be refined by locating the search boundary as centered by the fiducial, and expanding to meet the outward boundaries using the geometry (and aspect ratios) of the associated mobile device. This method may be further refined if the fiducials output on the display of the mobile device are scaled to a known dimensions, (such as a cross with each side being a known dimension such as 1 centimeter), then the edges may be deduced by obtaining a scale factor with the depicted size of the fiducial scale in the image, then close tolerances to the outer boundaries of the display can be identified by applying the scale factor to the dimensions of the manufacturer's specifications for the mobile device's display edges. Further, the shape of the fiducial (such as orthogonal intersecting lines) may be used to de-skew the image so that edges can be better found that contain orthogonal geometries (such as rectangular sides).

Those of skill in the art further appreciate that while the word "display" or "screen" as it is used in the application generally includes an area where the mobile device may output a visual image, in other implementations of the present invention, the "display" or "screen" may include additional desired sections of the mobile device where visually detectable defects may be found. More particularly, in some mobile phone models, a first area may exist proximate to and above the active display area, and a second area may exist proximate to and below the active display area of the mobile device that is covered by a damageable material (such as hardened glass). While these proximate first and second areas may not be capable of rendering visual output (for example in older iPhone devices with speaker/camera/sensor orifices in the first area and a home button or microphone orifice in the second area), portions of these areas nonetheless may be damaged and it is a feature of the present invention to extend image analysis of the "display" or "screen" of the mobile device to these proximal first and second areas to detect damage in those areas as well. In other embodiments, a "notch area" removed from the active portion of a display may be included in the display analysis, and, for that matter, any desired area or surface of the mobile device where visual defect detection is desired. Additional tested areas of the mobile device, accordingly, may pertain to a back surface of the mobile device, a logo area of the mobile device, a side area of the mobile device a bezel area of the mobile device, or any other area for which a visual defect detection is desired. In one embodiment, a number of defects such as scratches or cracks that are found within a predetermined proximity to, or otherwise covering or touching a logo area of a mobile device (for instance, the "apple" logo on an iPhone model) may be determined and output upon defect analysis. Further, in various embodiments of the present invention, specific defects in the bezel of the mobile device, such as cracks, indentations, or pitting may be detected by visual analysis of an image of the mobile device. Images of the mobile device may be obtained by any desired method, such as by holding any surface of the mobile device in front of a reflecting device, capturing an image by a buddy or companion device equipped with a camera, or placing/rotating the mobile device in front of a mounted camera or other device that captures images (and/or video representations) of every surface of the mobile device and may optionally create a 3-d image representation of the mobile device. Further, defects may include any kind of visually detectable issues; in addition to cracks and scratches, display brightness variations, color variations (such as an undesired pink hue), LCD bleed, color failures, and any other desired type of visual defects may also be detected and identified. Additionally, crack/scratch depth, width, and/or other visual appearance criteria can be associated with identified cracks/scratches, and reported with an intensity level to assist with classifying the impact of the identified crack/scratch on the mobile device's value.

Now that edges of the display 1400 can be deduced from the locations of the corner vertices in the captured image, the area of the captured image corresponding to the display area can be extracted as a sub-image and transformed to a rectangular shape in a single step. This is accomplished in one embodiment through calculating the moments of the display shape in the image and perspective transforming the display portion to a rectangular image through a technique known to those of skill in the art (an example of the perspective transform implementation can be found at https://www.pyimagesearch.com/2014/08/25/4-point-opencv-getperspective-transform-example/, the disclosure of which is fully incorporated by reference herein for all purposes).

Figure 20A:
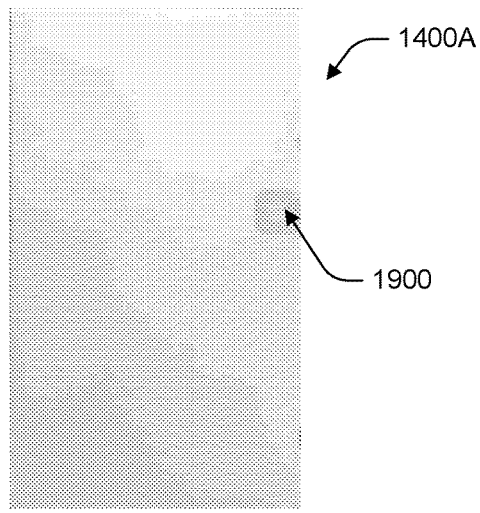
FIG. 20A illustrates an exemplary perspective-transformed subimage of a display of a mobile device, corresponding to the display portion of the captured image in FIG. 19.

Once the sub-image corresponding to the display 1400 from the captured image has been obtained, additional resizing/rescaling/resampling are undertaken so that the pixel dimensions of the sub-image are acceptable as input to the neural network 47 of the present invention. The sub-image can be resampled to any desired pixel configuration, and in one embodiment, the image is resampled to a 320× 544 pixel configuration (width, by height, in this example, corresponding to the portrait orientation of the sub-image). An example of a perspective-transformed subimage is shown in reference numeral 1400A of FIG. 20A, corresponding to the display portion of the captured image 1400 shown in FIG. 19. Defect 1900 appears in both images 1400, 1400A.

Figure 20B:
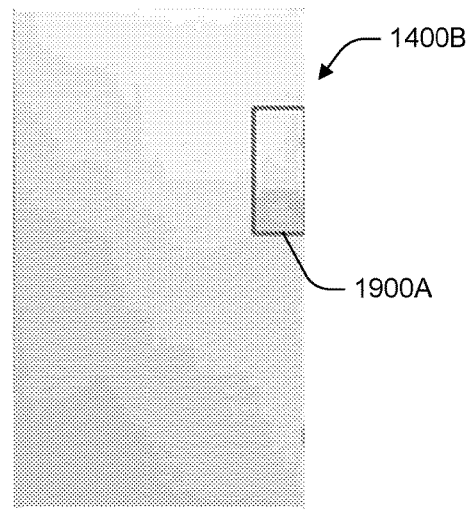
FIG. 20B illustrates an exemplary output of the present invention identifying a polygon-circumscribed defect of a display corresponding to the device of FIG. 19.
Figure 20C:
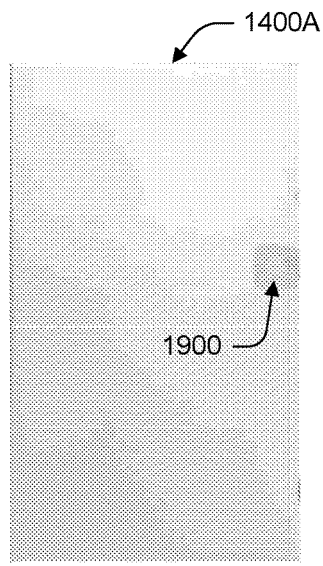
FIGS. 20C, D, and E respectively show: an exemplary device image for input to a convolutional neural network of the present invention, a heat map output identifying a defect likelihood area corresponding to the device image shown in FIG. 20C, and a polygon-circumscribed defect of a display corresponding to the device image shown in FIG. 20C.
Figure 20D:
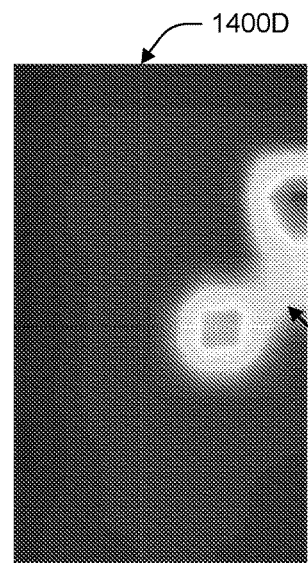
FIGS. 20F, G, and H respectively show: an exemplary device image for input to a convolutional neural network of the present invention, a heat map output identifying a defect likelihood area corresponding to the device image shown in FIG. 20F, and a polygon-circumscribed defect of a display corresponding to the device image shown in FIG. 20F.
Figure 20E:
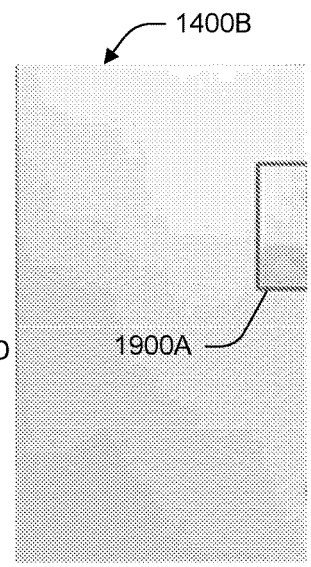
Figure 20F:
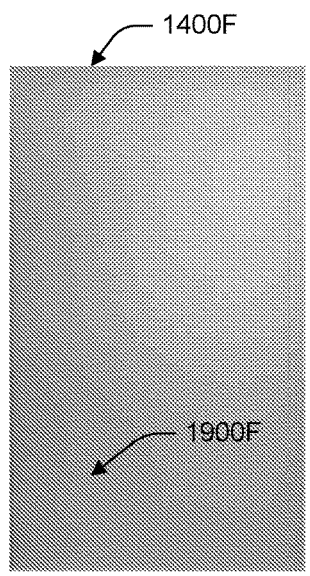
Figure 20G:
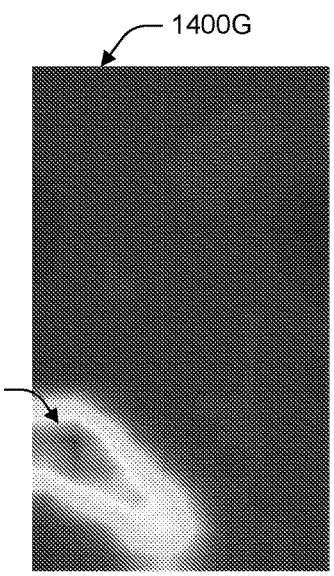
Figure 20H:
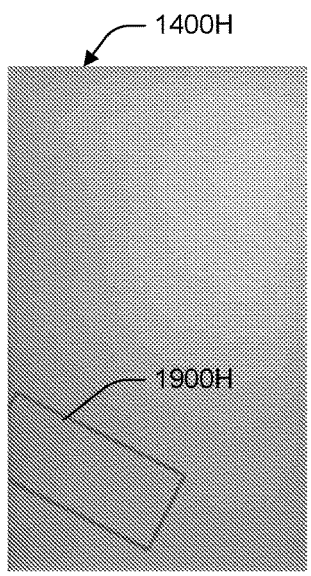

Step 1830 illustrates the analysis of the rescaled sub-image by a neural network to identify defects in the mobile device 800, and in particular, defects in the display 1400 of the mobile device. The rescaled and perspective-transformed sub-image (for instance, 1400A in FIG. 20A) is applied to the input of a convolutional neural network which has been previously trained to detect defects with training data comprising displays and accompanying defect classes. Once the network analyzes the image, an output is produced that identifies a defect, such with a colored polygon 1900A shown in FIG. 20B. The colored polygon draws attention to the defect found by the neural network, and as mentioned previously, additional outputs and analysis such as heat maps may be provided based on the particular network architecture. More illustrative examples follow in FIGS. 20C-E, where input sub-image (FIG. 20C, 1400A) with defect (FIG. 20C, 1900) is input to neural network 47 of the present invention, to produce an output (FIG. 20E, 1400B) with defect circumscribed by a polygon (FIG. 20E, 1900A), and a heat map output version (FIG. 20D, 1400D), depicting a heat map 1900D corresponding to activation classes for detected defects (FIG. 20C, 1900) in the display sub-image (FIG. 20C, 1400A). Another example is provided with a second input sub-image (FIG. 20F, 1400F), producing output (FIG. 20G, 1400G) with heat map indicating location of detected defect class (FIG. 20G, 1900G), and an output (FIG. 20H, 1400H) with defect circumscribed by a polygon (FIG. 20H, 1900H). Those of skill in the relevant arts understand that many other types of outputs are possible, and different defect types as explained previously may be detected though an appropriately trained CNN architecture.

Figure 16A:
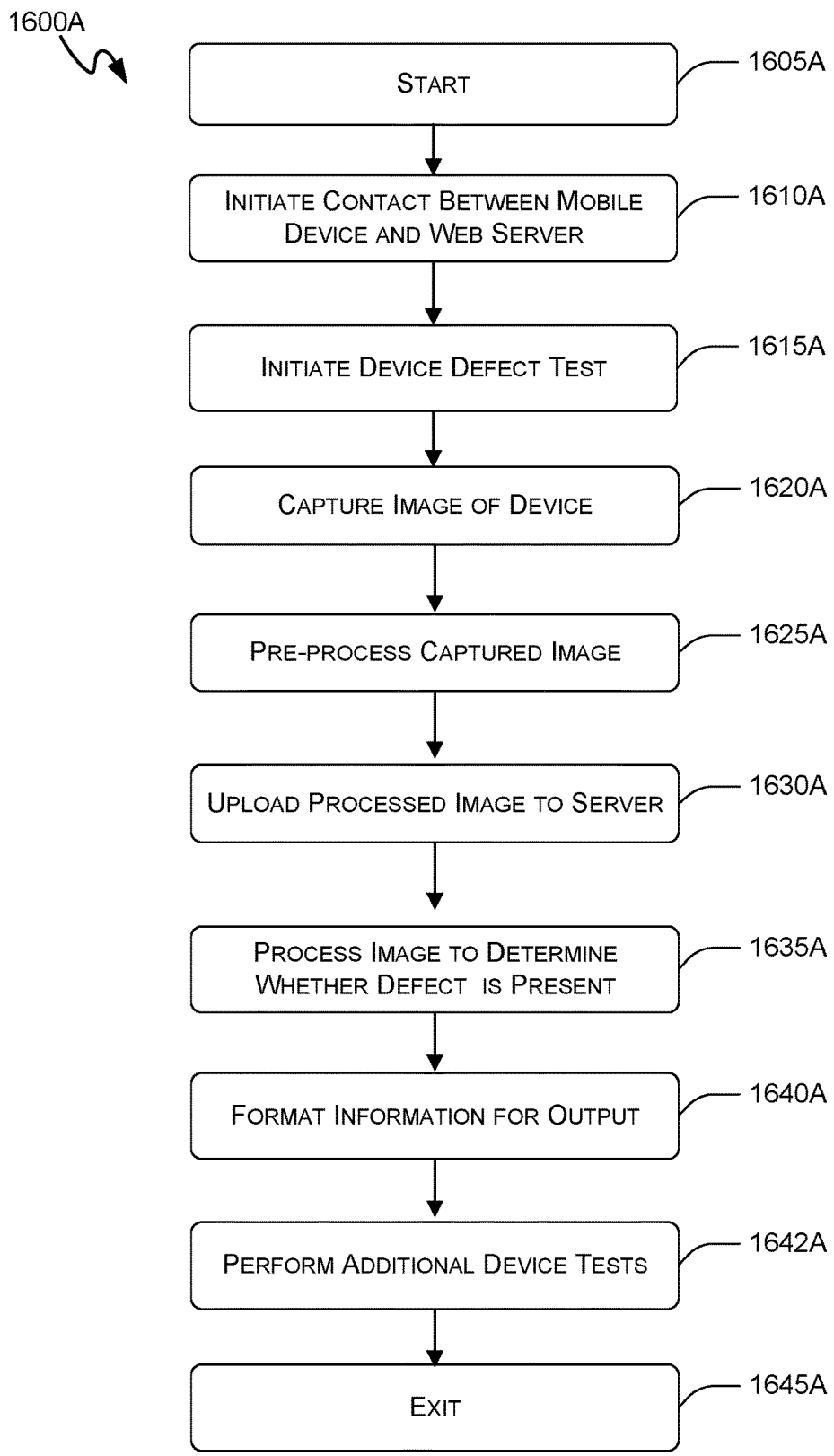
FIG. 16A shows a process flow diagram of the present invention, illustrating image capture and analysis to identify device defects without first installing an app on a mobile device.
Figure 17:
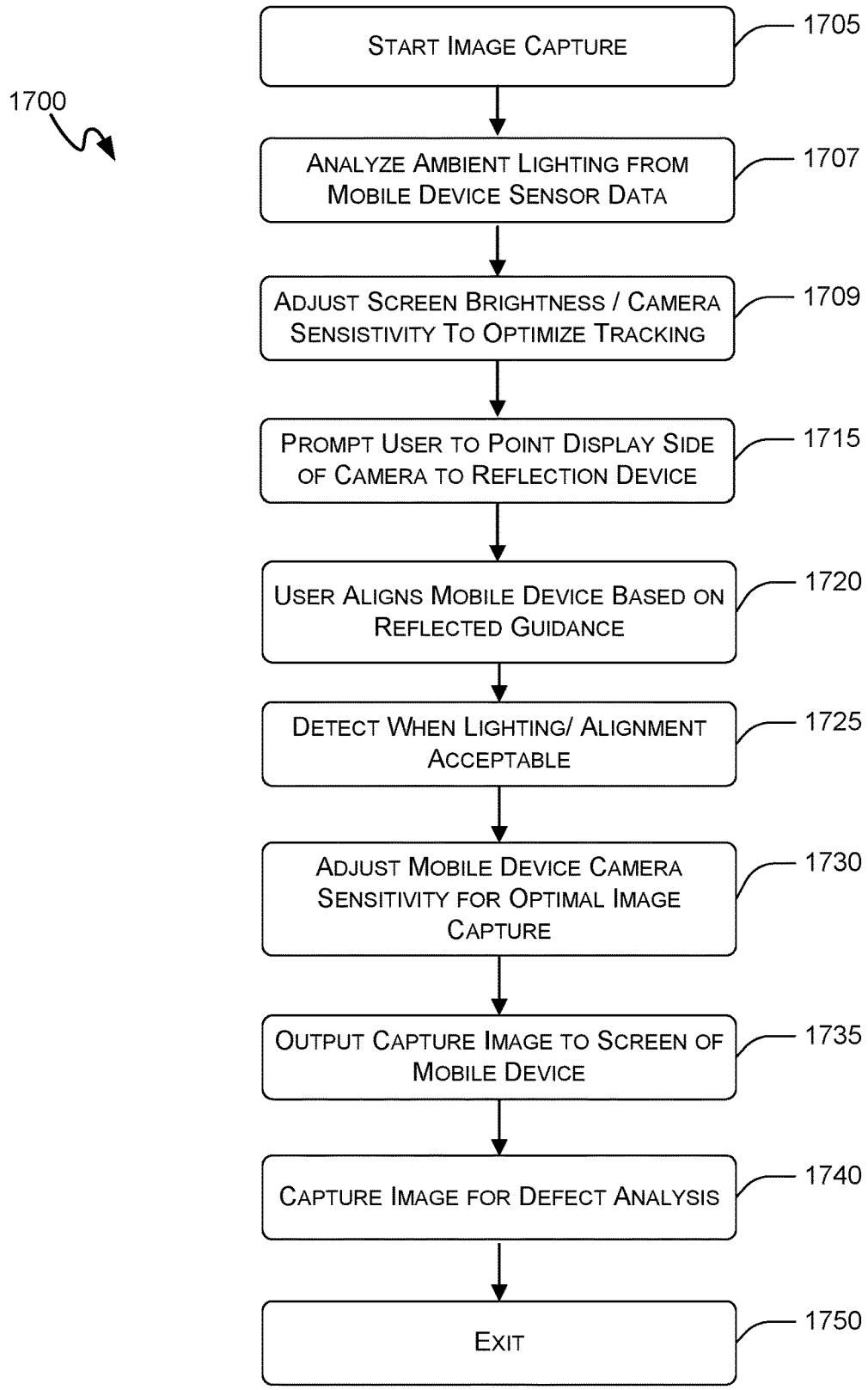

FIG. 16A illustrates another embodiment of the present invention, and while certain analytical steps as described in regards to FIG. 16 may be implemented identically, embodiments of the present invention in regards to FIG. 16A utilize alternative approaches. More particularly, in one embodiment, the present invention may allow defects associated with a mobile device to be detected without having to first install a Fault State Test Application (FSTA). More particularly, in step 1610A, contact is initiated between the mobile device to be tested and a remote diagnostic service (RDS) such as a web server specifically configured with software and necessary communications circuitry to connect to the mobile device and remotely execute tests to determine whether defects can be found within the mobile device. Such contacts may be initiated in any desired manner, including by a data-based connection to a web address from the mobile device, the web address corresponding to a device diagnostic server, and wherein the mobile device user is prompted to enter identifying information, and the user test profile for the specific mobile device may be created and stored in a database associated with the web server along with diagnostic results. The device. When the connection is initiated, and requested information is entered by the mobile device user, the user of the mobile device 800 indicates to the remote diagnostic service that defect testing is to commence. In one embodiment, the remote diagnostic service begins image capture process 1620A in a manner similar to the steps described in regards to FIG. 16; however, alternative embodiments include activating a webcam on the mobile device or a companion device to capture an image of the mobile device under test either directly or through a companion device; likewise, on the mobile device under test, a browser running from the RDS can open that device's rear-facing camera, then capture an image from either a front-facing or a rear-facing camera in view of a reflecting surface. If a companion device is used in conjunction with the mobile device to be tested, a websock connection may be initiated between the two devices to allow inter-device communication to command the devices to display and capture images. In this way, the mobile device under test may be remotely instructed by the RDS, through a browser on the mobile device, to capture a picture of itself in a reflecting device. Therefore, the RDS can facilitate image capture from a webcam, from either a front-facing or rear-facing camera of the mobile device itself, from a companion device also in communication with the RDS, and other methods where the RDS may initiate image capture. The captured images are then 1630A communicated through a communications link between the RDS and the mobile device (such as a connection to the web server previously established), where the RDS initiates analysis in a manner similar to the steps shown 1635, 1640, of FIG. 16. Those of skill in the relevant arts understand than the RDS may also be implemented with intelligent agents that are capable of interacting with the mobile device through a network, and thus conducting tests and obtaining information to support defect analysis regarding such mobile devices.

Additional defect testing (e.g. 1642A) may be conducted with aspects of the mobile device under test, whether associated with an RDS, or whether a FSTA was installed to conduct testing. For example, some tests are executed (either by the FSTA or remotely via a connection between the mobile device and the RDS) to determine, for example: (1) vibration test (determining, for example, that the device's vibrating agitator is functional); (2) Speaker test; (3) screen touch test; (4) front camera test; (5) back camera test; (5) screen pressure test; (6) accelerometer test; (7) gyroscope test; (8) battery state, including operational capacity, charging time, and whether the battery is swollen (thus indicating a potential defect/hazard state); and (9) recognition of mixed model/provenance, including association of a unique fingerprint or ID of the mobile device. Further, aspects of the present invention provide for sonic analysis to determine defects associated with the mobile device.

Through sonic analysis, a vibrational signal (such as an audio signal or known frequency mechanical vibration) is created and applied to the mobile device, and the microphone of the mobile device "listens" to what can be detected as a result. The captured audio signal from the microphone can then be analyzed to determine whether certain kinds of defects may exist in the mobile device. For example, a predetermined signal may be output from a speaker of the mobile device, (or alternatively through a vibration or vibration pattern induced by an agitator located in the mobile device) then the mobile device listens, though a microphone associated with the mobile device (or a companion device) for audio signatures received by the microphone of the mobile device; in one version, simple audio testing of various frequencies could identify whether the speaker/microphone pair are functional at the desired range of frequencies; further, spectral analysis of the audio signal captured by the microphone may identify certain defects in the speaker or microphone. The spectral analysis my further be compared with ideal propagation through a manufacturer-identical exemplar where sound propagation was classified, and defects such as cracks in glass attached to the mobile device may cause audio propagation discontinuities or rattles that may be deduced from the audio signal received from the microphone. Certain mechanical vibration patterns may also be created by the agitator to attempt to find resonant frequency rattles with loose parts within the mobile device that may be sensed by the received audio pattern of the device's microphone. Such spectral analysis may be performed in concert with neural network implementations that have been pre-trained to identify certain audio anomalies that correspond to defects that may be associated with the mobile device.

Through a process discussed in regards to FIG. 17, an image of the display of the mobile device 800 is captured 1620, and the captured image is optionally pre-processed 1625 by rotating the image to a portrait mode and/or fine rotating to reduce skew, and/or cropping the image to a desired aspect ratio. The captured (and optionally pre-processed) image is then uploaded 1630 to a server (such as server 860), and as discussed further in regards to FIG. 18, the uploaded image is processed 1635 to determine whether any cracks or other types defects are present. Alternatively, or in combination, the extent and characteristics of the screen cracks or defects are characterized by the processing step 1635 for further analysis and reporting. Once the analysis 1635 of any potential defects is complete, the resulting information is formatted 1640 for presentation, storage, or display to any user for any necessary purpose, such as for assessment of whether the mobile device 800 is in proper working condition. The process then exits 1645.

Figure 24:
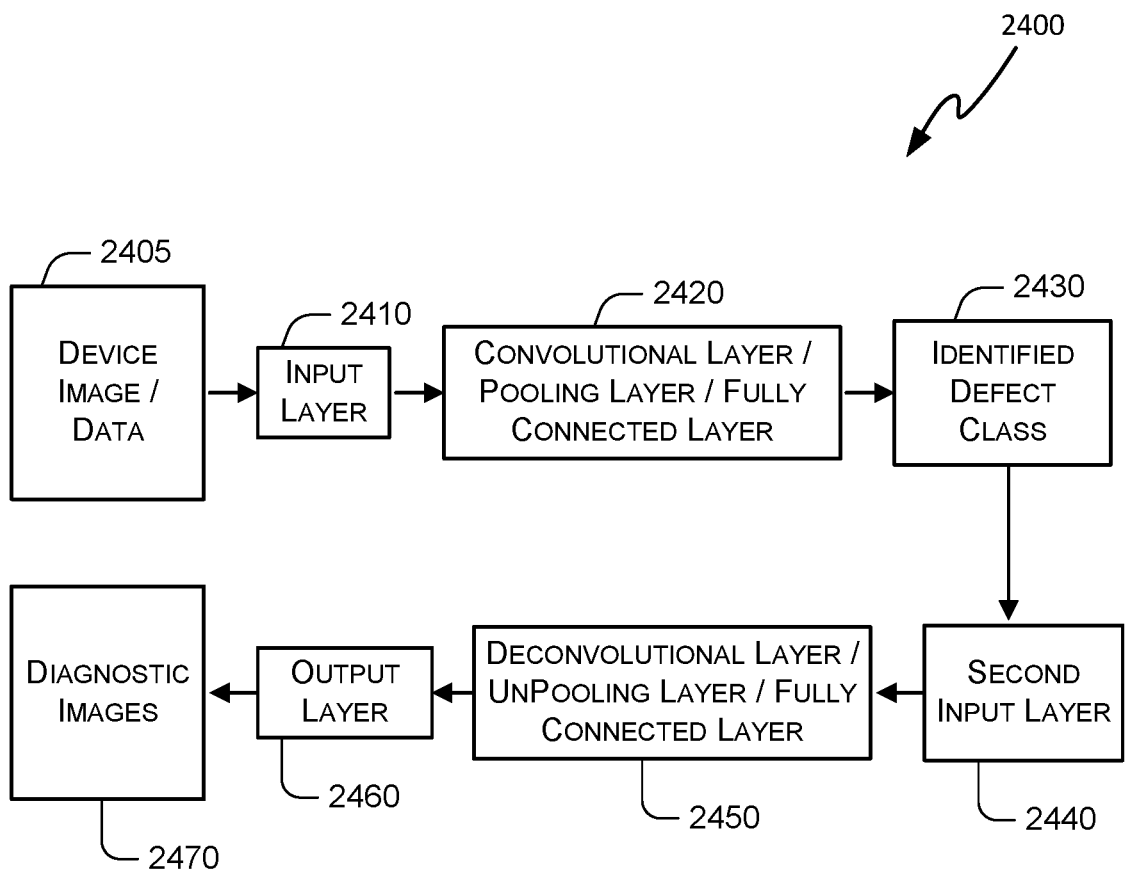
FIG. 24 illustrates a block diagram with data flows depicting one convolutional neural network arrangement regarding systems of the present invention.

FIG. 24 shows one exemplary data flow through a block diagram 2400 of a convolutional neural network (CNN) architecture of the present invention. Before presentation of device image or data 2405, the components of the CNN have been trained to recognize particular device defect classes, including defects such as scratches, cracks, and breaks in a device display. In one embodiment, the downscaled and resampled device image (for example, an image file as resulting from step 1820 of FIG. 18), along with any optional device data that may be used in processing an image associated with the device (such as a unique identifier associated with the device, including but not limited to an IMEI associated with the device) are presented 2405 to an input layer 2410 of the neural network. The input layer is communicatively coupled to block 2420, comprising at least one convolutional layer, a pooling layer, and a fully connected layer as conventionally implemented in a CNN. The trained CNN operates upon the input data and produces an output corresponding to an output showing any detected defect class 2430. Operation may end at that point with analysis of output of block 2430, or may continue to additional processing through input to a second input layer 2440. The defects in block 2430 may be presented to block 2450, where a de-convolutional layer, un-pooling layer, and fully connected layer further process and highlight features of the input image corresponding to locations where defects were located. An output layer 2460 provides output in the form of diagnostic images 2470, which may be stored in a database (for example, FIG. 8A, 880) and associated in the database 880 with device data identifying the device image analyzed by the network 2400.

Generally, to increase the performance and learning capabilities of CNN models, the number of different network layers in the CNN can be selectively increased. The number of intermediate distinct layers from the input layer to the output layer can become very large, thereby increasing the complexity of the architecture of the CNN model. The present disclosure employs learning CNN models, to identify device defects and/or create visual maps indicating presence of a defect located within an image of a mobile device. Consistent with the disclosed embodiments, CNN system 2400 may be configured to generate outputs showing defects (such as identified defect 1900A in device display 1400B of FIG. 20E, or identified defect 1900H of display 1400H of FIG. 20H). Alternatively embodiments of the present invention provide that CNN system 2400 may be configured to generate outputs showing heat maps corresponding to areas of an image that corresponding likelihood of a detected defect class (such as identified heat map 1900D in device display 1400D of FIG. 20D, or identified heat map 1900G of display 1400G of FIG. 20G). For further illustration, the image 1400A in FIG. 20C would be presented as device image/data 2405 of network 2400, and FIGS. 20D and/or 20E would be obtained from the outputs of the CNN 2400. Similarly, the image 1400F of FIG. 20F would be presented as device image/data 2405 of network 2400, and FIGS. 20G and/or 20H would be obtained from the outputs of the CNN 2400. As explained above, depending on the particular embodiment, outputs may be obtained from either of blocks 2430 or 2470 of network 2400.

As used herein, and as explained above, a CNN model used by the disclosed system and method of the present invention may refer to any neural network model formulated, adapted, or modified based on a framework of convolutional neural network. For example, a CNN model used to identify device defects in embodiments of the present disclosure may selectively include intermediate layers between the input and output layers, such as one or more convolutional/de-convolutional layers, non-linear operator layers, pooling or subsampling layers, fully connected layers, final loss layers, deconvolution layers, and/or unpooling or upsampling layers.

In an alternate embodiment, outputs from the CNN model may be trained to produce either a heat map or a specific defect identification without deconvolutional layers without needing further processing after block 2430. Accordingly, in one embodiment, outputs are created through class activation maps through training output layers of a neural network of the present invention, and in one embodiment, heat maps may be output as described previously. In one aspect, heat maps are generated through obtaining mapping functions on each section of an image being output by a trained neural network of the present invention. Mapping functions within each subsection of an image may use scores on the subsections of the image to identify specific defect classes when the trained network has detected a defect in the image data. In one implementation of the present invention, a heat map may be obtained from a particular layer within the CNN model itself. As those of skill in the neural network training arts understand, for example, a softmax function may be used in the final layer of a CNN defect classifier, and may be used to generate the heat map by computing the resulting layer element scores, produce the output into shape of the image data and overlay that upon the area corresponding to the test image to identify a heat map. Alternatively, in one embodiment, the CNN may reduce or strip down aspects of the input data image, apply different convolution layers, capture the outputs of one of the convolution layers, (output across the entire image), and produce a score for each part of the image, which in turn produces a defect activation map. The areas that exceed a predetermined level of activation may be converted in output image data to a specific color, for instance red, to identify defects found on the test image (for instance, read color to an area of the image corresponding to a display crack in the test image). As a further aspect, in the network output layers, a threshold (compared to a predetermined color threshold value) may be performed on the image data to find the red portion of the image, then a minimum bounding rectangle may be placed around the red area to more particularly identify the defect area.

Figure 25:
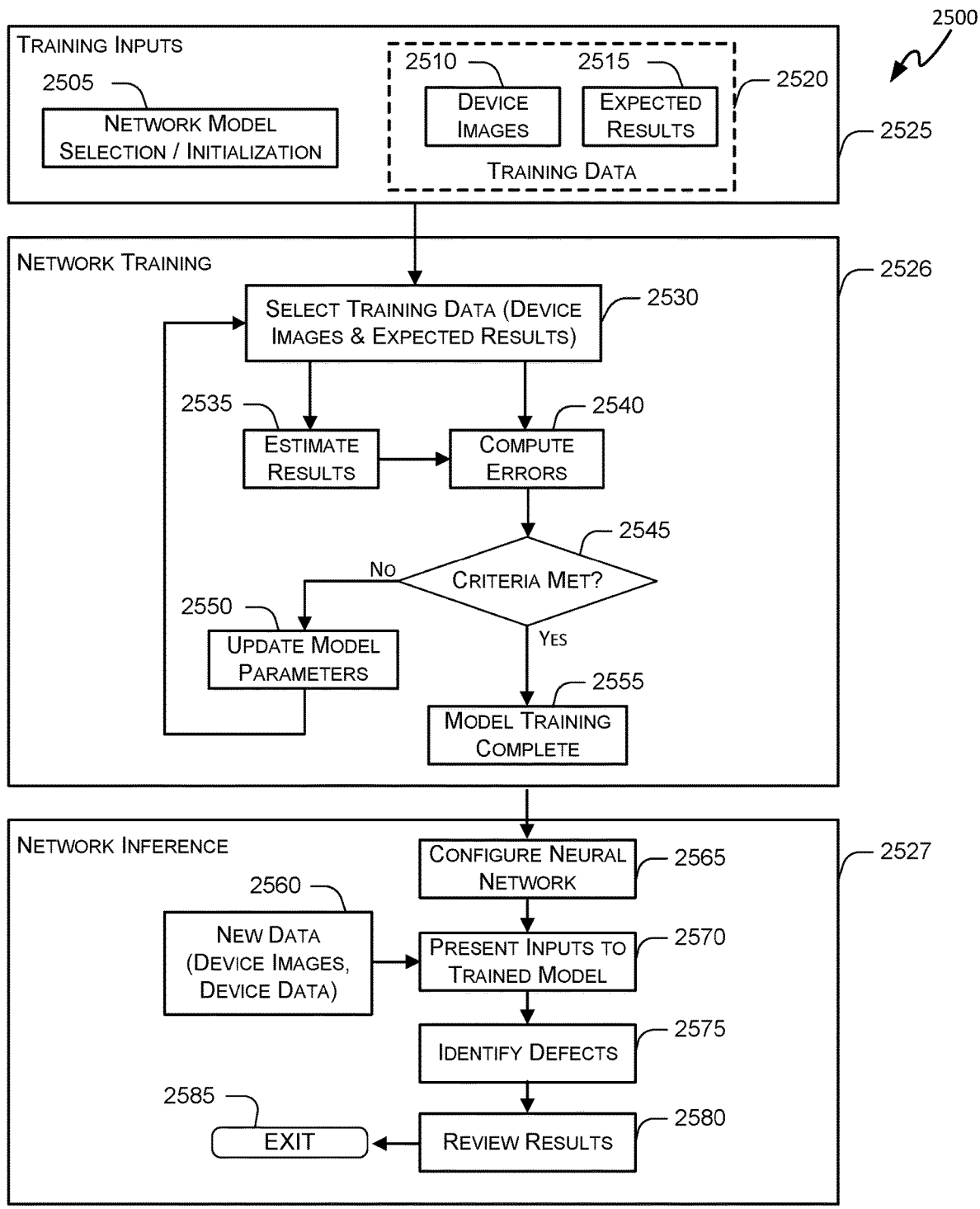
FIG. 25 illustrates a comprehensive flow diagram describing neural network training from network training data, and network inference processes to identify defects using the trained neural network.

FIG. 25 presents an overview of a flow diagram 2500 for an embodiment of the present invention, including three phases: a training preparation phase 2525, a network training phase 2526, and a network inference phase 2527. As discussed in brief previously, disclosed systems and methods for identifying device defects generally include several stages that will be discussed in turn; for example a training stage that "trains" or "learns" a CNN model using training datasets, and a prediction or inference stage in which the trained CNN model uses the training datasets and input data to identify device defects (and/or defect classes). As mentioned above, the aforementioned training stages generally correlate with the network training 2526 as depicted in FIG. 25. As used herein, "training" a CNN model refers to determining one or more parameters of at least one layer in the CNN model. For example, a convolutional layer of a CNN model may include at least one filter or kernel. One or more parameters, such as kernel weights, size, shape, and structure, of the at least one filter may be determined by e.g., a back-propagation-based training process. Further, the aforementioned description regarding FIG. 24 generally correlates with network inference 2527 as depicted in FIG. 25. As used with respect to the embodiment described herein, "predicting" from a CNN model refers to identifying device defects from an image of a device using any desired type of a processed image of the device 2510, including in one embodiment, an image of a display of the device.

In the training preparation phase 2525, training inputs 2520 are prepared and processed for use in training the CNN neural network component (e.g., FIG. 8A, 47). A network model is selected 2505 for use in training; such model selection may include, for example, identification of a convolutional neural network architecture and appropriate processing layer configuration. The neural network component model (FIG. 8A, 47) is initialized with an initial layer configuration, an initial connection configuration, a set of weights, and a set of biases. In addition to device images 2510 and respective expected results (also known to those of skill in the relevant arts as "ground truth" data) 2515, other parameters (as described more fully below) may be specified for input as training data 2520, such as identifying information for each respective device image. In an embodiment, training data 2520 may also include data for actual defective devices or simulated defective devices. In another embodiment, training data 2520 may be synthetically created, e.g. computer-generated images based upon theoretically possible defect types of situations or devised for purposes of model testing.

In various embodiments, and in a manner similar in context with process 1800 of FIG. 18, the preparation phase 2525 includes resampling all imaging data in the training data 2520 to a common grid size and grid spacing. Then, image pixel values can optionally be resampled to common scale across all image data in the training data 2720 to improve learning performance and convergence based on training data furnished to the network. After data preparation, training data and testing data represent device images and respectively corresponding identified defects comprising the ground truth data.

The network training phase 2526 commences with training data 2520 being presented to the configured and initialized neural network model from step 2505 (with no input specified). The neural network component (FIG. 8A, 47) estimates results 2535 from the patient image data and produces estimated results, for example, an identified defect class. A comparison is then made between the estimated results from step 2535 and the expected results 2515 corresponding to the device images 2510, and an error map ("training error") is generated based on differences between the expected results 2515 and the estimated results 2535. The error map is compared to evaluation criteria 2545. For example, a loss function such as a mean absolute error function (MAE), or mean squared error (MSE) function, can be used to determine whether error criteria are met. One skilled in the art would be familiar with various loss functions, such as the mean absolute error (MAE) of the model prediction or $L_1$ norm $J(\theta^*)=\arg\min_\theta \|Y-Y^*\|_1$, or the mean squared error (MSE) or $L_2$ norm $J(\theta^*)=\arg\min_\theta \|Y-Y^*\|_2$ where $\theta^*$ comprises the choice of parameters that minimizes the differences between Y and Y*. A back-propagation algorithm may be used to compute the gradient of the error function with respect to the model parameters or weights. Then $\theta$ may be updated iteratively using a stochastic gradient descent algorithm to converge on $\theta^*$.

If the errors do not satisfy the error threshold criterion, the model parameters of the neural network (FIG. 8A, 47) (e.g., weights and biases) are updated 2550, e.g. to minimize error according to a learning algorithm (e.g. a regularized gradient descent optimization approach), and the training data is re-presented 2530 to the neural network (FIG. 8A, 47) with the neural network's newly-assigned model parameters.

In one embodiment, determining whether criteria are met 2545 includes presenting one or more test device images that are different from the training images (but have no defects pre-identified) to the network model as currently configured to generate an estimate of defects respectively corresponding to such test device images. The resulting defect classifications can then be compared with the ground truth/ expected defect classifications to assess the quality of the network parameter model. The differences between the expected defects and the estimated defects for this test data is the "test error." In any event, iteration from step 2550 to step 2530, to steps 2535 and 2540, to step 2545 continues until the error threshold criterion is met, whereupon the training process 2525 concludes 2555, with a trained neural network component model ready for use with captured images of real devices and corresponding data (FIG. 8A, 45, 46).

In an alternative embodiment, the neural network (FIG. 8A, 47) may be trained in multiple steps and various portions of the neural network may be trained with separate training data sets to achieve particular defect classification. For example, a convolutional neural network of the present invention may be pre-trained to recognize a large number of generic visual object classes, and then a final layer of the network may be retrained to identify specific visual items, such as screen defects (e.g., cracked or damages displays of a mobile device). In one version of the present invention, characteristics regarding the defect (e.g. a display crack) may be provided in the training data associated with training images, and may be provided in various embodiment without coordinates of where such crack may exist in the training data image, and in still other embodiments, the training data images that show defects (e.g. display cracks) are accompanied by coordinates identifying the cracked areas within the image so that training of the output layer may be optimized. Using multiple training passes, such as training a network with a large number of visual classes then retraining a final layer of the network with specific defects to be detected may provide embodiments with advantages of efficiency over retraining an entire network if the training data 2560 is updated or changed with new defect types or updated amounts of training examples.

Once trained, the neural network component model (FIG. 8, 47) may be stored in a memory such as the server memory (e.g., FIG. 8, 16), within non-transitory memory of the network component (FIG. 8, 47) or in a database (e.g. FIG. 8A, 880). The trained network model may then be used in the network inference steps 2527 to compute a useful output (e.g. classified defects associated with a device) when presented with mobile device images and/or data (FIG. 8A, 45, 46) for which defect analysis is desired. The trained neural network is configured 2565, for example, by loading stored weights and biases for the particular trained network configuration. Patient data inputs are presented to the trained and configured neural network component (FIG. 8A, 47) to obtain predicted results. In a preferred embodiment, predicted results comprise one of a defect classification with identified defects, or a defect classification with a displayed heat map. Thus, for the device of interest, device images and/or data 2560 are presented to the trained and configured neural network model 2570 to produce the predicted results 2575. In a further embodiment, the predicted results are in turn reviewed 2580 by any desired entity, such as for use in determining the insurability of a mobile device or validity of an insurance claim for the mobile device.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:

1. A system for visually diagnosing a mobile device comprising:
   a test fixture comprising a fixturing platform mechanically coupled through a support member to a top cover including a reflecting surface;
   a server configured to communicate with a provided mobile device;
   wherein the memory of the mobile device includes instructions that when executed by the processor of the mobile device cause the mobile device to perform the steps of:
   prompting the user to place the mobile device into the test fixture;
   determining whether the mobile device is in an acceptable orientation with respect to the reflecting surface;
   in response to detecting the mobile device is in an acceptable orientation, capturing an image of the mobile device as reflected from the reflective surface and formatting the captured image for transmission to the server for defect analysis.

2. The system of claim 1, wherein determining whether the mobile device is in an acceptable orientation with respect to the reflecting surface further includes:
   displaying on the mobile device a tracking fiducial and a placement guidance fiducial;

obtaining a tracking image of the mobile device from a camera of the mobile device;

locating, within the tracking image, an orientation of the mobile device; and determining whether the located orientation is within a predetermined range.

3. The system of claim 1, wherein displaying on the mobile device a tracking fiducial and a placement guidance fiducial further comprises displaying the tracking fiducial as:
one or more QR codes;
one or more Aztec codes;
one or more ArUco codes; and
one or more graphical tracking elements.

4. The system of claim 1 wherein the reflecting surface comprises one or more of a mirror and a one-way mirror.

5. A method for visually diagnosing a mobile device comprising:
prompting the user to place the mobile device into a test fixture comprising a fixturing platform having a reflective surface;
determining whether the mobile device has been placed on the fixturing platform in an acceptable orientation with respect to the reflective surface;
in response to detecting the mobile device is in an acceptable orientation, capturing an image of the device as reflected from the reflective surface;
analyzing the captured image to determine whether the captured image comprises one or more defect indicators; and
based on said analyzing, providing a cosmetic defect grading of the mobile device.

6. The method of claim 5 wherein one or more defect indicators comprises one or more indications of: cracks, chips, fractures, mars, wear, scratches, abrasions, engravings, stuck pixels, dead pixels, color errors, color bleed, and errant markings.

7. The method of claim 5 further including:
detecting, through analyzing the captured image including a tracking fiducial, whether the mobile device is in a proper position with respect to the reflecting surface;
providing dynamic guidance through modifying a placement guidance fiducial displayed on the mobile device;
instructing a user with regard to placement of the mobile device on the fixturing platform; and
indicating, through the placement guidance fiducial, when the mobile device has been placed into a correct position with respect to the reflecting surface.

8. The system of claim 7, wherein the tracking fiducial comprises:
one or more QR codes;
one or more Aztec codes;
one or more ArUco codes; or
one or more graphical tracking elements.

9. The system of claim 5 wherein the reflecting surface comprises one or more of a mirror and a one-way mirror.

10. A system comprising:
a test fixture including a fixturing platform mechanically coupled through a support member to a top cover including a reflecting surface, wherein the reflecting surface is positioned at a predetermined distance from the fixturing platform and disposed at a predetermined angle with respect to a top planar surface of the fixturing platform;
a server comprising:
a server processor communicatively coupled to a database;
a server memory communicatively coupled to the server processor;
a server user interface communicatively coupled to the server processor; and
a communications interface coupled to the server processor and configured to communicate with a communications module of a provided mobile device wherein:
the provided mobile device comprises:
a housing substantially enclosing the mobile device;
a mobile processor in communication with a mobile device memory;
a user interface including a display and a first camera in communication with the mobile processor;
a communications module in communication with the mobile processor and configured to communicate with the communications interface of the server;
wherein the memory of the mobile device includes instructions that when executed by the processor cause the mobile device to perform the steps of:
prompting a user of the mobile device to initiate a test of one of the display or the housing of the mobile device;
presenting an image on the display that includes:
a tracking fiducial; and
a placement guidance fiducial that includes an indicia of alignment;
performing a tracking calibration function to adjust the mobile device position and display for optimal image capture;
modifying a brightness setting and a camera sensitivity setting of the mobile device to optimize image capture;
determining that the mobile device is in an acceptable orientation with respect to the reflective surface, and thereupon:
capturing an image of the mobile device as reflected from the reflective surface; and
formatting the captured image for transmission to the server for defect analysis.

11. The system of claim 10 wherein the provided mobile device includes a second camera.

12. The system of claim 10 wherein the reflecting surface comprises one or more of a mirror and a one-way mirror.

13. The system of claim 10 wherein the server is communicatively coupled to the mobile device through one of a wired connection or a wireless connection.

14. The system of claim 10 wherein:
the memory of the mobile device and the processor is configured with software, that when executed, executes the steps of:
initiating a test alignment mode, wherein:
the tracking fiducial is rendered on the display; and
the placement guidance fiducial is rendered on the display.

15. The system of claim 10 wherein an image of the mobile device's view from the camera is rendered on the display.

16. The system of claim 15 wherein an image from the front facing camera captures an image of the display of the mobile device; and a rear-facing camera captures an image of a back side surface of the housing of the mobile device.

17. The system of claim 10 further including:
detecting, through analyzing an image from the camera including the tracking fiducial, whether the mobile device is in a proper position with respect to the reflecting surface;

providing dynamic guidance through modifying the placement guidance fiducial;

instructing a user with regard to placement of the mobile device on the fixturing platform; and indicating, through the placement guidance fiducial, when the mobile device has been placed into a correct position with respect to the reflecting surface.

18. The system of claim 10 wherein:

the fixturing platform includes an alignment guide.

19. The system of claim 18 wherein the alignment guide comprises one or more of:

an optical fiducial;

an illuminated fiducial;

one or more molded placement guides; and an electronic display coupled to the test processor for displaying a placement fiducial and alignment information such as arrows.

20. The system of claim 10 further comprising capturing an image of the mobile device from the first camera once the mobile device is properly placed on the fixturing platform.

21. The system of claim 10 further comprising analyzing the captured image and diagnosing at least one state of the housing/display of the mobile device.

22. The system of claim 10 further comprising analyzing, from the analyzed image, whether placement of the mobile device requires modification; and providing alternate placement guidance fiducials for further alignment.

23. The system of claim 10 wherein the support element is selectable to change a distance between the reflecting surface and the fixturing platform.

24. The system of claim 10 wherein the support member can be actuated to obtain a predetermined angle between the reflecting surface and the fixturing platform.

* * * * *